(12) United States Patent
McGhie et al.

(10) Patent No.: US 10,062,062 B1
(45) Date of Patent: *Aug. 28, 2018

(54) AUTOMATED TELLER MACHINE (ATM) PROVIDING MONEY FOR LOYALTY POINTS

(71) Applicants: Sean I. McGhie, Boca Raton, FL (US); Brian K. Buchheit, Davie, FL (US)

(72) Inventors: Sean I. McGhie, Boca Raton, FL (US); Brian K. Buchheit, Davie, FL (US)

(73) Assignee: JBSHBM, LLC, Weston, FL (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/454,040

(22) Filed: Mar. 9, 2017

Related U.S. Application Data

(63) Continuation-in-part of application No. 14/612,863, filed on Feb. 3, 2015, now Pat. No. 9,251,528, and a
(Continued)

(51) Int. Cl.
*G06K 5/00* (2006.01)
*G06Q 20/10* (2012.01)
*G06Q 30/02* (2012.01)

(52) U.S. Cl.
CPC ..... *G06Q 20/1085* (2013.01); *G06Q 30/0226* (2013.01)

(58) Field of Classification Search
CPC .......... G06Q 30/00; G06Q 40/00; G06K 5/00; G06K 19/06; G07D 11/00; G06F 17/00; G06F 19/00; A63F 9/24; A63F 13/00

USPC ............... 235/380, 375, 379, 487, 486, 382; 705/14, 14.32, 14.3, 17, 39; 463/20, 25, 463/13
See application file for complete search history.

(56) References Cited

U.S. PATENT DOCUMENTS 3,573,747 A 4/1971 Adams et al.
3,581,072 A 5/1971 Nymeyer
(Continued)

FOREIGN PATENT DOCUMENTS

AU 6484498 11/1998
AU 2497399 11/1999
(Continued)

OTHER PUBLICATIONS

Non Final Rejection dated Mar. 12, 2012; U.S. Appl. No. 13/359,104; pp. 1-8.
(Continued)

*Primary Examiner* — Edwyn Labaze

(57) ABSTRACT

An automated teller (ATM) machine providing unattended financial functions comprising financial account access to authorized ones of the users' financial accounts, withdraws from authorized ones of the users' financial accounts, deposits into authorized ones of the user's financial account. The ATM also provides unattended non-negotiable account functions including interactive account access to authorized ones of a set of non-negotiable fund accounts, conversions between value stored in authorized ones of the non-negotiable fund accounts and authorized ones of the user's financial accounts, and/or withdrawals of negotiable funds resulting from ATM machine conversions of a quantity of non-negotiable funds in authorized ones of the non-negotiable fund accounts into paper currency.

20 Claims, 22 Drawing Sheets

Related U.S. Application Data continuation-in-part of application No. 14/611,764, filed on Feb. 2, 2015, now Pat. No. 9,230,264, and a continuation-in-part of application No. 14/314,297, filed on Jun. 25, 2014, now Pat. No. 8,950,669, and a continuation-in-part of application No. 14/314,196, filed on Jun. 25, 2014, now Pat. No. 8,973,821, and a continuation-in-part of application No. 14/314,178, filed on Jun. 25, 2014, now Pat. No. 8,944,320, and a continuation-in-part of application No. 14/034,492, filed on Sep. 23, 2013, now Pat. No. 8,833,650, and a continuation-in-part of application No. 14/024,936, filed on Sep. 12, 2013, now Pat. No. 8,789,752, and a continuation-in-part of application No. 14/024,921, filed on Sep. 12, 2013, now Pat. No. 8,807,427, and a continuation-in-part of application No. 13/969,936, filed on Aug. 19, 2013, now Pat. No. 8,794,518, and a continuation-in-part of application No. 13/969,896, filed on Aug. 19, 2013, now Pat. No. 8,783,563, and a continuation-in-part of application No. 13/969,873, filed on Aug. 19, 2013, now Pat. No. 8,763,901, and a continuation-in-part of application No. 13/901,175, filed on May 23, 2013, now Pat. No. 8,540,152, and a continuation-in-part of application No. 13/899,023, filed on May 21, 2013, now Pat. No. 8,523,064, and a continuation-in-part of application No. 13/863,605, filed on Apr. 16, 2013, now Pat. No. 8,523,063, and a continuation-in-part of application No. 13/863,556, filed on Apr. 16, 2013, now Pat. No. 8,511,550, and a continuation-in-part of application No. 13/681,493, filed on Nov. 20, 2012, now Pat. No. 8,668,146, and a continuation-in-part of application No. 13/681,479, filed on Nov. 20, 2012, now Pat. No. 8,684,265, and a continuation-in-part of application No. 13/542,451, filed on Jul. 5, 2012, now Pat. No. 8,342,399, and a continuation-in-part of application No. 13/532,342, filed on Jun. 25, 2012, now Pat. No. 8,297,502, and a continuation-in-part of application No. 13/531,904, filed on Jun. 25, 2012, now Pat. No. 8,313,023, and a continuation-in-part of application No. 13/479,417, filed on May 24, 2012, now Pat. No. 8,267,315, and a continuation-in-part of application No. 13/441,354, filed on Apr. 6, 2012, now abandoned, and a continuation-in-part of application No. 13/428,656, filed on Mar. 23, 2012, now Pat. No. 8,201,734, and a continuation-in-part of application No. 13/359,120, filed on Jan. 26, 2012, now Pat. No. 8,186,583, and a continuation-in-part of application No. 13/359,104, filed on Jan. 26, 2012, now Pat. No. 8,181,864, and a continuation-in-part of application No. 13/359,080, filed on Jan. 26, 2012, now Pat. No. 8,181,863, and a continuation-in-part of application No. 13/168,814, filed on Jun. 24, 2011, now Pat. No. 8,376,224, and a continuation-in-part of application No. 12/759,506, filed on Apr. 13, 2010, now Pat. No. 8,162,209, and a continuation-in-part of application No. 11/420,255, filed on May 25, 2006, now Pat. No. 7,703,673, and a continuation-in-part of application No. 12/720,743, filed on Mar. 10, 2010, now Pat. No. 8,123,127, and a continuation-in-part of application No. 15/013,129, filed on Feb. 2, 2016, now Pat. No. 9,704,174.

(56) References Cited

U.S. PATENT DOCUMENTS

| | | | |
|---|---|---|---|
| 3,652,795 | A | 3/1972 | Wolf et al. |
| 3,918,716 | A | 11/1975 | Nonaka et al. |
| 4,087,660 | A | 5/1978 | Sedley |
| 4,251,867 | A | 2/1981 | Uchida et al. |
| 4,358,672 | A | 11/1982 | Hyatt et al. |
| 4,412,287 | A | 10/1983 | Braddock, III |
| 4,473,825 | A | 9/1984 | Walton |
| 4,518,098 | A | 5/1985 | Fleischer |
| 4,546,241 | A | 10/1985 | Walton |
| 4,582,324 | A | 4/1986 | Koza et al. |
| 4,607,155 | A | 8/1986 | Nao et al. |
| 4,609,812 | A | 9/1986 | Drexler |
| 4,621,814 | A | 11/1986 | Stephan et al. |
| 4,634,848 | A | 1/1987 | Shinohara et al. |
| 4,674,044 | A | 4/1987 | Kalmus et al. |
| 4,677,552 | A | 6/1987 | Sibley, Jr. |
| 4,689,742 | A | 8/1987 | Troy et al. |
| 4,695,053 | A | 9/1987 | Vazquez |
| 4,700,055 | A | 10/1987 | Kashkashian, Jr. |
| 4,701,601 | A | 10/1987 | Francini et al. |
| 4,736,094 | A | 4/1988 | Yoshida |
| 4,760,527 | A | 7/1988 | Sidley |
| 4,764,666 | A | 8/1988 | Bergeron |
| 4,789,928 | A | 12/1988 | Fujisaki |
| 4,799,156 | A | 1/1989 | Shivit et al. |
| 4,812,628 | A | 3/1989 | Boston et al. |
| 4,823,264 | A | 4/1989 | Beming |
| 4,823,265 | A | 4/1989 | Nelson |
| 4,833,607 | A | 5/1989 | Dethloff et al. |
| 4,837,422 | A | 6/1989 | Dethloff et al. |
| 4,864,516 | A | 9/1989 | Gaither et al. |
| 4,877,947 | A | 10/1989 | Mori |
| 4,882,473 | A | 11/1989 | Bergeron |
| 4,903,201 | A | 2/1990 | Wagner |
| 4,910,672 | A | 3/1990 | Off et al. |
| 4,912,310 | A | 3/1990 | Uemura et al. |
| 4,941,090 | A | 7/1990 | McCarthy |
| 4,942,090 | A | 7/1990 | Morin |
| 4,949,256 | A | 8/1990 | Humble |
| 4,968,873 | A | 11/1990 | Dethloff |
| 4,982,346 | A | 1/1991 | Girouard et al. |
| 5,025,372 | A | 6/1991 | Burton et al. |
| 5,038,022 | A | 8/1991 | Lucero |
| 5,056,019 | A | 10/1991 | Schultz et al. |
| 5,063,507 | A | 11/1991 | Lindsey et al. |
| 5,076,433 | A | 12/1991 | Howes |
| 5,077,665 | A | 12/1991 | Silverman et al. |
| 5,080,364 | A | 1/1992 | Seidman |
| 5,101,353 | A | 3/1992 | Lupien |
| 5,105,184 | A | 4/1992 | Pirani et al. |
| 5,117,355 | A | 5/1992 | McCarthy |
| 5,128,752 | A | 7/1992 | Von Kohorn |
| 5,135,224 | A | 8/1992 | Yamamoto |
| 5,136,501 | A | 8/1992 | Silverman et al. |
| 5,142,578 | A | 8/1992 | Matyas et al. |
| 5,168,446 | A | 12/1992 | Wiseman |
| 5,173,851 | A | 12/1992 | Off et al. |
| 5,179,517 | A | 1/1993 | Sarbin et al. |
| 5,200,889 | A | 4/1993 | Mori |
| 5,201,010 | A | 4/1993 | Deaton et al. |
| 5,202,826 | A | 4/1993 | McCarthy |
| 5,205,200 | A | 4/1993 | Wright |
| 5,233,514 | A | 8/1993 | Ayyoubi et al. |
| 5,237,620 | A | 8/1993 | Deaton et al. |
| 5,243,515 | A | 9/1993 | Lee |
| 5,256,863 | A | 10/1993 | Ferguson et al. |
| 5,258,908 | A | 11/1993 | Hartheimer et al. |
| 5,265,874 | A | 11/1993 | Dickinson |
| 5,276,311 | A | 1/1994 | Hennige |
| 5,276,312 | A | 1/1994 | McCarthy |

(56) References Cited

U.S. PATENT DOCUMENTS

| | | |
|---|---|---|
| 5,280,422 A | 1/1994 | Moe et al. |
| 5,287,268 A | 2/1994 | McCarthy |
| 5,287,269 A | 2/1994 | Dorrough et al. |
| 5,290,033 A | 3/1994 | Bittner et al. |
| 5,297,031 A | 3/1994 | Gutterman et al. |
| 5,297,032 A | 3/1994 | Trojan et al. |
| 5,305,196 A | 4/1994 | Deaton et al. |
| 5,305,200 A | 4/1994 | Hartheimer et al. |
| 5,325,297 A | 6/1994 | Bird et al. |
| 5,327,508 A | 7/1994 | Deaton et al. |
| 5,329,589 A | 7/1994 | Fraser et al. |
| 5,332,076 A | 7/1994 | Ziegert |
| 5,344,144 A | 9/1994 | Cannon |
| 5,353,218 A | 10/1994 | De Lapa et al. |
| 5,369,705 A | 11/1994 | Bird et al. |
| 5,371,345 A | 12/1994 | LeStrange et al. |
| 5,373,440 A | 12/1994 | Cohen et al. |
| 5,375,055 A | 12/1994 | Togher et al. |
| 5,380,991 A | 1/1995 | Valencia et al. |
| 5,382,779 A | 1/1995 | Gupta |
| 5,388,165 A | 2/1995 | Deaton et al. |
| 5,393,061 A | 2/1995 | Manship et al. |
| 5,394,324 A | 2/1995 | Clearwater |
| 5,397,125 A | 3/1995 | Adams |
| 5,398,932 A | 3/1995 | Eberhardt et al. |
| 5,401,946 A | 3/1995 | Weinblatt |
| 5,402,872 A | 4/1995 | Clurman |
| 5,418,949 A | 5/1995 | Suzuki |
| 5,424,524 A | 6/1995 | Ruppert et al. |
| 5,426,281 A | 6/1995 | Abecassis |
| 5,429,361 A | 7/1995 | Raven et al. |
| 5,430,644 A | 7/1995 | Deaton et al. |
| 5,434,394 A | 7/1995 | Roach et al. |
| 5,440,634 A | 8/1995 | Jones et al. |
| 5,442,782 A | 8/1995 | Malatesta et al. |
| 5,448,471 A | 9/1995 | Deaton et al. |
| 5,453,601 A | 9/1995 | Rosen |
| 5,455,407 A | 10/1995 | Rosen |
| 5,457,306 A | 10/1995 | Lucero |
| 5,467,269 A | 11/1995 | Flaten |
| 5,470,079 A | 11/1995 | LeStrange et al. |
| 5,471,669 A | 11/1995 | Lidman |
| 5,477,038 A | 12/1995 | Levine et al. |
| 5,483,444 A | 1/1996 | Heintzeman et al. |
| 5,485,510 A | 1/1996 | Colbert |
| 5,491,326 A | 2/1996 | Marceau et al. |
| 5,497,319 A | 3/1996 | Chong et al. |
| 5,502,636 A | 3/1996 | Clarke |
| 5,511,781 A | 4/1996 | Wood et al. |
| 5,513,102 A | 4/1996 | Auriemma |
| 5,529,361 A | 6/1996 | Bell |
| 5,535,276 A | 7/1996 | Ganesan |
| 5,535,407 A | 7/1996 | Yanagawa et al. |
| 5,537,314 A | 7/1996 | Kanter |
| 5,551,692 A | 9/1996 | Pettit et al. |
| 5,553,145 A | 9/1996 | Micali |
| 5,557,518 A | 9/1996 | Rosen |
| 5,557,728 A | 9/1996 | Garrett et al. |
| 5,559,312 A | 9/1996 | Lucero |
| 5,559,313 A | 9/1996 | Claus et al. |
| 5,564,546 A | 10/1996 | Molbak et al. |
| 5,564,700 A | 10/1996 | Celona |
| 5,578,808 A | 11/1996 | Taylor |
| 5,580,309 A | 12/1996 | Piechowiak |
| 5,586,936 A | 12/1996 | Bennett et al. |
| 5,590,038 A | 12/1996 | Pitroda |
| 5,592,560 A | 1/1997 | Deaton et al. |
| 5,596,994 A | 1/1997 | Bro |
| 5,598,557 A | 1/1997 | Doner et al. |
| 5,609,337 A | 3/1997 | Clapper, Jr. |
| 5,612,868 A | 3/1997 | Off et al. |
| 5,613,912 A | 3/1997 | Slater |
| 5,621,812 A | 4/1997 | Deaton et al. |
| 5,635,696 A | 6/1997 | Dabrowski |
| 5,638,457 A | 6/1997 | Deaton et al. |
| 5,640,569 A | 6/1997 | Miller et al. |
| 5,642,485 A | 6/1997 | Deaton et al. |
| 5,643,088 A | 7/1997 | Vaughn et al. |
| 5,644,723 A | 7/1997 | Deaton et al. |
| 5,649,114 A | 7/1997 | Deaton et al. |
| 5,649,115 A | 7/1997 | Schrader et al. |
| 5,649,118 A | 7/1997 | Carlisle et al. |
| 5,652,896 A | 7/1997 | Yamauchi et al. |
| 5,655,961 A | 8/1997 | Acres et al. |
| 5,657,389 A | 8/1997 | Houvener |
| 5,659,165 A | 8/1997 | Jennings et al. |
| 5,659,469 A | 8/1997 | Deaton et al. |
| 5,664,115 A | 9/1997 | Fraser |
| 5,668,591 A | 9/1997 | Shintani |
| 5,671,364 A | 9/1997 | Turk |
| 5,672,109 A | 9/1997 | Natanian |
| 5,673,322 A | 9/1997 | Pepe et al. |
| 5,674,128 A | 10/1997 | Holch et al. |
| 5,675,662 A | 10/1997 | Deaton et al. |
| 5,677,952 A | 10/1997 | Blakley et al. |
| 5,687,322 A | 11/1997 | Deaton et al. |
| 5,687,323 A | 11/1997 | Hodroff |
| 5,689,100 A | 11/1997 | Carrithers |
| 5,689,652 A | 11/1997 | Lupien et al. |
| 5,694,546 A | 12/1997 | Reisman |
| 5,697,611 A | 12/1997 | Kelly et al. |
| 5,706,457 A | 1/1998 | Dwyer et al. |
| 5,708,782 A | 1/1998 | Larson et al. |
| 5,710,886 A | 1/1998 | Christensen et al. |
| 5,710,889 A | 1/1998 | Clark et al. |
| 5,715,314 A | 2/1998 | Payne et al. |
| 5,715,399 A | 2/1998 | Bezos |
| 5,715,402 A | 2/1998 | Popolo |
| 5,717,989 A | 2/1998 | Tozzoli et al. |
| 5,722,418 A | 3/1998 | Bro |
| 5,724,524 A | 3/1998 | Hunt et al. |
| 5,725,428 A | 3/1998 | Achmuller |
| 5,727,165 A | 3/1998 | Ordish et al. |
| 5,729,594 A | 3/1998 | Klingman |
| 5,729,693 A | 3/1998 | Holda-Fleck |
| 5,734,838 A | 3/1998 | Robinson et al. |
| 5,741,183 A | 4/1998 | Acres |
| 5,742,845 A | 4/1998 | Wagner |
| 5,745,573 A | 4/1998 | Lipner et al. |
| 5,749,075 A | 5/1998 | Toader et al. |
| 5,754,655 A | 5/1998 | Hughes |
| 5,758,126 A | 5/1998 | Daniels et al. |
| 5,761,647 A | 6/1998 | Boushy |
| 5,761,648 A | 6/1998 | Golden et al. |
| 5,765,141 A | 6/1998 | Spector |
| 5,766,075 A | 6/1998 | Cook et al. |
| 5,769,716 A | 6/1998 | Saffari et al. |
| 5,770,533 A | 6/1998 | Franchi |
| 5,770,843 A | 6/1998 | Rose et al. |
| 5,771,291 A | 6/1998 | Newton et al. |
| 5,771,380 A | 6/1998 | Tanaka et al. |
| 5,774,553 A | 6/1998 | Rosen |
| 5,774,868 A | 6/1998 | Cragun et al. |
| 5,774,869 A | 6/1998 | Toader |
| 5,774,870 A | 6/1998 | Storey |
| 5,774,873 A | 6/1998 | Berent et al. |
| 5,775,870 A | 7/1998 | Hogan |
| 5,778,178 A | 7/1998 | Arunachalam |
| 5,778,213 A | 7/1998 | Shakib et al. |
| 5,778,367 A | 7/1998 | Wesinger, Jr. et al. |
| 5,779,242 A | 7/1998 | Kaufmann |
| 5,779,549 A | 7/1998 | Walker et al. |
| 5,794,210 A | 8/1998 | Goldhaber et al. |
| 5,794,219 A | 8/1998 | Brown |
| 5,794,230 A | 8/1998 | Horadan et al. |
| 5,799,285 A | 8/1998 | Klingman |
| 5,802,275 A | 9/1998 | Blonder |
| 5,803,500 A | 9/1998 | Mossberg |
| 5,806,043 A | 9/1998 | Toader |
| 5,806,044 A | 9/1998 | Powell |
| 5,806,045 A | 9/1998 | Biorge et al. |
| 5,809,482 A | 9/1998 | Strisower |
| 5,814,796 A | 9/1998 | Benson et al. |
| 5,816,918 A | 10/1998 | Kelly et al. |

(56) References Cited

U.S. PATENT DOCUMENTS

| | | |
|---|---|---|
| 5,818,914 A | 10/1998 | Fujisaki |
| 5,820,460 A | 10/1998 | Fulton |
| 5,822,230 A | 10/1998 | Kikinis et al. |
| 5,823,874 A | 10/1998 | Adams |
| 5,825,884 A | 10/1998 | Zdepski et al. |
| 5,826,244 A | 10/1998 | Huberman |
| 5,832,457 A | 11/1998 | O'Brien et al. |
| 5,832,458 A | 11/1998 | Jones |
| 5,833,536 A | 11/1998 | Davids et al. |
| 5,834,748 A | 11/1998 | Litman |
| 5,835,896 A | 11/1998 | Fisher et al. |
| 5,836,817 A | 11/1998 | Acres |
| 5,839,117 A | 11/1998 | Cameron et al. |
| 5,844,230 A | 12/1998 | Lalonde |
| 5,845,259 A | 12/1998 | West et al. |
| 5,845,266 A | 12/1998 | Lupien et al. |
| 5,846,265 A | 12/1998 | McGregor et al. |
| 5,848,399 A | 12/1998 | Burke |
| 5,850,442 A | 12/1998 | Muftic |
| 5,851,148 A | 12/1998 | Brune et al. |
| 5,855,007 A | 12/1998 | Jovicic et al. |
| 5,855,008 A | 12/1998 | Goldhaber et al. |
| D404,436 S | 1/1999 | McGahn et al. |
| 5,857,175 A | 1/1999 | Day et al. |
| 5,857,188 A | 1/1999 | Douglas |
| 5,857,201 A | 1/1999 | Wright et al. |
| 5,857,203 A | 1/1999 | Kauffman et al. |
| 5,864,822 A | 1/1999 | Baker, III |
| RE36,116 E | 2/1999 | McCarthy et al. |
| 5,870,722 A | 2/1999 | Albert et al. |
| 5,872,848 A | 2/1999 | Romney et al. |
| 5,873,069 A | 2/1999 | Reuhl et al. |
| 5,874,412 A | 2/1999 | Priebe et al. |
| 5,876,284 A | 3/1999 | Acres et al. |
| 5,882,261 A | 3/1999 | Adams |
| 5,882,262 A | 3/1999 | Balhorn |
| 5,884,056 A | 3/1999 | Steele |
| 5,884,247 A | 3/1999 | Christy |
| 5,884,277 A | 3/1999 | Khosla |
| 5,890,138 A | 3/1999 | Godin et al. |
| 5,892,827 A | 4/1999 | Beach et al. |
| 5,892,900 A | 4/1999 | Ginter et al. |
| 5,892,905 A | 4/1999 | Brandt et al. |
| 5,897,621 A | 4/1999 | Boesch et al. |
| 5,897,622 A | 4/1999 | Blinn et al. |
| 5,898,570 A | 4/1999 | Koon |
| 5,898,838 A | 4/1999 | Wagner |
| 5,899,980 A | 5/1999 | Wilf et al. |
| 5,902,184 A | 5/1999 | Bennett |
| 5,902,983 A | 5/1999 | Crevelt et al. |
| 5,903,847 A | 5/1999 | Leonard et al. |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,905,974 A | 5/1999 | Fraser et al. |
| 5,905,975 A | 5/1999 | Ausubel |
| 5,907,830 A | 5/1999 | Engel et al. |
| 5,907,831 A | 5/1999 | Lotvin et al. |
| 5,909,023 A | 6/1999 | Ono et al. |
| 5,909,486 A | 6/1999 | Walker et al. |
| 5,909,544 A | 6/1999 | Anderson et al. |
| 5,911,418 A | 6/1999 | Adams |
| 5,913,203 A | 6/1999 | Wong et al. |
| 5,913,210 A | 6/1999 | Call |
| 5,914,472 A | 6/1999 | Foladare et al. |
| 5,915,007 A | 6/1999 | Klapka |
| 5,915,019 A | 6/1999 | Ginter et al. |
| 5,915,243 A | 6/1999 | Smolen |
| 5,915,244 A | 6/1999 | Jack et al. |
| 5,917,168 A | 6/1999 | Nakamura et al. |
| 5,918,211 A | 6/1999 | Sloane |
| 5,918,213 A | 6/1999 | Bernard et al. |
| 5,918,214 A | 6/1999 | Perkowski |
| 5,919,091 A | 7/1999 | Bell et al. |
| 5,920,847 A | 7/1999 | Kolling et al. |
| 5,922,074 A | 7/1999 | Richard et al. |
| 5,923,016 A | 7/1999 | Fredregill et al. |
| 5,924,072 A | 7/1999 | Havens |
| 5,924,080 A | 7/1999 | Johnson |
| 5,933,811 A | 8/1999 | Angles et al. |
| 5,933,827 A | 8/1999 | Cole et al. |
| 5,935,000 A | 8/1999 | Sanchez, III |
| 5,937,066 A | 8/1999 | Gennaro et al. |
| 5,937,391 A | 8/1999 | Ikeda et al. |
| 5,937,394 A | 8/1999 | Wong et al. |
| 5,938,727 A | 8/1999 | Ikeda |
| 5,940,506 A | 8/1999 | Chang et al. |
| 5,941,771 A | 8/1999 | Haste, III |
| 5,941,772 A | 8/1999 | Paige |
| 5,943,241 A | 8/1999 | Nichols et al. |
| 5,944,790 A | 8/1999 | Levy |
| 5,945,653 A | 8/1999 | Walker et al. |
| 5,946,664 A | 8/1999 | Ebisawa |
| 5,947,820 A | 9/1999 | Morro et al. |
| 5,948,061 A | 9/1999 | Merriman et al. |
| 5,949,042 A | 9/1999 | Dietz, II et al. |
| 5,950,173 A | 9/1999 | Perkowski |
| 5,951,397 A | 9/1999 | Dickinson |
| 5,952,638 A | 9/1999 | Demers et al. |
| 5,953,005 A | 9/1999 | Liu |
| 5,956,038 A | 9/1999 | Rekimoto |
| 5,956,695 A | 9/1999 | Carrithers et al. |
| 5,956,700 A | 9/1999 | Landry |
| 5,959,277 A | 9/1999 | Lucero |
| 5,966,685 A | 10/1999 | Flanagan et al. |
| 5,967,896 A | 10/1999 | Jorasch et al. |
| 5,969,318 A | 10/1999 | MacKenthun |
| 5,970,469 A | 10/1999 | Scroggie et al. |
| 5,970,470 A | 10/1999 | Walker |
| 5,971,277 A | 10/1999 | Cragun et al. |
| 5,974,135 A | 10/1999 | Breneman et al. |
| 5,974,398 A | 10/1999 | Hanson et al. |
| 5,974,412 A | 10/1999 | Hazlehurst et al. |
| 5,955,961 A | 11/1999 | Wallerstein |
| 5,978,777 A | 11/1999 | Gamier |
| 5,979,757 A | 11/1999 | Tracy et al. |
| 5,980,385 A | 11/1999 | Clapper |
| 5,982,520 A | 11/1999 | Weiser et al. |
| 5,983,196 A | 11/1999 | Wendkos |
| 5,983,205 A | 11/1999 | Brams et al. |
| 5,984,191 A | 11/1999 | Chapin, Jr. |
| 5,987,500 A | 11/1999 | Arunachalam |
| 5,988,500 A | 11/1999 | Litman |
| 5,991,376 A | 11/1999 | Hennessy et al. |
| 5,991,406 A | 11/1999 | Lipner et al. |
| 5,991,736 A | 11/1999 | Ferguson et al. |
| 5,992,738 A | 11/1999 | Matsumoto et al. |
| 5,992,752 A | 11/1999 | Wilz, Sr. et al. |
| 5,993,316 A | 11/1999 | Coyle |
| 5,995,942 A | 11/1999 | Smith et al. |
| 5,996,997 A | 12/1999 | Kamille |
| 5,999,624 A | 12/1999 | Hopkins |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,177 A | 12/1999 | Sudia |
| 6,009,411 A | 12/1999 | Kepecs |
| 6,009,412 A | 12/1999 | Storey |
| 6,009,458 A | 12/1999 | Hawkins |
| 6,012,039 A | 1/2000 | Hoffman et al. |
| 6,012,045 A | 1/2000 | Barzilai et al. |
| 6,012,051 A | 1/2000 | Sammon, Jr. et al. |
| 6,012,636 A | 1/2000 | Smith |
| 6,014,594 A | 1/2000 | Heidel |
| 6,014,634 A | 1/2000 | Scroggie et al. |
| 6,014,635 A | 1/2000 | Harris et al. |
| 6,015,344 A | 1/2000 | Kelly et al. |
| 6,016,476 A | 1/2000 | Maes et al. |
| 6,018,695 A | 1/2000 | Ahrens et al. |
| 6,018,718 A | 1/2000 | Walker et al. |
| 6,018,724 A | 1/2000 | Arent |

(56) References Cited

U.S. PATENT DOCUMENTS

| | | |
|---|---|---|
| 6,018,742 A | 1/2000 | Herbert, III |
| 6,021,399 A | 2/2000 | Demers et al. |
| 6,024,286 A | 2/2000 | Bradley et al. |
| 6,024,640 A | 2/2000 | Walker et al. |
| 6,026,370 A | 2/2000 | Jermyn |
| 6,026,375 A | 2/2000 | Hall et al. |
| 6,026,377 A | 2/2000 | Burke |
| 6,029,015 A | 2/2000 | Ishiguro |
| 6,030,288 A | 2/2000 | Davis et al. |
| 6,032,133 A | 2/2000 | Hilt et al. |
| 6,032,136 A | 2/2000 | Brake, Jr. et al. |
| 6,032,955 A | 3/2000 | Luciano et al. |
| 6,035,280 A | 3/2000 | Christensen |
| 6,035,281 A | 3/2000 | Crosskey et al. |
| 6,036,601 A | 3/2000 | Heckel |
| 6,038,321 A | 3/2000 | Torigai et al. |
| 6,039,244 A | 3/2000 | Finsterwald |
| 6,039,648 A | 3/2000 | Guinn |
| 6,041,308 A | 3/2000 | Walker et al. |
| 6,041,309 A | 3/2000 | Laor |
| 6,044,360 A | 3/2000 | Picciallo |
| 6,047,264 A | 4/2000 | Fisher et al. |
| 6,047,269 A | 4/2000 | Biffar |
| 6,048,269 A | 4/2000 | Burns |
| 6,049,778 A | 4/2000 | Walker et al. |
| 6,049,779 A | 4/2000 | Berkson |
| 6,052,469 A | 4/2000 | Johnson et al. |
| 6,052,670 A | 4/2000 | Johnson |
| 6,055,573 A | 4/2000 | Gardenswartz et al. |
| 6,058,371 A | 5/2000 | Dijan |
| 6,058,379 A | 5/2000 | Odom et al. |
| 6,058,482 A | 5/2000 | Liu |
| 6,061,448 A | 5/2000 | Smith et al. |
| 6,061,660 A | 5/2000 | Eggleston et al. |
| 6,062,980 A | 5/2000 | Luciano |
| 6,064,979 A | 5/2000 | Perkowski |
| 6,064,987 A | 5/2000 | Walker |
| 6,065,120 A | 5/2000 | Laursen et al. |
| 6,068,553 A | 5/2000 | Parker |
| 6,070,147 A | 5/2000 | Harms et al. |
| 6,072,468 A | 6/2000 | Hooker et al. |
| 6,072,870 A | 6/2000 | Nguyen et al. |
| 6,073,840 A | 6/2000 | Marion |
| 6,075,863 A | 6/2000 | Kirshnan et al. |
| 6,075,971 A | 6/2000 | Williams et al. |
| 6,076,101 A | 6/2000 | Kamakura et al. |
| 6,078,898 A | 6/2000 | Davis et al. |
| 6,081,900 A | 6/2000 | Subramaniam et al. |
| 6,085,176 A | 7/2000 | Woolston |
| 6,085,320 A | 7/2000 | Kaliski, Jr. |
| 6,088,730 A | 7/2000 | Kato et al. |
| 6,089,982 A | 7/2000 | Holch et al. |
| 6,092,069 A | 7/2000 | Johnson et al. |
| 6,092,201 A | 7/2000 | Turnbull et al. |
| 6,094,486 A | 7/2000 | Marchant |
| 6,098,837 A | 8/2000 | Izawa |
| 6,101,483 A | 8/2000 | Petrovich et al. |
| 6,101,484 A | 8/2000 | Halbert et al. |
| 6,101,485 A | 8/2000 | Fortenberry et al. |
| 6,104,815 A | 8/2000 | Alcorn et al. |
| 6,105,001 A | 8/2000 | Masi et al. |
| 6,105,008 A | 8/2000 | Davis et al. |
| 6,105,865 A | 8/2000 | Hardesty |
| 6,110,041 A | 8/2000 | Walker et al. |
| 6,110,042 A | 8/2000 | Walker et al. |
| 6,113,098 A | 9/2000 | Adams |
| 6,113,495 A | 9/2000 | Walker et al. |
| 6,115,737 A | 9/2000 | Ely et al. |
| 6,119,137 A | 9/2000 | Smith et al. |
| 6,119,229 A | 9/2000 | Martinez et al. |
| 6,119,230 A | 9/2000 | Carter |
| 6,124,947 A | 9/2000 | Sea |
| 6,126,542 A | 10/2000 | Fier |
| 6,128,599 A | 10/2000 | Walker et al. |
| 6,128,603 A | 10/2000 | Dent et al. |
| 6,129,274 A | 10/2000 | Suzuki |
| 6,131,810 A | 10/2000 | Weiss et al. |
| 6,134,318 A | 10/2000 | O'Neil |
| 6,134,533 A | 10/2000 | Shell |
| 6,134,548 A | 10/2000 | Gottsman et al. |
| 6,138,107 A | 10/2000 | Elgamal |
| 6,138,911 A | 10/2000 | Fredregill et al. |
| 6,139,431 A | 10/2000 | Walker et al. |
| 6,141,161 A | 10/2000 | Sato et al. |
| 6,141,653 A | 10/2000 | Conklin |
| 6,141,684 A | 10/2000 | McDonald et al. |
| 6,119,933 A | 11/2000 | Wong et al. |
| 6,144,984 A | 11/2000 | DeBenedictis et al. |
| 6,145,739 A | 11/2000 | Bertina et al. |
| 6,148,405 A | 11/2000 | Liao et al. |
| 6,151,589 A | 11/2000 | Aggarwal et al. |
| 6,154,214 A | 11/2000 | Uyehara et al. |
| 6,161,082 A | 12/2000 | Goldberg et al. |
| 6,161,096 A | 12/2000 | Bell |
| 6,162,122 A | 12/2000 | Acres |
| 6,163,771 A | 12/2000 | Walker et al. |
| 6,164,533 A | 12/2000 | Barton |
| 6,165,071 A | 12/2000 | Weiss |
| 6,168,522 B1 | 1/2001 | Walker |
| 6,173,267 B1 | 1/2001 | Cairns |
| 6,178,407 B1 | 1/2001 | Lotvin et al. |
| 6,178,408 B1 | 1/2001 | Copple et al. |
| 6,182,894 B1 | 2/2001 | Hackett et al. |
| 6,183,362 B1 | 2/2001 | Boushy |
| 6,183,366 B1 | 2/2001 | Goldberg et al. |
| 6,185,541 B1 | 2/2001 | Scroggie et al. |
| 6,185,545 B1 | 2/2001 | Resnick et al. |
| 6,186,893 B1 | 2/2001 | Walker et al. |
| 6,186,894 B1 | 2/2001 | Mayeroff |
| 6,189,103 B1 | 2/2001 | Nevarez et al. |
| 6,189,787 B1 | 2/2001 | Dorf |
| 6,190,256 B1 | 2/2001 | Walker et al. |
| 6,192,407 B1 | 2/2001 | Smith et al. |
| 6,193,608 B1 | 2/2001 | Walker et al. |
| 6,195,644 B1 | 2/2001 | Bowie |
| 6,195,677 B1 | 2/2001 | Utsumi |
| 6,196,458 B1 | 3/2001 | Walker et al. |
| 6,199,099 B1 | 3/2001 | Gershman et al. |
| 6,202,051 B1 | 3/2001 | Woolston |
| 6,205,418 B1 | 3/2001 | Li et al. |
| 6,205,553 B1 | 3/2001 | Stoffel et al. |
| 6,212,556 B1 | 4/2001 | Arunachalam |
| 6,216,129 B1 | 4/2001 | Eldering |
| 6,222,914 B1 | 4/2001 | McMullin |
| 6,224,483 B1 | 5/2001 | Mayeroff |
| 6,227,972 B1 | 5/2001 | Walker et al. |
| 6,229,533 B1 | 5/2001 | Farmer |
| 6,231,442 B1 | 5/2001 | Mayeroff |
| 6,234,896 B1 | 5/2001 | Walker et al. |
| 6,236,978 B1 | 5/2001 | Tuzhilin |
| 6,237,145 B1 | 5/2001 | Narasimhan et al. |
| 6,243,688 B1 | 6/2001 | Kalina |
| 6,243,691 B1 | 6/2001 | Fisher et al. |
| 6,244,958 B1 | 6/2001 | Acres |
| 6,246,996 B1 | 6/2001 | Stein et al. |
| 6,249,773 B1 | 6/2001 | Allard et al. |
| 6,266,647 B1 | 6/2001 | Fernandez |
| 6,266,653 B1 | 6/2001 | Shiobara et al. |
| 6,267,671 B1 | 7/2001 | Hogan |
| 6,273,820 B1 | 8/2001 | Haste, III |
| 6,275,789 B1 | 8/2001 | Moser et al. |
| 6,280,326 B1 | 8/2001 | Saunders |
| 6,280,328 B1 | 8/2001 | Holch et al. |
| 6,282,507 B1 | 8/2001 | Horiguchi et al. |
| 6,289,261 B1 | 9/2001 | Hiedel |
| 6,289,322 B1 | 9/2001 | Kitchen et al. |
| 6,292,769 B1 | 9/2001 | Flanagan et al. |
| 6,292,786 B1 | 9/2001 | Deaton et al. |
| 6,293,462 B1 | 9/2001 | Gangi |
| 6,293,865 B1 | 9/2001 | Kelly et al. |
| 6,293,866 B1 | 9/2001 | Walker et al. |
| 6,293,867 B1 | 9/2001 | Heidel |
| 6,298,335 B1 | 10/2001 | Bernstein |
| 6,301,554 B1 | 10/2001 | Christy |

(56) References Cited

U.S. PATENT DOCUMENTS

| | | |
|---|---|---|
| 6,302,793 B1 | 10/2001 | Fertitta, III et al. |
| 6,306,035 B1 | 10/2001 | Kelly et al. |
| 6,311,976 B1 | 11/2001 | Yoseloff et al. |
| 6,312,333 B1 | 11/2001 | Acres |
| 6,315,665 B1 | 11/2001 | Faith |
| 6,317,727 B1 | 11/2001 | May |
| 6,319,125 B1 | 11/2001 | Acres |
| 6,321,208 B1 | 11/2001 | Barnett et al. |
| 6,321,210 B1 | 11/2001 | O'Brien et al. |
| 6,326,985 B1 | 12/2001 | Tazoe et al. |
| 6,327,573 B1 | 12/2001 | Walker et al. |
| 6,330,543 B1 | 12/2001 | Kepecs |
| 6,332,099 B1 | 12/2001 | Heidel |
| 6,332,126 B1 | 12/2001 | Peirce et al. |
| 6,332,128 B1 | 12/2001 | Nicholson |
| 6,332,157 B1 | 12/2001 | Mighdoli et al. |
| 6,336,009 B1 | 1/2002 | Suzumi et al. |
| 6,336,098 B1 | 1/2002 | Fortenberry et al. |
| 6,336,105 B1 | 1/2002 | Conklin et al. |
| 6,341,353 B1 | 1/2002 | Herman |
| 6,345,261 B1 | 2/2002 | Feidelson et al. |
| 6,352,175 B2 | 3/2002 | Izawa |
| 6,353,811 B1 | 3/2002 | Weissman |
| 6,354,492 B1 | 3/2002 | Powell et al. |
| 6,358,149 B1 | 3/2002 | Schneider et al. |
| 6,363,337 B1 | 3/2002 | Amith |
| 6,363,362 B1 | 3/2002 | Burfield et al. |
| 6,375,073 B1 | 4/2002 | Aebi et al. |
| 6,379,247 B1 | 4/2002 | Walker et al. |
| 6,389,427 B1 | 5/2002 | Faulkner |
| 6,394,907 B1 | 5/2002 | Rowe |
| 6,402,029 B1 | 6/2002 | Gangi |
| 6,408,281 B1 | 6/2002 | Shell et al. |
| 6,408,284 B1 | 6/2002 | Hilt et al. |
| 6,415,270 B1 | 7/2002 | Rackson et al. |
| 6,421,653 B1 | 7/2002 | May |
| 6,431,983 B2 | 8/2002 | Acres |
| 6,438,527 B1 | 8/2002 | Powar |
| 6,446,048 B1 | 9/2002 | Wells et al. |
| 6,450,407 B1 | 9/2002 | Freeman et al. |
| 6,452,498 B2 | 9/2002 | Stewart |
| 6,460,015 B1 | 10/2002 | Hetherington et al. |
| 6,460,020 B1 | 10/2002 | Pool et al. |
| 6,463,404 B1 | 10/2002 | Appleby |
| 6,473,729 B1 | 10/2002 | Gastaldo et al. |
| 6,476,830 B1 | 11/2002 | Farmer |
| 6,484,147 B1 | 11/2002 | Brizendine et al. |
| 6,484,940 B1 | 11/2002 | Dilday et al. |
| 6,486,768 B1 | 11/2002 | French et al. |
| 6,491,584 B2 | 12/2002 | Graham |
| 6,505,772 B1 | 1/2003 | Mollett et al. |
| 6,507,813 B2 | 1/2003 | Veditz et al. |
| 6,510,418 B1 | 1/2003 | Case et al. |
| 6,510,998 B1 | 1/2003 | Stanford et al. |
| 6,511,377 B1 | 1/2003 | Weiss |
| 6,522,889 B1 | 2/2003 | Aarnio |
| 6,523,012 B1 | 2/2003 | Glassman et al. |
| 6,532,448 B1 | 3/2003 | Higginson et al. |
| 6,533,664 B1 | 3/2003 | Crumby |
| 6,571,241 B1 | 3/2003 | Nosohara |
| 6,547,131 B1 | 4/2003 | Foodman |
| 6,549,912 B1 | 4/2003 | Chen |
| 6,554,705 B1 | 4/2003 | Cumbers |
| 6,572,471 B1 | 6/2003 | Bennett |
| 6,574,239 B1 | 6/2003 | Dowling et al. |
| 6,575,832 B1 | 6/2003 | Manfredi et al. |
| 6,578,012 B1 | 6/2003 | Storey |
| 6,578,015 B1 | 6/2003 | Haseltine et al. |
| 6,579,179 B2 | 6/2003 | Poole et al. |
| 6,593,640 B1 | 7/2003 | Kalnitsky et al. |
| 6,594,640 B1 | 7/2003 | Postrel |
| 6,598,026 B1 | 7/2003 | Ojha et al. |
| 6,601,040 B1 | 7/2003 | Kolls |
| 6,607,136 B1 | 8/2003 | Atsmon et al. |
| 6,607,441 B1 | 8/2003 | Acres |
| 6,609,150 B2 | 8/2003 | Lee et al. |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,629,081 B1 | 9/2003 | Cornelius et al. |
| 6,629,890 B1 | 10/2003 | Johnson |
| 6,631,358 B1 | 10/2003 | Ogilvie |
| 6,631,849 B2 | 10/2003 | Blossom |
| 6,645,077 B2 | 11/2003 | Rowe |
| 6,647,373 B1 | 11/2003 | Carlton-Foss |
| 6,648,755 B1 | 11/2003 | Luciano, Jr. |
| 6,656,050 B2 | 12/2003 | Busch |
| 6,685,559 B2 | 2/2004 | Luciano |
| 6,687,679 B1 | 2/2004 | Van Luchene et al. |
| 6,704,713 B1 | 3/2004 | Brett |
| 6,721,743 B1 | 4/2004 | Sakakibara |
| 6,732,161 B1 | 4/2004 | Hess et al. |
| 6,748,365 B1 | 6/2004 | Quinlan et al. |
| 6,748,367 B1 | 6/2004 | Lee |
| 6,771,291 B1 | 8/2004 | DiStefano |
| 6,775,371 B2 | 8/2004 | Elsey et al. |
| 6,799,165 B1 | 9/2004 | Boesjes |
| 6,800,029 B2 | 10/2004 | Rowe |
| 6,813,609 B2 | 11/2004 | Wilson |
| 6,820,061 B2 | 11/2004 | Postrel |
| 6,824,066 B2 | 11/2004 | Weyant |
| 6,824,464 B2 | 11/2004 | Weil et al. |
| 6,826,594 B1 | 11/2004 | Pettersen |
| 6,829,586 B2 | 12/2004 | Postrel |
| 6,837,436 B2 | 1/2005 | Swartz et al. |
| 6,842,739 B2 | 1/2005 | Postrel |
| 6,843,720 B2 | 1/2005 | Luciano |
| 6,846,238 B2 | 1/2005 | Wells |
| 6,852,031 B1 | 2/2005 | Rowe |
| 6,856,976 B2 | 2/2005 | Bible et al. |
| 6,857,022 B1 | 2/2005 | Scanlan |
| 6,857,961 B2 | 2/2005 | Soltys et al. |
| 6,865,547 B1 | 3/2005 | Brake et al. |
| 6,866,586 B2 | 3/2005 | Oberberger |
| 6,876,979 B2 | 4/2005 | Ling |
| 6,892,938 B2 | 5/2005 | Solomon |
| 6,895,386 B1 | 5/2005 | Bachman et al. |
| 6,898,570 B1 | 5/2005 | Tedesco et al. |
| 6,915,271 B1 | 7/2005 | Meyer et al. |
| 6,920,611 B1 | 7/2005 | Spaeth et al. |
| 6,929,550 B2 | 8/2005 | Hisada |
| 6,931,538 B1 | 8/2005 | Sawaguchi |
| 6,947,898 B2 | 9/2005 | Postrel |
| 6,951,302 B2 | 10/2005 | Potts |
| 6,985,876 B1 | 1/2006 | Lee |
| 6,997,807 B2 | 2/2006 | Weiss |
| 7,003,496 B2 | 2/2006 | Ishii |
| 7,013,357 B2 | 3/2006 | Murdock et al. |
| 7,021,531 B2 | 4/2006 | Myttenaere |
| 7,025,674 B2 | 4/2006 | Adams et al. |
| 7,032,817 B2 | 4/2006 | Blank |
| 7,043,752 B2 | 5/2006 | Royer et al. |
| 7,072,864 B2 | 7/2006 | Brake, Jr. et al. |
| 7,076,453 B2 | 7/2006 | Jammes et al. |
| 7,096,190 B2 | 8/2006 | Postrel |
| 7,124,109 B2 | 10/2006 | Sakamoto et al. |
| 7,127,236 B2 | 10/2006 | Khan et al. |
| 7,127,414 B1 | 10/2006 | Awadallah et al. |
| 7,128,652 B1 | 10/2006 | Lavoie |
| 7,130,828 B2 | 10/2006 | Phillips et al. |
| 7,134,087 B2 | 11/2006 | Bushold et al. |
| 7,134,959 B2 | 11/2006 | Penrice |
| 7,137,883 B1 | 11/2006 | Falciglia |
| 7,146,342 B1 | 12/2006 | Angelin |
| 7,152,042 B1 | 12/2006 | Arkes |
| 7,154,481 B2 | 12/2006 | Cross et al. |
| 7,156,738 B2 | 1/2007 | Rowe |
| 7,163,145 B2 | 1/2007 | Cohagan et al. |
| 7,168,089 B2 | 1/2007 | Nguyen |
| 7,174,029 B2 | 2/2007 | Agostinelli et al. |
| 7,174,315 B2 | 2/2007 | Phillips et al. |
| 7,174,563 B1 | 2/2007 | Brownlie et al. |
| 7,187,947 B1 | 3/2007 | White et al. |

(56) References Cited

U.S. PATENT DOCUMENTS

| | | |
|---|---|---|
| 7,200,571 B1 | 4/2007 | Jenniges et al. |
| 7,201,660 B2 | 4/2007 | Kiely et al. |
| 7,206,768 B1 | 4/2007 | deGroeve et al. |
| 7,209,733 B2 | 4/2007 | Ortiz et al. |
| 7,212,279 B1 | 5/2007 | Feng |
| 7,239,226 B2 | 7/2007 | Berardi et al. |
| 7,249,139 B2 | 7/2007 | Chuah |
| 7,249,197 B1 | 7/2007 | Roestenburg et al. |
| 7,289,970 B1 | 10/2007 | Siegel |
| 7,290,061 B2 | 10/2007 | Lentini et al. |
| 7,291,064 B2 | 11/2007 | Yamada |
| 7,296,282 B1 | 11/2007 | Koplar et al. |
| 7,298,226 B2 | 11/2007 | Shanbhag et al. |
| 7,300,351 B2 | 11/2007 | Thomas |
| 7,315,823 B2 | 1/2008 | Brondrup |
| 7,321,901 B1 | 1/2008 | Blinn et al. |
| 7,329,185 B2 | 2/2008 | Conover et al. |
| 7,329,187 B1 | 2/2008 | Holch et al. |
| 7,341,518 B2 | 3/2008 | Muskin |
| 7,349,867 B2 | 3/2008 | Rollins et al. |
| 7,360,693 B1 | 4/2008 | Sullivan |
| 7,360,699 B2 | 4/2008 | Cohagan et al. |
| 7,376,538 B1 | 4/2008 | Eatough |
| 7,387,571 B2 | 6/2008 | Walker |
| 7,390,264 B2 | 6/2008 | Walker |
| 7,398,225 B2 | 7/2008 | Voltmer et al. |
| 7,398,226 B2 | 7/2008 | Haines et al. |
| 7,410,422 B2 | 8/2008 | Fine |
| 7,424,411 B2 | 9/2008 | Ito |
| 7,424,617 B2 | 9/2008 | Boyd et al. |
| 7,430,522 B2 | 9/2008 | Nakajima |
| 7,428,498 B2 | 11/2008 | Voltmer et al. |
| 7,455,586 B2 | 11/2008 | Nguyen |
| 7,461,022 B1 | 12/2008 | Churchill et al. |
| 7,467,096 B2 | 12/2008 | Antonucci et al. |
| 7,496,524 B2 | 2/2009 | Voltmer et al. |
| 7,503,487 B2 | 3/2009 | Cohagan et al. |
| 7,562,810 B2 | 7/2009 | Rao et al. |
| 7,593,866 B2 | 9/2009 | Grove et al. |
| 7,599,881 B2 | 10/2009 | Likourezos et al. |
| 7,606,730 B2 | 10/2009 | Antonucci et al. |
| 7,610,244 B2 | 10/2009 | Likourezos et al. |
| 7,613,628 B2 | 11/2009 | Ariff et al. |
| 7,613,629 B2 | 11/2009 | Antonucci et al. |
| 7,618,324 B2 | 11/2009 | Gatto et al. |
| 7,627,528 B2 | 12/2009 | Likourezos et al. |
| 7,636,674 B2 | 12/2009 | Francis |
| 7,636,874 B2 | 12/2009 | Gutbrod et al. |
| 7,641,547 B2 | 1/2010 | Walker et al. |
| 7,677,968 B2 | 3/2010 | Schultz et al. |
| 7,680,688 B2 | 3/2010 | Hessburg et al. |
| 7,682,245 B2 | 3/2010 | Nguyen |
| 7,686,218 B2 | 3/2010 | Hessburg et al. |
| 7,690,998 B2 | 4/2010 | Okada |
| 7,698,185 B2 | 4/2010 | Hofer |
| 7,703,673 B2 | 4/2010 | Buchheit et al. |
| 7,716,085 B2 | 5/2010 | Stier |
| 7,729,950 B2 | 6/2010 | Mendizabal et al. |
| 7,747,463 B1 | 6/2010 | Phillips et al. |
| 7,753,781 B2 | 7/2010 | Storch |
| 7,762,886 B2 | 7/2010 | Pfennighausen et al. |
| 7,765,124 B2 | 7/2010 | Postrel |
| 7,775,872 B2 | 8/2010 | Bleich et al. |
| 7,788,160 B2 | 8/2010 | Srinivasamurthy |
| 7,771,278 B1 | 10/2010 | Muskin |
| 7,813,955 B2 | 10/2010 | Ariff et al. |
| 7,815,506 B2 | 10/2010 | Franklin et al. |
| 7,827,056 B2 | 11/2010 | Walker et al. |
| 7,827,057 B1 | 11/2010 | Walker et al. |
| 7,828,206 B2 | 11/2010 | Hessburg et al. |
| 7,828,652 B2 | 11/2010 | Nguyen |
| 7,835,977 B2 | 11/2010 | Singh et al. |
| 7,853,486 B2 | 12/2010 | Grove et al. |
| 7,856,376 B2 | 12/2010 | Storey |
| 7,856,377 B2 | 12/2010 | Cohagan et al. |
| 7,860,749 B2 | 12/2010 | Subramanian |
| 7,867,079 B2 | 1/2011 | Govender et al. |
| 7,867,081 B2 | 1/2011 | Schneider et al. |
| 7,870,058 B2 | 1/2011 | Maltzman |
| 7,873,562 B2 | 1/2011 | Maltzman |
| 7,877,313 B2 | 1/2011 | Singh |
| 7,886,011 B2 | 2/2011 | Buchheit |
| 7,895,115 B2 | 2/2011 | Bayyapu et al. |
| 7,895,118 B2 | 2/2011 | Glodjo et al. |
| 7,921,052 B2 | 4/2011 | Dabney et al. |
| 7,925,533 B2 | 4/2011 | Shaw et al. |
| 7,950,996 B2 | 5/2011 | Nguyen |
| 7,970,689 B2 | 6/2011 | Glodjo et al. |
| 7,963,843 B2 | 7/2011 | Martin et al. |
| 7,980,466 B2 | 7/2011 | Lee et al. |
| 7,988,553 B2 | 8/2011 | Kastner et al. |
| 7,996,262 B2 | 8/2011 | Urban |
| 7,996,486 B2 | 8/2011 | Lambert |
| 8,001,007 B2 | 8/2011 | Grove et al. |
| 8,005,714 B2 | 8/2011 | Shaw et al. |
| 8,005,719 B2 | 8/2011 | Grove et al. |
| 8,012,009 B2 | 9/2011 | Iddings et al. |
| 8,015,103 B2 | 9/2011 | Watt, II et al. |
| 8,019,679 B2 | 9/2011 | Bennett et al. |
| 8,020,181 B2 | 9/2011 | Koplar et al. |
| 7,993,198 B2 | 10/2011 | Walker et al. |
| 7,993,199 B2 | 10/2011 | Iddings et al. |
| 8,046,256 B2 | 10/2011 | Chien et al. |
| 8,024,220 B2 | 11/2011 | Ariff et al. |
| 8,050,968 B2 | 11/2011 | Antonucci et al. |
| 8,052,518 B1 | 11/2011 | Kelly et al. |
| 8,062,116 B2 | 11/2011 | Lutnick et al. |
| 8,065,182 B2 | 11/2011 | Voltmer et al. |
| 8,075,394 B2 | 12/2011 | Okada et al. |
| 8,079,905 B2 | 12/2011 | Nguyen |
| 8,095,428 B2 | 1/2012 | Penagulur et al. |
| 8,095,449 B2 | 1/2012 | Cui et al. |
| 8,100,758 B2 | 1/2012 | Walker et al. |
| 8,112,303 B2 | 2/2012 | Eglen et al. |
| 8,123,127 B2 | 2/2012 | McGhie et al. |
| 8,125,216 B2 | 2/2012 | Thomas et al. |
| 8,126,799 B2 | 2/2012 | Kellam et al. |
| 8,135,644 B2 | 3/2012 | Rowe |
| 8,137,181 B2 | 3/2012 | Bleich et al. |
| 8,160,933 B2 | 4/2012 | Nguyen et al. |
| 8,162,209 B2 | 4/2012 | Buchheit et al. |
| 8,180,671 B2 | 5/2012 | Cohagan et al. |
| 8,181,863 B1 | 5/2012 | McGhie et al. |
| 8,181,864 B1 | 5/2012 | McGhie et al. |
| 8,182,333 B2 | 5/2012 | Pacey |
| 8,182,340 B2 | 5/2012 | Korp |
| 8,182,344 B2 | 5/2012 | Bleich et al. |
| 8,186,583 B1 | 5/2012 | McGhie et al. |
| 8,199,742 B1 | 6/2012 | Croak et al. |
| 8,200,547 B2 | 6/2012 | Daman et al. |
| 8,200,553 B1 | 6/2012 | Hermreck et al. |
| 8,201,734 B2 | 6/2012 | McGhie et al. |
| 8,214,264 B2 | 7/2012 | Kasavin et al. |
| 8,234,162 B2 | 7/2012 | Lavin et al. |
| 8,234,163 B2 | 7/2012 | Shaw et al. |
| 8,234,164 B2 | 7/2012 | Walker et al. |
| 8,234,379 B2 | 7/2012 | Young et al. |
| 8,239,258 B2 | 8/2012 | Urban |
| 8,239,260 B2 | 8/2012 | Lavin et al. |
| 8,239,280 B1 | 8/2012 | Feinberg et al. |
| 8,239,487 B1 | 8/2012 | Hoffman et al. |
| 8,245,925 B2 | 8/2012 | McGhie et al. |
| 8,265,993 B2 | 9/2012 | Chien et al. |
| 8,267,315 B1 | 9/2012 | McGhie et al. |
| 8,282,490 B2 | 10/2012 | Arezina et al. |
| 8,292,741 B2 | 10/2012 | Burman et al. |
| 8,297,502 B2 | 10/2012 | McGhie et al. |
| 8,298,074 B1 | 10/2012 | Gibase et al. |
| 8,313,023 B1 | 11/2012 | McGhie et al. |
| 8,332,290 B1 | 12/2012 | Venturo et al. |
| 8,342,399 B1 | 1/2013 | McGhie et al. |
| 8,352,370 B1 | 1/2013 | White et al. |
| 8,360,838 B2 | 1/2013 | Nguyen |
| 8,364,556 B2 | 1/2013 | Nguyen et al. |

(56) References Cited

U.S. PATENT DOCUMENTS

| | | |
|---|---|---|
| 8,370,212 B2 | 2/2013 | Asher et al. |
| 8,380,849 B2 | 2/2013 | Lambert |
| 8,386,330 B1 | 2/2013 | Kulavade et al. |
| 8,407,083 B2 | 3/2013 | Bortolin et al. |
| 8,407,089 B2 | 3/2013 | Trively |
| 8,423,401 B2 | 4/2013 | Antonucci et al. |
| 8,429,024 B1 | 4/2013 | Hermreck et al. |
| 8,433,607 B2 | 4/2013 | MacLean et al. |
| 8,433,609 B2 | 4/2013 | Abhyanker et al. |
| 8,452,645 B2 | 5/2013 | Steinkamp et al. |
| 8,452,687 B2 | 5/2013 | Rowe |
| 8,458,048 B2 | 6/2013 | Arkes |
| 8,478,657 B2 | 7/2013 | Lee |
| 8,484,186 B1 | 7/2013 | Kapczynski et al. |
| 8,489,449 B2 | 7/2013 | Teicher |
| 8,511,550 B1 | 7/2013 | McGhie et al. |
| 8,523,063 B1 | 8/2013 | McGhie et al. |
| 8,523,064 B1 | 8/2013 | McGhie et al. |
| 8,540,152 B1 | 9/2013 | McGhie et al. |
| 2001/0007099 A1 | 7/2001 | Rau et al. |
| 2001/0009005 A1 | 7/2001 | Godin et al. |
| 2001/0012219 A1 | 8/2001 | Lee et al. |
| 2001/0023407 A1 | 9/2001 | Liyanearachchi et al. |
| 2001/0027436 A1 | 10/2001 | Tenembaum |
| 2001/0029455 A1 | 10/2001 | Chin et al. |
| 2001/0032137 A1 | 10/2001 | Bennett et al. |
| 2001/0032164 A1 | 10/2001 | Kim |
| 2001/0032182 A1 | 10/2001 | Kumar et al. |
| 2001/0032183 A1 | 10/2001 | Landry |
| 2001/0032878 A1 | 10/2001 | Tsiounis et al. |
| 2001/0034259 A1 | 10/2001 | Luciano et al. |
| 2001/0034649 A1 | 10/2001 | Acres |
| 2001/0034653 A1 | 10/2001 | Yamamoto |
| 2001/0034663 A1 | 10/2001 | Teveler et al. |
| 2001/0034720 A1 | 10/2001 | Armes |
| 2001/0037295 A1 | 11/2001 | Olsen |
| 2001/0039531 A1 | 11/2001 | Aoki |
| 2001/0039644 A1 | 11/2001 | Le Coz |
| 2001/0041610 A1 | 11/2001 | Luciano et al. |
| 2001/0044337 A1 | 11/2001 | Rowe |
| 2001/0046891 A1 | 11/2001 | Acres |
| 2001/0047308 A1 | 11/2001 | Kaminsky |
| 2001/0047342 A1 | 11/2001 | Cuervo |
| 2001/0049628 A1 | 12/2001 | Icho |
| 2001/0049647 A1 | 12/2001 | Sheehan et al. |
| 2001/0054003 A1 | 12/2001 | Chien et al. |
| 2001/0054006 A1 | 12/2001 | Lee et al. |
| 2001/0054010 A1 | 12/2001 | Bernabeo et al. |
| 2002/0002075 A1 | 1/2002 | Rowe |
| 2002/0002532 A1 | 1/2002 | Tso |
| 2002/0002538 A1 | 1/2002 | Ling |
| 2002/0010025 A1 | 1/2002 | Kelly et al. |
| 2002/0013728 A1 | 1/2002 | Wilkman |
| 2002/0013767 A1 | 1/2002 | Katz |
| 2002/0013774 A1 | 1/2002 | Morimoto |
| 2002/0016734 A1 | 2/2002 | McGill et al. |
| 2002/0020965 A1 | 2/2002 | Potter |
| 2002/0022743 A1 | 2/2002 | Jamieson et al. |
| 2002/0026348 A1 | 2/2002 | Fowler et al. |
| 2002/0026423 A1 | 2/2002 | Maritzen et al. |
| 2002/0029339 A1 | 3/2002 | Rowe |
| 2002/0038282 A1 | 3/2002 | Montgomery |
| 2002/0039923 A1 | 4/2002 | Cannon |
| 2002/0040344 A1 | 4/2002 | Preiser et al. |
| 2002/0041556 A1 | 4/2002 | Tsukamoto |
| 2002/0042835 A1 | 4/2002 | Pepin et al. |
| 2002/0045476 A1 | 4/2002 | Poole |
| 2002/0046110 A1 | 4/2002 | Gallagher |
| 2002/0046137 A1 | 4/2002 | Odom et al. |
| 2002/0046157 A1 | 4/2002 | Solomon |
| 2002/0049631 A1 | 4/2002 | Williams |
| 2002/0049664 A1 | 4/2002 | Hoffman et al. |
| 2002/0052940 A1 | 5/2002 | Myers et al. |
| 2002/0055874 A1 | 5/2002 | Cohen |
| 2002/0056044 A1 | 5/2002 | Andersson |
| 2002/0059103 A1 | 5/2002 | Anderson et al. |
| 2002/0062253 A1 | 5/2002 | Dosh et al. |
| 2002/0065126 A1 | 5/2002 | Miller et al. |
| 2002/0068624 A1 | 6/2002 | Ellis |
| 2002/0069109 A1 | 6/2002 | Wendkos |
| 2002/0069134 A1 | 6/2002 | Solomon |
| 2002/0069150 A1 | 6/2002 | Ni |
| 2002/0069184 A1 | 6/2002 | Tilly et al. |
| 2002/0072412 A1 | 6/2002 | Young |
| 2002/0073111 A1 | 6/2002 | Heyliger |
| 2002/0075844 A1 | 6/2002 | Hagen |
| 2002/0077173 A1 | 6/2002 | Luciano et al. |
| 2002/0077890 A1 | 6/2002 | Forsythe et al. |
| 2002/0077978 A1 | 6/2002 | O'Leary et al. |
| 2002/0082918 A1 | 6/2002 | Warwick |
| 2002/0082920 A1 | 6/2002 | Austin |
| 2002/0082953 A1 | 6/2002 | Batham et al. |
| 2002/0082977 A1 | 6/2002 | Hammond et al. |
| 2002/0082990 A1 | 6/2002 | Jones |
| 2002/0086733 A1 | 7/2002 | Wang |
| 2002/0087468 A1 | 7/2002 | Ganesan et al. |
| 2002/0091580 A1 | 7/2002 | Wang |
| 2002/0091593 A1 | 7/2002 | Fowler |
| 2002/0095365 A1 | 7/2002 | Slavin et al. |
| 2002/0099562 A1 | 7/2002 | Bruce et al. |
| 2002/0099656 A1 | 7/2002 | Poh |
| 2002/0107072 A1 | 8/2002 | Giobbi |
| 2002/0107733 A1 | 8/2002 | Liu et al. |
| 2002/0111210 A1 | 8/2002 | Luciano, Jr. |
| 2002/0111889 A1 | 8/2002 | Buxton et al. |
| 2002/0111907 A1 | 8/2002 | Ling |
| 2002/0111919 A1 | 8/2002 | Weller et al. |
| 2002/0112174 A1 | 8/2002 | Moratti et al. |
| 2002/0116257 A1 | 8/2002 | Helbig |
| 2002/0120513 A1 | 8/2002 | Webb et al. |
| 2002/0120548 A1 | 8/2002 | Etkin |
| 2002/0120554 A1 | 8/2002 | Vega |
| 2002/0123949 A1 | 9/2002 | VanLeeuwen |
| 2002/0123959 A1 | 9/2002 | Mozley et al. |
| 2002/0131565 A1 | 9/2002 | Scheuring et al. |
| 2002/0143612 A1 | 10/2002 | Bank et al. |
| 2002/0143614 A1 | 10/2002 | Clarkin et al. |
| 2002/0146018 A1 | 10/2002 | Kailamaki et al. |
| 2002/0147047 A1 | 10/2002 | Letovsky |
| 2002/0147655 A1 | 10/2002 | Say |
| 2002/0151359 A1 | 10/2002 | Rowe |
| 2002/0152116 A1 | 10/2002 | Yan |
| 2002/0160838 A1 | 10/2002 | Kim |
| 2002/0161630 A1 | 10/2002 | Kern et al. |
| 2002/0169021 A1 | 11/2002 | Urie |
| 2002/0169660 A1 | 11/2002 | Taylor et al. |
| 2002/0174031 A1 | 11/2002 | Weiss |
| 2002/0174050 A1 | 11/2002 | Eynard et al. |
| 2002/0177479 A1 | 11/2002 | Walker |
| 2002/0194069 A1 | 12/2002 | Thakur et al. |
| 2002/0198043 A1 | 12/2002 | Chowdhry |
| 2003/0003996 A1 | 1/2003 | Nguyen |
| 2003/0004802 A1 | 1/2003 | Callegari |
| 2003/0004808 A1 | 1/2003 | Elhaossine et al. |
| 2003/0004809 A1 | 1/2003 | Palcic et al. |
| 2003/0004871 A1 | 1/2003 | Rowe |
| 2003/0008707 A1 | 1/2003 | Walker et al. |
| 2003/0009379 A1 | 1/2003 | Narasimhan et al. |
| 2003/0013438 A1 | 1/2003 | Darby |
| 2003/0014350 A1 | 1/2003 | Duell et al. |
| 2003/0018523 A1 | 1/2003 | Rappaport et al. |
| 2003/0018885 A1 | 1/2003 | Landsman et al. |
| 2003/0022719 A1 | 1/2003 | Donald et al. |
| 2003/0030964 A1 | 2/2003 | Asao et al. |
| 2003/0032474 A1 | 2/2003 | Kaminkow |
| 2003/0033534 A1 | 2/2003 | Rand |
| 2003/0036425 A1 | 2/2003 | Kaminkow et al. |
| 2003/0040964 A1 | 2/2003 | Lacek |
| 2003/0045353 A1 | 3/2003 | Paulsen |
| 2003/0050831 A1 | 3/2003 | Klayh |
| 2003/0050861 A1 | 3/2003 | Martin et al. |
| 2003/0055722 A1 | 3/2003 | Perreault et al. |
| 2003/0055780 A1 | 3/2003 | Hansen et al. |
| 2003/0060264 A1 | 3/2003 | Chilton |

(56) References Cited

U.S. PATENT DOCUMENTS

| | | |
|---|---|---|
| 2003/0061097 A1 | 3/2003 | Walker |
| 2003/0062242 A1 | 4/2003 | Hallowell et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0078094 A1 | 4/2003 | Gatto |
| 2003/0083943 A1 | 5/2003 | Adams et al. |
| 2003/0083952 A1 | 5/2003 | Simpson et al. |
| 2003/0087650 A1 | 5/2003 | Aarnio |
| 2003/0087692 A1 | 5/2003 | Weiss |
| 2003/0101131 A1 | 5/2003 | Warren et al. |
| 2003/0104862 A1 | 6/2003 | Acres |
| 2003/0104865 A1 | 6/2003 | Itkis |
| 2003/0105705 A1 | 6/2003 | Eyre |
| 2003/0106769 A1 | 6/2003 | Weiss |
| 2003/0110047 A1 | 6/2003 | Santosuosso et al. |
| 2003/0115456 A1 | 6/2003 | Kapoor |
| 2003/0126013 A1 | 6/2003 | Shand |
| 2003/0130927 A1 | 7/2003 | Beck et al. |
| 2003/0130948 A1 | 7/2003 | Algiene et al. |
| 2003/0139975 A1 | 7/2003 | Perkowski |
| 2003/0148807 A1 | 8/2003 | Acres |
| 2003/0149619 A1 | 8/2003 | Stanley et al. |
| 2003/0163425 A1 | 8/2003 | Cannon, Jr. |
| 2003/0167213 A1 | 9/2003 | Jammer et al. |
| 2003/0182218 A1 | 9/2003 | Blagg |
| 2003/0186747 A1 | 10/2003 | Nguyen |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0211883 A1 | 11/2003 | Potts |
| 2003/0216960 A1 | 11/2003 | Postrel |
| 2003/0216967 A1 | 11/2003 | Williams |
| 2003/0217002 A1 | 11/2003 | Enborg |
| 2003/0228902 A1 | 12/2003 | Walker |
| 2003/0229584 A1 | 12/2003 | Brown |
| 2003/0236704 A1 | 12/2003 | Antonucci |
| 2003/0236749 A1 | 12/2003 | Shergalis |
| 2004/0002369 A1 | 1/2004 | Walker et al. |
| 2004/0006531 A1 | 1/2004 | Kwan |
| 2004/0015438 A1 | 1/2004 | Compiano et al. |
| 2004/0019522 A1 | 1/2004 | Bortolin |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0043806 A1 | 3/2004 | Kirby |
| 2004/0048658 A1 | 3/2004 | Sanders |
| 2004/0049423 A1 | 3/2004 | Kawashima et al. |
| 2004/0049439 A1 | 3/2004 | Johnston et al. |
| 2004/0053693 A1 | 3/2004 | An |
| 2004/0068438 A1 | 4/2004 | Mitchell |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |
| 2004/0111346 A1 | 6/2004 | Mcbeath |
| 2004/0111366 A1 | 6/2004 | Schneider |
| 2004/0122736 A1 | 6/2004 | Bressler et al. |
| 2004/0128197 A1 | 7/2004 | Barn |
| 2004/0143500 A1 | 7/2004 | Lopez |
| 2004/0143501 A1 | 7/2004 | Lopez |
| 2004/0158492 A1 | 8/2004 | Lopez |
| 2004/0173673 A1 | 9/2004 | Potts |
| 2004/0186773 A1 | 9/2004 | George et al. |
| 2004/0199421 A1 | 10/2004 | Kurie et al. |
| 2004/0204990 A1 | 10/2004 | Lee et al. |
| 2004/0204991 A1 | 10/2004 | Monahan et al. |
| 2004/0215505 A1 | 10/2004 | Sullivan |
| 2004/0220854 A1 | 11/2004 | Postrel |
| 2004/0229671 A1 | 11/2004 | Stronach |
| 2004/0262381 A1 | 12/2004 | Mesaros |
| 2005/0000280 A1 | 1/2005 | Foster et al. |
| 2005/0015332 A1 | 1/2005 | Chen |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnson et al. |
| 2005/0043082 A1 | 2/2005 | Peterson |
| 2005/0043992 A1 | 2/2005 | Cohagan et al. |
| 2005/0060225 A1 | 3/2005 | Postrel |
| 2005/0060455 A1 | 3/2005 | Murdock et al. |
| 2005/0071228 A1 | 3/2005 | Bortolin et al. |
| 2005/0143174 A1 | 3/2005 | Goldman |
| 2005/0080727 A1 | 4/2005 | Postrel |
| 2005/0080728 A1 | 4/2005 | Sobek |
| 2005/0080748 A1 | 4/2005 | Belobaba et al. |
| 2005/0096124 A1 | 5/2005 | Stronach |
| 2005/0102151 A1 | 5/2005 | Fuwa et al. |
| 2005/0107155 A1 | 5/2005 | Potts et al. |
| 2005/0137015 A1 | 6/2005 | Rogers |
| 2005/0149394 A1 | 7/2005 | Postrel |
| 2005/0177428 A1 | 8/2005 | Ganz |
| 2005/0177503 A1 | 8/2005 | Thomas |
| 2005/0177519 A1 | 8/2005 | Block |
| 2005/0182693 A1 | 8/2005 | Alivandi |
| 2005/0192864 A1 | 9/2005 | Ganz |
| 2005/0197904 A1 | 9/2005 | Baron et al. |
| 2005/0240392 A1 | 10/2005 | Munro et al. |
| 2005/0240472 A1 | 10/2005 | Postrel |
| 2005/0250415 A1 | 11/2005 | Barthold |
| 2005/0261056 A1 | 11/2005 | Smolucha |
| 2005/0267800 A1 | 12/2005 | Tietzen et al. |
| 2005/0284930 A1 | 12/2005 | Hefner et al. |
| 2005/0288998 A1 | 12/2005 | Venkiteswaran |
| 2006/0004629 A1 | 1/2006 | Neemann et al. |
| 2006/0010033 A1 | 1/2006 | Thomas |
| 2006/0015404 A1 | 1/2006 | Tran |
| 2006/0020511 A1 | 1/2006 | Postrel |
| 2006/0035692 A1 | 2/2006 | Kirby |
| 2006/0046827 A1 | 3/2006 | Saffari et al. |
| 2006/0052150 A1 | 3/2006 | Hedrick et al. |
| 2006/0063580 A1 | 3/2006 | Nguyen |
| 2006/0063587 A1 | 3/2006 | Manzo |
| 2006/0079150 A1 | 4/2006 | Filoseta |
| 2006/0089874 A1 | 4/2006 | George et al. |
| 2006/0100018 A1 | 5/2006 | Ganz |
| 2006/0136301 A1 | 6/2006 | Grovit |
| 2006/0148559 A1 | 7/2006 | Jordan |
| 2006/0148566 A1 | 7/2006 | Lakshminarasimha |
| 2006/0178217 A1 | 8/2006 | Jung |
| 2006/0178899 A1 | 8/2006 | Jung |
| 2006/0178964 A1 | 8/2006 | Jung |
| 2006/0178965 A1 | 8/2006 | Jung |
| 2006/0178966 A1 | 8/2006 | Jung |
| 2006/0178967 A1 | 8/2006 | Jung |
| 2006/0178968 A1 | 8/2006 | Jung |
| 2006/0178970 A1 | 8/2006 | Jung |
| 2006/0178972 A1 | 8/2006 | Jung |
| 2006/0178975 A1 | 8/2006 | Jung |
| 2006/0178985 A1 | 8/2006 | Jung |
| 2006/0195331 A1 | 8/2006 | Cluts et al. |
| 2006/0195376 A1 | 8/2006 | Jung |
| 2006/0195377 A1 | 8/2006 | Jung |
| 2006/0195378 A1 | 8/2006 | Jung |
| 2006/0195394 A1 | 8/2006 | Jung |
| 2006/0205481 A1 | 9/2006 | Dominelli |
| 2006/0224505 A1 | 10/2006 | Jung |
| 2006/0229976 A1 | 10/2006 | Jung |
| 2006/0248007 A1 | 11/2006 | Frieden et al. |
| 2006/0253321 A1 | 11/2006 | Heywood |
| 2006/0253329 A1 | 11/2006 | Ariff et al. |
| 2006/0259326 A1 | 11/2006 | Ambekar et al. |
| 2006/0259364 A1 | 11/2006 | Bressler et al. |
| 2006/0277103 A1 | 12/2006 | Fujita et al. |
| 2006/0281541 A1 | 12/2006 | Nguyen et al. |
| 2006/0287898 A1 | 12/2006 | Murashita et al. |
| 2007/0038515 A1 | 2/2007 | Postrel |
| 2007/0055440 A1 | 3/2007 | Denker et al. |
| 2007/0073582 A1 | 3/2007 | Jung |
| 2007/0078719 A1 | 4/2007 | Filak et al. |
| 2007/0087822 A1 | 4/2007 | Van Luchene |
| 2007/0192187 A1 | 4/2007 | Becker et al. |

(56) References Cited

U.S. PATENT DOCUMENTS

| | | |
|---|---|---|
| 2007/0112631 A1 | 5/2007 | Voltmer et al. |
| 2007/0112632 A1 | 5/2007 | Voltmer et al. |
| 2007/0112643 A1 | 5/2007 | Veres et al. |
| 2007/0118461 A1 | 5/2007 | Arkes et al. |
| 2007/0124204 A1 | 5/2007 | Boer et al. |
| 2007/0129955 A1 | 6/2007 | Dalmia et al. |
| 2007/0143155 A1 | 6/2007 | Whitsett et al. |
| 2007/0167218 A1 | 7/2007 | Rothschild |
| 2007/0168266 A1 | 7/2007 | Questembert |
| 2007/0179839 A1 | 8/2007 | Neemann et al. |
| 2007/0179844 A1 | 8/2007 | Brannon et al. |
| 2007/0179850 A1 | 8/2007 | Ganjon et al. |
| 2007/0198335 A1 | 8/2007 | Edwards et al. |
| 2007/0219869 A1 | 9/2007 | Ariff et al. |
| 2007/0219924 A1 | 9/2007 | Shea et al. |
| 2007/0226074 A1 | 9/2007 | Ariff et al. |
| 2007/0239523 A1 | 10/2007 | Yi |
| 2007/0259709 A1 | 11/2007 | Kelly et al. |
| 2007/0265920 A1 | 11/2007 | Bistriceanu et al. |
| 2007/0276730 A1 | 11/2007 | Ahmed et al. |
| 2008/0021784 A1 | 1/2008 | Hessburg et al. |
| 2008/0021785 A1 | 1/2008 | Hessburg et al. |
| 2008/0040239 A1 | 2/2008 | Jacobi et al. |
| 2008/0077498 A1 | 3/2008 | Ariff et al. |
| 2008/0077499 A1 | 3/2008 | Ariff et al. |
| 2008/0086759 A1 | 4/2008 | Colson |
| 2008/0091482 A1 | 4/2008 | Whitsett et al. |
| 2008/0120219 A1 | 5/2008 | Chen |
| 2008/0147479 A1 | 6/2008 | Johnson |
| 2008/0182661 A1 | 7/2008 | Korp |
| 2008/0188308 A1 | 8/2008 | Shepherd et al. |
| 2008/0201224 A1 | 8/2008 | Owens et al. |
| 2008/0224822 A1 | 9/2008 | Alderucci et al. |
| 2008/0254893 A1 | 10/2008 | Larsen et al. |
| 2008/0274796 A1 | 11/2008 | Lube |
| 2008/0300990 A1 | 12/2008 | Guiton |
| 2008/0306826 A1 | 12/2008 | Kramer et al. |
| 2008/0318671 A1* | 12/2008 | Rowe .............. G07F 17/32 463/26 |
| 2009/0023490 A1 | 1/2009 | Moshal et al. |
| 2009/0024483 A1 | 1/2009 | Urban |
| 2009/0054149 A1* | 2/2009 | Brosnan ............ G07F 17/32 463/42 |
| 2009/0063261 A1 | 3/2009 | Scribner et al. |
| 2009/0094118 A1 | 4/2009 | Antonucci et al. |
| 2009/0106112 A1 | 4/2009 | Dalmia et al. |
| 2009/0124384 A1 | 5/2009 | Smith et al. |
| 2009/0125402 A1 | 5/2009 | Voltmer et al. |
| 2009/0131143 A1 | 5/2009 | Kelly et al. |
| 2009/0156310 A1 | 6/2009 | Fargo |
| 2009/0171988 A1 | 7/2009 | Kikin-Gil |
| 2009/0177541 A1 | 7/2009 | Johnson et al. |
| 2009/0177594 A1 | 7/2009 | Williams |
| 2009/0191525 A1 | 7/2009 | Shepherd |
| 2009/0192890 A1 | 7/2009 | Steinkamp et al. |
| 2009/0216633 A1 | 8/2009 | Whitsett et al. |
| 2009/0276292 A1 | 11/2009 | Inselberg |
| 2009/0287570 A1 | 11/2009 | Adamousky et al. |
| 2009/0292599 A1 | 11/2009 | Angelos et al. |
| 2009/0299845 A1 | 12/2009 | Antonucci et al. |
| 2009/0319371 A1 | 12/2009 | Young |
| 2010/0018046 A1 | 1/2010 | Pollabauer |
| 2010/0030578 A1 | 2/2010 | Raouf et al. |
| 2010/0057550 A1 | 3/2010 | Nguyen |
| 2010/0057551 A1 | 3/2010 | Blaisdell |
| 2010/0069147 A1 | 3/2010 | Parhum |
| 2010/0076862 A1 | 3/2010 | Lefkowitz |
| 2010/0078475 A1 | 4/2010 | Lin et al. |
| 2010/0082481 A1 | 4/2010 | Lin et al. |
| 2010/0088174 A1 | 4/2010 | Cohagan et al. |
| 2010/0099485 A1 | 4/2010 | Sommer et al. |
| 2010/0106583 A1 | 4/2010 | Etheredge et al. |
| 2010/0131369 A1 | 5/2010 | Doan et al. |
| 2010/0138344 A1 | 6/2010 | Wong et al. |
| 2010/0169188 A1 | 7/2010 | Buchheit et al. |
| 2010/0174600 A1 | 7/2010 | Walker et al. |
| 2010/0211469 A1 | 8/2010 | Salmon et al. |
| 2010/0227675 A1 | 9/2010 | Luxton et al. |
| 2010/0248823 A1 | 9/2010 | Smith |
| 2010/0250290 A1 | 9/2010 | Lefkowitz et al. |
| 2010/0260426 A1 | 10/2010 | Huang et al. |
| 2011/0010205 A1 | 1/2011 | Richards |
| 2011/0015955 A1 | 1/2011 | Hessburg et al. |
| 2011/0035269 A1 | 2/2011 | Cohagan et al. |
| 2011/0119120 A1 | 5/2011 | Kern et al. |
| 2011/0124390 A1 | 5/2011 | Wilen |
| 2011/0137806 A1 | 6/2011 | Spence, III |
| 2011/0145047 A1 | 6/2011 | Chetty et al. |
| 2011/0145087 A1 | 6/2011 | Daman et al. |
| 2011/0151976 A1 | 6/2011 | Holloway |
| 2011/0166922 A1 | 7/2011 | Fuerstenberg |
| 2011/0183749 A1 | 7/2011 | Allen |
| 2011/0202395 A1 | 8/2011 | Swan et al. |
| 2011/0202400 A1 | 8/2011 | Bedard et al. |
| 2011/0207525 A1 | 8/2011 | Allen |
| 2011/0238503 A1 | 9/2011 | Naini |
| 2011/0256924 A1 | 10/2011 | McGhie et al. |
| 2011/0264474 A1 | 10/2011 | Lefkowitz |
| 2011/0269533 A1 | 11/2011 | Kelly et al. |
| 2011/0270657 A1 | 11/2011 | Urban |
| 2011/0275432 A1 | 11/2011 | Lutnick et al. |
| 2011/0295693 A1 | 12/2011 | Clavin et al. |
| 2011/0302020 A1 | 12/2011 | Ariff et al. |
| 2012/0016730 A1 | 1/2012 | Antonucci et al. |
| 2012/0026534 A1 | 2/2012 | Uruma |
| 2012/0030000 A1 | 2/2012 | Hanini et al. |
| 2012/0035998 A1 | 2/2012 | Balagopal et al. |
| 2012/0041810 A1 | 2/2012 | Hofer |
| 2012/0041813 A1 | 2/2012 | Ariff et al. |
| 2012/0046960 A1 | 2/2012 | Salta |
| 2012/0078704 A1 | 3/2012 | Spence, III |
| 2012/0165093 A1 | 6/2012 | Takehiro et al. |
| 2012/0191525 A1 | 6/2012 | Singh et al. |
| 2012/0185322 A1* | 7/2012 | Shipley .............. G06Q 30/0234 705/14.34 |
| 2012/0221399 A1 | 8/2012 | Aloni et al. |
| 2012/0226535 A1 | 9/2012 | Subbarao et al. |
| 2012/0239520 A1 | 9/2012 | Lee |
| 2012/0271690 A1 | 10/2012 | Urban |
| 2012/0290368 A1 | 11/2012 | Im |
| 2012/0296763 A1 | 11/2012 | Lee |
| 2012/0303425 A1* | 11/2012 | Katzin ................ G06Q 20/027 705/14.4 |
| 2012/0310725 A1 | 12/2012 | Chien et al. |
| 2013/0019258 A1 | 1/2013 | Bhatia et al. |
| 2013/0103484 A1 | 4/2013 | McLaughlin |
| 2013/0124286 A1 | 5/2013 | Chen |
| 2013/0185131 A1 | 7/2013 | Sinha et al. |

FOREIGN PATENT DOCUMENTS

| | | |
|---|---|---|
| AU | 2497499 | 11/1999 |
| AU | 2497599 | 11/1999 |
| AU | 199924973 | 11/1999 |
| AU | 199924974 | 11/1999 |
| AU | 199924975 | 11/1999 |
| AU | 3018500 | 11/2000 |
| AU | 200030185 | 11/2000 |
| AU | 2003200145 | 8/2003 |
| AU | 2002368184 | 3/2004 |
| AU | 2004250640 | 12/2004 |
| CA | 24060001 | 10/2001 |
| CN | 101159078 | 3/2013 |
| EP | 0251619 | 1/1988 |
| EP | 0254812 | 2/1988 |
| EP | 0308224 | 3/1989 |
| EP | 0525363 | 2/1993 |
| EP | 0542298 | 5/1993 |
| EP | 0590861 | 4/1994 |
| EP | 0949596 | 10/1999 |
| EP | 1014320 | 6/2000 |
| EP | 1107196 | 6/2001 |
| EP | 1141876 | 10/2001 |
| EP | 1351180 | 10/2003 |

(56) References Cited

FOREIGN PATENT DOCUMENTS

| | | |
|---|---|---|
| EP | 1399897 | 3/2004 |
| EP | 1494183 | 9/2005 |
| EP | 1330729 | 11/2005 |
| EP | 1598762 | 11/2005 |
| EP | 1746550 | 1/2007 |
| EP | 1750817 | 2/2007 |
| EP | 1787250 | 5/2007 |
| EP | 1879143 | 2/2009 |
| EP | 2533190 | 1/2013 |
| GB | 2261579 | 5/1993 |
| GB | 2301919 | 12/1996 |
| GB | 2319381 | 5/1998 |
| GB | 2296413 | 6/1999 |
| GB | 2333879 | 8/1999 |
| GB | 2380687 | 4/2003 |
| JP | 8235276 | 9/1996 |
| JP | 2000322490 | 11/2000 |
| JP | 2001000469 | 1/2001 |
| JP | 01338179 | 12/2001 |
| JP | 01357248 | 12/2001 |
| JP | 02092390 | 3/2002 |
| JP | 02109286 | 4/2002 |
| JP | 02207898 | 7/2002 |
| JP | 2003132224 | 5/2003 |
| JP | 04094643 | 3/2004 |
| WO | 9116691 | 10/1991 |
| WO | 09215174 | 9/1992 |
| WO | 9323817 | 11/1993 |
| WO | 9416781 | 8/1994 |
| WO | 1995003570 | 2/1995 |
| WO | 9512169 | 5/1995 |
| WO | 9517711 | 6/1995 |
| WO | 9633568 | 10/1996 |
| WO | 9636024 | 11/1996 |
| WO | 9641315 | 12/1996 |
| WO | WO-9704411 | 2/1997 |
| WO | WO-9713228 | 4/1997 |
| WO | WO-9743727 | 11/1997 |
| WO | WO-9748078 | 12/1997 |
| WO | WO-9809447 | 3/1998 |
| WO | 1999010061 | 3/1999 |
| WO | WO-9926176 | 5/1999 |
| WO | WO-9930256 | 6/1999 |
| WO | WO-9952051 | 10/1999 |
| WO | WO-9960503 | 11/1999 |
| WO | 0014665 | 3/2000 |
| WO | 0031658 | 6/2000 |
| WO | 0033159 | 6/2000 |
| WO | 0033222 | 6/2000 |
| WO | 2000038088 | 6/2000 |
| WO | 2000017794 | 8/2000 |
| WO | 0058862 | 10/2000 |
| WO | 0062231 | 10/2000 |
| WO | 0079461 | 12/2000 |
| WO | 00079461 | 12/2000 |
| WO | 0101282 | 1/2001 |
| WO | 2001001282 | 1/2001 |
| WO | 0116815 | 3/2001 |
| WO | 2001015031 | 3/2001 |
| WO | 0129750 | 4/2001 |
| WO | 0137171 | 5/2001 |
| WO | 0139059 | 5/2001 |
| WO | 0152078 | 7/2001 |
| WO | 0152135 | 7/2001 |
| WO | 01053929 | 7/2001 |
| WO | 0157617 | 8/2001 |
| WO | 0164306 | 9/2001 |
| WO | 0171579 | 9/2001 |
| WO | 0171580 | 9/2001 |
| WO | 0173665 | 10/2001 |
| WO | 0180111 | 10/2001 |
| WO | 2001004823 | 10/2001 |
| WO | 0182115 | 11/2001 |
| WO | 0205179 | 1/2002 |
| WO | 2001079966 | 3/2002 |
| WO | 0231737 | 4/2002 |
| WO | 2002041556 | 5/2002 |
| WO | 02048828 | 6/2002 |
| WO | 2002058020 | 7/2002 |
| WO | 2002063410 | 8/2002 |
| WO | 02069101 | 9/2002 |
| WO | 2002077884 | 10/2002 |
| WO | 2002079925 | 12/2002 |
| WO | 2003025867 | 3/2003 |
| WO | 03038560 | 5/2003 |
| WO | 2003083730 | 10/2003 |
| WO | 2003098495 | 11/2003 |
| WO | 2003102843 | 12/2003 |
| WO | 2004012111 | 2/2004 |
| WO | 2004019257 | 3/2004 |
| WO | 04090666 A2 | 10/2004 |
| WO | 04090666 A3 | 10/2004 |
| WO | 04092849 A2 | 10/2004 |
| WO | 2004092894 | 10/2004 |
| WO | 2004095194 | 11/2004 |
| WO | 2004104950 | 12/2004 |
| WO | 200506113 | 1/2005 |
| WO | 2004079506 | 3/2005 |
| WO | 2004090666 | 5/2005 |
| WO | 2005067431 | 7/2005 |
| WO | 2005073887 | 8/2005 |
| WO | 200582480 | 9/2005 |
| WO | 2005079422 | 9/2005 |
| WO | 2005096899 | 10/2005 |
| WO | 02097582 | 12/2005 |
| WO | 2006019359 | 2/2006 |
| WO | 2006020413 | 2/2006 |
| WO | 2006022593 | 3/2006 |
| WO | 2006026203 | 3/2006 |
| WO | 2005003903 | 4/2006 |
| WO | 2006043330 | 4/2006 |
| WO | 2006062925 | 6/2006 |
| WO | 2005086899 | 3/2007 |
| WO | 2006019368 | 11/2007 |
| WO | 2007067712 | 11/2007 |
| WO | 2006138595 | 6/2008 |
| WO | 2007106745 | 9/2008 |
| WO | 2008045650 | 10/2008 |
| WO | 2008147943 | 12/2008 |
| WO | 2005059683 | 4/2009 |
| WO | 2009070889 | 6/2009 |
| WO | 2009094395 | 7/2009 |
| WO | 2009126452 | 10/2009 |
| WO | 2010019303 | 2/2010 |
| WO | 2011026120 | 6/2011 |
| WO | 2011046469 | 4/2012 |
| WO | 2012051455 | 4/2012 |
| WO | 2012162634 | 11/2012 |
| WO | 2013067035 | 5/2013 |

OTHER PUBLICATIONS

Notice of Allowance; U.S. Appl. No. 13/359,104; dated Apr. 13, 2012.
Non Final Rejection dated Mar. 6, 2012; U.S. Appl. No. 13/359,080; pp. 1-11.
Notice of Allowance; U.S. Appl. No. 13/359,080; dated Apr. 11, 2012.
Non Final Rejection dated Jan. 10, 2012; U.S. Appl. No. 12/759,506; pp. 1-10.
Notice of Allowance; U.S. Appl. No. 12/759,506; dated Mar. 5, 2012.
Non Final Rejection dated Dec. 15, 2012; U.S. Appl. No. 12/720,743; pp. 1-10.
Notice of Allowance; U.S. Appl. No. 12/720,743; dated Jan. 24, 2012.
Non Final Rejection dated May 12, 2009; U.S. Appl. No. 11/420,255; pp. 1-7.
Notice of Allowance; U.S. Appl. No. 11/420,255; dated Dec. 16, 2009.
Non Final Rejection dated Sep. 24, 2012; U.S. Appl. No. 13/542,451; pp. 1-6.

(56) References Cited

OTHER PUBLICATIONS

Notice of Allowance; U.S. Appl. No. 13/542,451; dated Nov. 5, 2012.
Non Final Rejection dated Sep. 7, 2012; U.S. Appl. No. 13/532,342; pp. 1-6.
Notice of Allowance; U.S. Appl. No. 13/532,342; dated Sep. 24, 2012.
Non Final Rejection dated Sep. 6, 2012; U.S. Appl. No. 13/531,904; pp. 1-6.
Notice of Allowance; U.S. Appl. No. 13/531,904; dated Sep. 19, 2012.
Non Final Rejection dated Jul. 17, 2012; U.S. Appl. No. 13/479,417; pp. 1-11.
Notice of Allowance; U.S. Appl. No. 13/479,417; dated Jul. 30, 2012.
Notice of Allowance; U.S. Appl. No. 13/441,365; Mailing Date Jun. 18, 2012.
Joan Magretta—"Why Business Models Matter" Harvard Business Review-May 2002 pp. 1-8.
"Combinable Miles Are the Stuff of Frequent Flyers' Dreams" <http://www.frequenthier.com/news-analysis/features/combinable-miles-are-the-stuff-of-frequent-flyers-dreams> May 25, 1998.
Gordon Carey, "Multi-tier Copay", Pharmaceutical Executive (Feb. 2000).
David S. Evans "Some Empirical Aspects of Multi-sided Platform Industries"—NERA Economic Consulting; Review of network Economics; vol. 2 Issue 3—Sep. 2003; pp. 191-209.
Uncles et. al. "Do Customer Loyalty programs Really Work" ; MIT Sloan Management Review; Jul. 15, 1997.
"@wards online," Canadian Airlines, http://www.web.archive.org/web/19970704234541/www.cdnair.ca/cpi.html, Copyrigght 1994-1997.
Louise O'Brien & Charles Jones—"Do Rewards Really Creat Loyalty"?—Harvard Business Review; May-Jun. 1995; pp. 73-83.
Frederick F. Reichheld & Phil Schefter—"E-Loyalty—Your secret Weapon on the Web"—Harvard Business Review; Jul.-Aug. 2000; pp. 105-113.
Molly Plozay & Julie Bohn—"How Merchant-Funded Rewards Give new Life to Customer Loyalty programs"—First Data; Oct. 2008; firstdata.com—pp. 1-10.
Rajiv Lal—"Harrah's Entertainment Inc."—Harvard Business School; 9-502-011; Rev. Jun. 14, 2004; pp. 1-27.
Avery Johnson—"Hotels Take 'Know Your Customer' to New Level"—The Wall Street Journal—Feb. 7, 2006; p. D1.
Anthony T.H.Chin—"Impact of Frequent Flyer Programs on the Demand for Air Travel"—Department of Economics; National University of Singapore; Journal of Air Transportation; vol. 7, No. 2-2002; pp. 53-86.
Frederick F. Reichheld—"Loyalty-Based Management"—Harvard Business Review; Mar.-Apr. 1993; pp. 63-74.
Peter Jin Hong, creative director at Tribal DDB in Vancouver—"Digital Eye".
Business Insider. "The American Airlines—US Airways Merger Will Unite 2 Companies With Tumultuous Pasts" Feb. 14, 2013. http://www.businessinsider.com/questions-about-the-american-us-airways-merger-2013-2.
Christina Binkley—"Taking Retailers' Cues, Harrah's Taps into Science of Gambling"—The Wall Street Journal; Nov. 22, 2004—p. Al.
Werner Reinartz and V. Kumar—"The Mismanagement of Customer Loyalty"—Harvard Business Review; Jul. 2002 pp. 2-12.
KN Llewellyn—Meet Negotiable Instruments; Columbia Law Review 1944.
US General Accounting Office—Report to Congressional Requesters: Aviation Competition—"Effects on Consumers From Domestic Airline Alliances Vary". Jan. 1999.
Baig, E. "Going Once. Going Twice. Cybersold!" Business week; Jul. 31, 1997.
American Express has added Virgin Atlantic and Hawaiian Airlines to its Flight Finder feature under its Membership Rewards program. (Loyalty Programs); Business Traveler , v 21 , n 1 , p. 26; Dec. 2007.
EDebitPay Rewards: BSP to provide custom rewards-mall for EDP; Business Wire , p NA; Jan 7 , 2008.
"New Evidence about Positive Three-Tier Co-pay Performance Presented at Express Scripts 2000 Outcomes Conference", PR Newswire Association, Inc. (Jun. 28, 2000).
"Shell Introduces Optional Credit Card", The Associated Press (Sep. 4, 1985).
http://www.marketingmagazine.co.uk/article/158930/beenz-founder-creates-voucher-loyalty-programme-mobiles; Marketing; Sep. 25, 2002.
Mediappraise Receives National Award for Web-based Technology That Enables Companies to Solve Thorny HR Problem; Dec. 15, 1998; Business Wire; http://www.thefreelibrary.com/_/print/PrintArticle.aspx?id=53400697.
Om et al.; Cash Machines offer a whole lotto money for withdrawl; an unfortunate juxtaposition; block that metaphor!; something street talk; fishy in springfield; State street Sears?; Champion as underdog; A 'Whole Language' graduate; Crain's Chicago Business; Jun. 17, 1995.
Piccinelli, G., et al. "E-service Composition: Supporting Dynamic Definition of Process-Oriented Negotiation Parameters", 12th International Workshop on Database and Expert System Applications. <http://computer.org/csdl/proceeding/dexa/2001/1230/00/12300727-abs.html>; Sep. 7.
San Luis Obispo, CA; At Sports Superstore Online, Shoppers Get More for Their Money; 10,000 Reasons to Shop at Sports Superstore Online; Business Wire; Dec. 4, 1998.
Seminerio, Maria. "When You Gotta Take Stock"; Dec. 11, 2000. <http://www.eweek.com/c/a/Finance-IT/When-You-Gotta-Take-Stock>.
Strassmann, Paul A. "The Impact of B2B"; Computerworld. Oct. 2, 2000. <http://www.computerworld.com/s/article/51535/The_impact_of B2B?pageNumber=1>.
What is MilePoint?; Wayback machine; Aug. 1, 2001.
Patch, K. Sled, Internic Debut internet Services; PC Week, 1994.
Phillips offers customers financing through Citicorp. (Phillips Medical Systems North America, Citicorp North America Inc.); Health Industry Today; Jun. 1, 1991.
Points.com; "Stuff it"; Dec. 10, 2005; wayback machine.
Rent from NetFlix.com. Buy from Amazon.com; WaybackMachine; Nov. 5, 1999.
Edmund Sanders; Here's the Deal on Playing Card Games; Chicago Tribune; Business; Aug. 18, 1997.
Service helps hospitals shop online; Link-Up; Jun. 2000, vol. 17, Issue 3, p. 14.
Sinclair Stewart; To Mail or Not to Mail?; Strategy bold vision brand new ideas; Oct. 12, 1998.
Sarah Stambler; Marketing with Technology News; An Emerging Digital Trend: Living in the age of electronic proxy; Dec. 1998; vol. 8, issue 4.
Tecmark's Channel Loyalty Marketing programs engage and reward the people who are selling your products; http://tecmarkloyalty.com/loyaltyservices/channel/; Aug. 14, 2012.
WellsPark Group Launches "V.I.P. Rewards"; the Most Comprehensive Relationship Marketing Program Ever Created by a Mall Developer; Business Wire; May 19, 1998.
Renee Wijnen; CUC-HFS merger expected to yield an additional 2 million club members; Direct Marketing News; Jan. 26, 1998.
"U.S. Appl. No. 09/734,044 Final Office Action dated Jan. 4, 2008, 15 pgs".
"U.S. Appl. No. 09/734,044 Final Office Action dated Jan. 5, 2004, 7 pgs".
"U.S. Appl. No. 09/734,044 Final Office Action dated Mar. 7, 2007, 15 pgs".
"U.S. Appl. No. 09/734,044 Final Office Action dated Apr. 25, 2005, 11 pgs".
"U.S. Appl. No. 09/734,044 Non Final Office Action dated Jul. 11, 2004, 13 pgs".
"U.S. Appl. No. 09/734,044 Non Final Office Action dated Aug. 18, 2003, 7 pgs".

(56) References Cited

OTHER PUBLICATIONS

"U.S. Appl. No. 09/734,044 Non Final Office Action dated Aug. 29, 2006, 15 pgs".
"U.S. Appl. No. 09/734,044 Response filed Oct. 9, 2003 to Non Final Office Action dated Aug. 18, 2003, 11 pgs".
"U.S. Appl. No. 09/734,044 Response filed Nov. 29, 2006 to Non Final Office Action dated Aug. 29, 2006, 9 pgs".
"U.S. Appl. No. 09/734,044 Response filed Dec. 13, 2004 to Non Final Office Action dated Aug. 11, 2004, 13 pgs".
U.S. Appl. No. 09/905,525, Final Office Action dated Jan. 10, 2008, 15 pgs.
"U.S. Appl. No. 09/905,525, Non-Final Office Action dated Aug. 22, 2008, 17 pgs".
"U.S. Appl. No. 09/905,525, Response filed Mar. 27, 2008 to Final Office Action dated Jan. 10, 2008, 17 pgs".
"U.S. Appl. No. 09/905,525, Response filed Jun. 10, 2008 to Final Office Action dated Jan. 10, 2008, 20 pgs".
"U.S. Appl. No. 09/905,525, Response filed Sep. 25, 2007 to Non-Final Office Action dated Jun. 25, 2007, 17 pgs".
"U.S. Appl. No. 09/905,525 Response filed Nov. 24, 2008 to Non-Final Office Action dated Aug. 22, 2008, 17 pgs."
"U.S. Appl. No. 09/905,525, Advisory Action dated May 2, 2008, 5 pgs".
"U.S. Appl. No. 09/905,525, Final Office Action dated Jun. 29, 2006, 14 pgs".
"U.S. Appl. No. 09/905,525, Non Final Office Action dated Jun. 25, 2007, 16 pgs".
"U.S. Appl. No. 09/905,525, Non Final Office Action dated Dec. 12, 2005, 12 pgs".
"U.S. Appl. No. 09/905,525, Non Final Office Action dated Dec. 18, 2006, 15 pgs".
"U.S. Appl. No. 09/905,525, Response filed Mar. 19, 2007 to Non Final Office Action dated Dec. 18, 2006, 9 pgs".
"U.S. Appl. No. 09/905,525, Response filed Apr. 12, 2006 to Non Final Office Action dated Dec. 12, 2005, 8 pgs".
"U.S. Appl. No. 09/905,525, Response filed Apr. 13, 2005 to Non Final Office Action dated Dec. 14, 2004, 17 pgs".
"U.S. Appl. No. 09/905,525, Response filed Sep. 22, 2006 to Final Office Action dated Jun. 29, 2006, 19 pgs".
"U.S. Appl. No. 09/905,525, Non Final Office Action dated Dec. 14, 2004, 11 pgs".
"U.S. Appl. No. 09/969,449, Non-Final Office Action dated Aug. 5, 2008, 8 pgs".
"U.S. Appl. No. 09/969,449 Final Office Action dated Nov. 3, 2004, 10 pgs".
"U.S. Appl. No. 09/969,449 Final Office Action dated Nov. 21, 2005, 16 pgs".
"U.S. Appl. No. 09/969,449 Final Office Action dated Dec. 29, 2003, 9 pgs".
"U.S. Appl. No. 09/969,449 Non Final Office Action dated Apr. 25, 2005, 9 pgs".
"U.S. Appl. No. 09/969,449 Non Final Office Action dated May 11, 2004, 8 pgs".
"U.S. Appl. No. 09/969,449 Non Final Office Action dated Jul. 9, 2003, 8 pgs".
"U.S. Appl. No. 09/969,449 Response filed Feb. 3, 2005 to Final Office Action dated Nov. 3, 2004, 17 pgs".
"U.S. Appl. No. 09/969,449 Response filed Aug. 11, 2004 to Non Final Office Action dated May 11, 2004, 12 pgs".
"U.S. Appl. No. 09/969,449 Response filed Aug. 25, 2005 to Non Final Office Action dated Apr. 25, 2005, 12 pgs".
"U.S. Appl. No. 09/969,449 Response filed Oct. 9, 2003 to Non Final Office Action dated Jul. 9, 2003, 12 pgs".
U.S. Appl. No. 09/976,301 Advisory Action dated Sep. 30, 2005, 3 pgs.
U.S. Appl. No. 09/976,301 Advisory Action dated Nov. 30, 2006, 3 pgs.
"U.S. Appl. No. 09/976,301 Final Office Action dated Jul. 13, 2005, 11 pgs".
"U.S. Appl. No. 09/976,301 Final Office Action dated Aug. 25, 2006, 14 pgs".
"U.S. Appl. No. 09/976,301 Non Final Office Action dated Mar. 9, 2007, 13 pgs".
"U.S. Appl. No. 09/976,301 Non Final Office Action dated Nov. 24, 2004, 31 pgs".
"U.S. Appl. No. 09/976,301 Non Final Office Action dated Dec. 16, 2005, 17 pgs".
"U.S. Appl. No. 09/976,301 Response filed Apr. 6, 2005 to Non Final Office Action dated Nov. 24, 2004, 15 pgs".
"U.S. Appl. No. 09/976,301 Response filed May 16, 2006 to Non Final Office Action dated Dec. 16, 2005, 24 pgs".
"U.S. Appl. No. 09/976,301 Response filed Jun. 7, 2007 to Non Final Office Action dated Mar. 9, 2007, 7 pgs".
"U.S. Appl. No. 09/976,301 Response filed Sep. 13, 2005 to Final Office Action dated Jul. 13, 2005, 13 pgs".
"U.S. Appl. No. 09/976,301 Response filed Oct. 13, 2005 to Advisory Action dated Jul. 13, 2005, 14 pgs".
"U.S. Appl. No. 09/976,301 Response filed Oct. 24, 2006 to Final Office Action dated Aug. 25, 2006, 6 pgs".
"Government Agencies Can Procure Materials." Link-Up. Jan./Feb. 2000, vol. 17, Issue 1, p. 19.
"AT&T Offers Ideas for Last-Minute Gifts and Stocking Stuffers." Business Wire. Dec. 21, 1994.
"Continental Airlines Offers GRAMMY Awards Tickets at the OnePass Online Auction." PR Newswire. Jan. 23.
"Personal Optimized Decision/Transaction Program"; IBM Technical Disclosure Bulletin. TDB v38 n1, Jan. 1995, pp. 83-84.
"How to Earn and Redeem Miles on Continental Airlines"; OnePass Program Guide. May 2002.
"Web Beacon", <http://www.webopedia.com/TERM/W/Web-beacon.html>. Aug. 21, 2003.
Asbrand, Deborah. "Taking Stock in Tradingexchanges"; EDN Network; Apr. 1, 2000. <http://www.edn.com/electronics-news/4360134/Taking-stock-in-tradingexchanges>.
Dalton, Gregory. "Going, Going, Gone!: E-commerce is leading to an anything-goes environment of online bidding and dynamic pricing" <http://www.dbliss.net/900%20-%20GENERAL/Articles/e-commerce_bidding.txt>.
Edwards, Morris. "New B2B Player Spreads Benefits of E-commerce"; Communications News; Jan. 1, 2001 <http://www.thefreelibrary.com?/_/print/PrintArticle.aspx?id=71060774>.
Fisher, Dennis. "More Goods on the Block"; eWeek; Dec. 18, 2000. <http://www.eweek.com/c/a/Web-Services-Web-20-and-SOA/More-Goods-on-the-Block>.
Franse, Karen. "Distribution Briefs"; CRN; Mar. 22, 2002. <http://www.crn.com/news/channel-programs/18818846/distribution-briefs.htm>.
Furger, Roberta. "Working the Web Bazaar"; Computerworld; Mar. 20, 2000. <http://www.computerworld.com.au/article/103901/working_web_bazarr>.
Kumar, Manoj. "Sales Promotions on the Internet". IBM Research Division, T.J. Watson Research Center, Yorktown Heights, NY 10598. 3rd USENIX Workshop on Electronic Commerce. Aug. 31-Sep. 3, 1998.
Lindsay, Jeff. "The Historic Use of Computerized Tools for Marketing and Market Research: A Brief Survey". Kimberly-Clark Corporation. Dec. 27, 2001. <http://www.jefflindsay.com/market-research.shtml>.
Hello Direct Store Joins eBay Network of Merchants; Customers Bid for Savings on Premier Headsets, Conferencing Equipment, and Other Name-Brand Telephony and Communications Products; PR Newswire; May 23, 2002.
Ohlson, Kathleen. "Looking Behind, Beyond B2B Marketplace Woes"; Network World Fusion; Jun. 11, 2001. <http://www.networkworld.com/archive/2001/119669_06-11-2001.html>.
Patel, Jeetu. "New Platform Options Fuel E-Commerce"; Information Week Online. Mar. 27, 2000. <http://www.informationweek.com/779/ecommerce.htm>.
Pressler, Margaret, "Sells on eBay; Housewife finds herself head of multinational software firm", Washing Post, Proquest # 44484325, Sep. 5, 1999.

(56) References Cited

OTHER PUBLICATIONS

Preist, Chris; Adaptive Agents in a Persistent Shout Double Auction; HP Laboratories Bristol, HPL-2003-242; Dec. 4, 2003.
Warbelow, A. et al., "Aucnet: TV Auction Network System", Source: Harvard Business School; 16 pages. Publication Date: Jul. 19, 1989. Prod. #: 190001-PDF-ENG.
Yahoo! Launches Three New European Auctions Services; Yahoo! Italy, Yahoo! Spain and Yahoo! Sweden Unveil New Local Auctions; Santa Clara, Calif.—Sep. 23, 1999.
Grubbs, L. "Top 5 auction utilities", PC World.com, San Francisco, CA (Dec. 4, 2000).
M2 Presswire, "United Technologies; UTC's Carrier Corp. teams with FreeMarkets to create largest Asian-based B2B online auction market to date; UTC Division identifies average annal savings of more than 16 percent on electirc motors through Free Markets B2B eMarketpla", M2 Presswire, (Mar. 21, 2000.
Jodi Mardesich; Onsale Takes Auction Gavel Electronic; Site Offers Clearance for End-Of-Life Products. (Onsale Internet Auction Site) (Company Business and Market; Jul. 8, 1996.
Kevin Merrill; GE Capital to Extend Integrator Buying Spree. (GE Capital Technology Management Services to Acquire Compunet Computer AG); Jul. 8, 1996.
Valerie Block; Going going, virtually gone; Crain's New York Business; May 18, 2008.
Mitsubishi Venture, Wells Fargo Partner to Offer Multi-Currency E-Commerce Storefront; Santa Clara, Calif., and San Francisco, Mar. 1 /PRNewswire/.
Peerflix Trading Platform Manages Over One Million DVD Records; Legal Peer to Peer Platform Grows to Over One Million Combined DVDs Available and Requested for Trade Enabling Several Members to Swap Over One Thousand DVDs Each; BusinessWire; Jun. 8, 2006.
PSINet Teams with WorldPay Ltd. To Launch the World's First Secure Multi-Currency Solution for International Electronic Commerce; PRNewswire; Oct. 6, 1997.
Brown, Janelle; "What does it take to make a buck off of Usenet?" http://www.salon.com/1999/05/24/deja/ May 24, 1999.
Yahoo! Regional: Countries: Afghanistan; http://www.web.archive.org/web/20060923045804/http://dir.yahoo.com/Regional/countries/afghanistan; Jun. 16, 1997.
Yahoo! Regional: Countries: Sweden; http://www.web.archive.org/web/19970616194441/www.yahoo.com/Regional/ countries/sweden; Jun. 16, 1997.
Yahoo! Auctions Celebrates One-Year Anniversary; As Online Auction Usage Continues to Grow, Yahoo! is Quickly Becoming the World Marketplace of the New Millenium; Sep. 14, 1999.
"U.S. Appl. No. 09/734,044, Response filed Oct. 18, 2007 to Non-Final Office Action dated Sep. 13, 2007, 17 pgs."
"U.S. Appl. No. 09/734,044, Response filed Mar. 4, 2008 to Final Office Action dated Jan. 4, 2008, 15 pgs".
"U.S. Appl. No. 09/734,044 Advisory Action dated May 2, 2008, 3 pgs".
"U.S. Appl. No. 09/602,110, Final Office Action dated Mar. 8, 2006, 11 pgs".
"U.S. Appl. No. 09/602,110, Final Office Action dated Nov. 21, 2005, 11 pgs".
"U.S. Appl. No. 09/602,110, Non Final Office Action dated Jan. 21, 2004, 13 pgs".
"U.S. Appl. No. 09/602,110, Response filed Jan. 3, 2005 to Final Office Action dated Sep. 2, 2004, 16 pgs".
"U.S. Appl. No. 09/602,110, Response filed Jan. 23, 2006 to Final Office Action dated Nov. 21, 2005, 15 pgs".
"U.S. Appl. No. 09/602,110, Response filed May 8, 2006 to Final Office Action dated Mar. 8, 2006, 17 pgs".
U.S. Appl. No. 09/602,110 Advisory Action dated May 26, 2006, 3 pgs.
"U.S. Appl. No. 09/602,110 Final Office Action dated Sep 2, 2004, 13 pgs".
"U.S. Appl. No. 09/602,110 Response filed Aug. 4, 2005 to Non Final Office Action dated Apr. 5, 2005, 19 pgs".

Edwards, Mark J. "Your Web Browser is Bugged"; Windows IT Pro; Jul. 12, 2000. <http://www.windowsitpro.com/print/security/your-web-browse-bugged>.
Hoeschen, Brad; Brookfield Square hopes mall card strikes a chord. (Brookfield Square Shopping Center; credit card); The Business Journal; Sep. 12, 1997.
Ivanov et al; Design aesthetics leading to m-loyalty in mobile commerce; Emerald; Information & Management; Dec. 2006; vol. 43; Issue 8; pp. 950-963.
Jayaram et al; Arbitrage, cointegration, and the joint dynamics of prices across discrete commodity futures auctions; The University of Scranton; Sep. 7, 1999.
Amazon.com and Netflix.com Establish Promotional Relationship for the Sale and Rental of DVD Titles Business Wire Dec. 4, 1998, 3 pp.
Block, Valerie. "GM turns up the heat with plan to cross-sell some financial products." Nov. 18, 1994, http://www.americanbanker.com/issues/159_150/-49630-1.html?zkPrintable=true.
Beneficial, Casual Male Team Up on Card, American Banker. May 4, 1998. http://www.americanbanker.com.
Bloom, Jennifer Kingson. "Wal-Mart on Retail Road Less Traveled: Cobranding," The American Banker Sep. 11, 1998, 3 pp.
Elkin, Tobi "Promotions: Mastercard Wins Coveted On-Pack Real Estate in Tie-in with Microsoft" Brandweek Sep. 14, 1998, 1 page.
Microsoft and First USA Announces $90 Million Online Advertising Alliance EDP Weekly's IT Monitor Nov. 2, 1998, 2 pp.
Feldman, Amy "Paying with Plastic Not Such a Smart Idea", New York Daily News Nov. 4, 1998, 2 pp.
Cowell, Alan "America's Turn to Colonize; Creditcard Issuers Invade Britain, with U.S. Firepower", The New York Times Nov. 12, 1998, 5 pp.
Armstrong, Larry, "The Free-PC Game: Lure 'Em in and Lock 'Em Up," Business Week, Information Technology, Jul. 19, 1999, 1 pg.
Shoppers Charge Accounts Co. to Administer Private Label Credit Card for Lew Magram LTD; Program Marks SCA,s Entry into Retail Catalog/Mail Order Industry PR Newswire Jun. 29, 1998, 6 pp.
Non Final Rejection dated Mar. 6, 2012; U.S. Appl. No. 13/359,120; pp. 1-7.
Souccar, Miriam K. "Epidemic of Rate Shopping Spurs a Search for remedies," Jan. 7, 1999, Copyright 1999 American Banker, Inc.,
Jay Jacobs Inc. Introduces Private Label Credit Card, Business Wire May 18, 1998, 1 page.
Meece, Mickey "Big Finance Companies May Want Piece of Limited's Private-Label Card Program", The American Banker Apr. 12, 1995, 2 pp.
Points Earn Little Credit as Cardholders Fail to Cash in Birmingham Post May 9, 1998, 2 pp.
Notice of Allowance; U.S. Appl. No. 13/359,120; dated Apr. 18, 2012.
Wald, Matthew L. "Spending It; Untying Cellular Phones From Those Annual Contracts" The New York Times Mar. 15, 1998, 2 pp.
Sanders, Edmund "Tricky Business; The Magic of Rebate Cards can Quickly Disappear", Chicago Tribune Aug. 18, 1997, 3 pp.
Simon, Ruth "Make Sure Your Rebate Card Still Delivers the Goods", Money Aug. 1997, 2 pp.
Selasky, Susan "Easy-To-Swallow Savings; Diner Credit Cards Serve Wide menu of Discounts", Pittsburgh Post-Gazette Dec. 5, 1996, 3 pp.
Chemical Bank and AT&T Smart Cards form Strategic Alliance, www.att.com/press/1193/931117.blb.html, 3 pp.
Kristof, Kathy "Card Sharks are in Season; be Wary of Discounts and Rebates as You Shop Around for Good Credit Deals", Chicago Tribune, Nov. 23, 1993, 2 pp.
Wessel, Harry "Rewarding Experience?; Credit Cards Offering Bonuses Not for Everyone", Chicago Poet-Gazette Dec. 5, 1996, 3 pp.
Ross, Chuck et al., "Coke Card promotion set for '98", (http //adage com/news.sub.--and.sub.-features/features/19971117/article3 html), Copyright Nov. 1997, 2 pp.
Singletary, Michelle, "Electronic World, Unchecked Problem?", The Washington Post, Mar. 4, 1997, Section: Financial, p. C01, 4 pp.

(56) References Cited

OTHER PUBLICATIONS

Cox, Beth, "Visa, Travelweb Enter Online Marketing Partnership," Internetnews.com, Jan. 21, 1999, 1 pg.
Tedesco, Richard. "Pactel Pushes Net Access." Broadcasting & Cable. Jun. 3, 1996, pp. 64-65.
Colman, Price. "Cross-marketing Cuts Cable Bills." Broadcasting & Cable. Jul. 15, 1996, p. 44, 2 pp.
O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. Column 2 at p. 1, 4 pp.
Let's Play the Cash Register Receipts Lottery, The New York Times, Dec. 25, 1990, Section: Section 1, p. 30, col. 4, Editorial Desk, 1 pg.
Dennis, Sylvia. "Visa Gets ready for Interactive Set-Top Boxes," Newsbytes, Dec. 14, 1998, 2 pp.
Winn-Dixie/The Salvation Army Report Contributions for War Against Hunger, PR Newswire, Jun. 10, 1993, Section: Financial News, 1 pg.
Armstrong, Larry. "Coupon Clippers, save Your Scissors," Vons Supermarkets are Revolutionizing the Delivery of Discounts. Business week, Jun. 20, 1994, No. 3377 at p. 164, 2 pp.
Brochure: "MyPoints (R)", MotivationNet, Inc. (TM), Homepage: www.mypoints.com, Copyright: Apr. 1998, 29 pp.
Bonnici, Joseph et al., "Consumer issues in coupon usage: An exploratory analysis", Journal of Applied Business Research, winter 1996/1997, vol. 13, No. 1, pp. 31-40, ISSNn: 0892-7626, CODEN: JPBEBK, 11 pp.
Iverson, Mark. "DataCard Partners With CSI to Offer Card—Based Loyalty Solution to Merchants." Jul. 9, 1998; http://www.thefreelibrary.com/_/print/PrintArticle.aspx?id=20883274.
Cardbriefs: Stored-Value Card Designed for Casinos, The American Banker, Oct. 31, 1995, Section: Credit/Debit/ ATMS, 1 pg. cited by other.
WAP WTLS: Wireless Application Protocol Wireless Transport Layer Security Specification, Wireless Applications Forum, Limited, Feb. 18, 2000. [Retrieved on Jan. 19, 2009]. Retrieved from the Internet <Oct. 7, 2008>.
Fallon: "UK Retailers Loyal Customer 'Card Wars' Prove costly (Most major retailers in the UK have grown their sales over the past 2 years by lunching loyalty-card program" ; Supermarket News, May 5, 1997; vol. 47, No. 18, p. 57.
Fickenscher, Lisa, "Merchant: American Express Seeks to Mine Its Data on Cardholder Spending Patters", The American Banker, Mar. 24, 1997, Credit/Debit/ATMS, 2 pp. cited by other.
Fickenscher, Lisa, "Amex to Start Free Rewards Program with Discounts on Merchandise", The American Banker, Oct. 18, 1996, Section: Credit/Debit/Atms, p. 10, 2 pp. cited by other.
Fitzgerald, Kate, "Amex program moves loyalty to next level: Custom Extras finds a medium customers can't ignore: Billing Statements", Advertising Age, Nov. 4, 1996, Section: News, 2 pp. cited by other.
Amato-McCoy, Deena, "Co-Branded Acme Credit Card Rewards Loyal Users" Supermarket News, Jun. 15, 1998, Section: p. 17, ISSN: 0039-5803, 2 pp. cited by DataCard Partners With CSI to Offer Card—Based Loyalty Solution to Merchants, Business Wire, Jul. 9, 1998, 1 pg. cited by other.
Notice of Allowance; U.S. Appl. No. 13/441,365; dated Jun. 16, 2012.
Non Final Rejection dated May 4, 2012; U.S. Appl. No. 13/428,656; pp. 1-6.
Notice of Allowance; U.S. Appl. No. 13/428,656; dated May 15, 2012.
Turek, Norbert. "Online Portals Offer Bandwidth and Voice Services"; May 1, 2000. <http://www.informationweek.com/784/bandwidth.htm>.
Weiss, Scott. "Pan Am FF Program"; Business Wire. Oct. 15, 1996. <https://groups.google.com/forum/?hl=en#!msg/rec.travel.air/EzyB24GQzE4/H450aifuJSkJ>.
Yuh-Jzer Joung; On Personal data license design and negotiation; Jul. 26-28, 2005; Computer Software and Application Conference.

"U.S. Appl. No. 09/976,301 Response filed Dec. 19, 2006 to Advisory Action dated Nov. 30, 2006, 16 pgs".
"U.S. Appl. No. 10/252,126, Final Office Action dated Jun. 27, 2006, 11 pgs".
"U.S. Appl. No. 10/252,126, Non Final Office Action dated Jan. 30, 2007, 9 pgs".
"U.S. Appl. No. 10/252,126, Non Final Office Action dated Feb. 3, 2006, 8 pgs".
"U.S. Appl. No. 10/252,126, Non Final Office Action dated Aug. 20, 2007, 8 pgs".
"U.S. Appl. No. 10/252,126, Response filed May 3, 2006 to Non Final Office Action dated Feb. 3, 2006, 7 pgs".
"U.S. Appl. No. 10/252,126, Response filed Jun. 25, 2007 to Non Final Office Action dated Jan. 30, 2007, 11 pgs".
"U.S. Appl. No. 10/252,127, Advisory Action dated Jan. 10, 2007, 3 pgs".
"U.S. Appl. No. 10/252,127, Final Office Action dated Oct. 6, 2006, 10 pgs".
"U.S. Appl. No. 10/252,127, Non Final Office Action dated Mar. 21, 2006, 9 pgs".
"U.S. Appl. No. 10/252,127, Non Final Office Action dated Jul. 11, 2007, 9 pgs".
"U.S. Appl. No. 10/252,127, Response filed Jun. 21, 2006 to Non Final Office Action dated Mar. 21, 2006, 8 pgs".
"U.S. Appl. No. 10/252,127, Response filed Dec. 6, 2006 to Final Office Action dated Oct. 6, 2006, 14 pgs".
"U.S. Appl. No. 10/252,129, Final Office Action dated Dec. 27, 2006, 12 pgs".
"U.S. Appl. No. 10/252,129, Non Final Office Action dated May 15, 2007, 10 pgs".
"U.S. Appl. No. 10/252,129, Non Final Office Action dated Aug. 18, 2006, 10 pgs".
"U.S. Appl. No. 10/252,129, Response filed Aug. 13, 2007 to Non-Final Office Action dated May. 15, 2007, 16 pgs".
U.S. Appl. No. 10/252,129, Response filed Oct. 5, 2006 to Non Final Office Action dated Aug. 18, 2006, 15 pgs.
"U.S. Appl. No. 10/252,129 Advisory Action dated Mar. 13, 2007, 3 pgs".
U.S. Appl. No. 10/252,129 Response filed Feb. 22, 2007 to Final Office Action dated Dec. 27, 2006, 14 pgs.
"U.S. Appl. No. 10/412,194, Non-Final Office Action dated Mar. 13, 2008, 31 pgs."
"U.S. Appl. No. 10/412,194, Non-Final Office Action dated Oct. 10, 2008, 8 pgs".
"U.S. Appl. No. 10/412,194 Response filed Jun. 13, 2008 to Non-Final Office Action dated Mar. 13, 2008, 20 pgs."
"U.S. Appl. No. 10/607,587, Response filed Feb. 28, 2008 to Non-Final Office Action dated Nov. 30, 2007, 15 pgs."
"U.S. Appl. No. 10/607,587, Response filed Oct. 16, 2008 to Final Office Action dated Apr. 21, 2008, 15 pgs."
"U.S. Appl. No. 10/607,587 Response filed Jun. 19, 2008 to Final Office Action dated Apr. 21, 2008, 17 pgs".
"U.S. Appl. No. 10/607,587, Non-Final Office Action dated Nov. 30, 2007, 19 pgs".
"U.S. Appl. No. 10/607,587, Final Office Action dated Apr. 21, 2008, 30 Pages".
"U.S. Appl. No. 10/608,525, Advisory Action dated Jul. 29 2008, 3 pgs."
"U.S. Appl. No. 10/608,525, Final Office Action dated May 1, 2008, 8 pgs".
"U.S. Appl. No. 10/608,525, Pre-Appeal Brief dated Jul. 31, 2008, 2 pgs."
"U.S. Appl. No. 10/608,525, Response filed Jan. 11, 2008 to Non-Final Office Action dated Sep. 11, 2007, 15 pgs."
"U.S. Appl. No. 10/608,525, Response filed Oct. 16, 2008 to Final Office Action dated May 1, 2008, 17 pgs."
"U.S. Appl. No. 10/608,525 Response filed Jul. 1, 2008 to Final Office Action dated May 1, 2008, 15 pgs."
"U.S. Appl. No. 10/608,525 Non-Final Office Action dated Sep. 11, 2007, 6 pgs".

(56) References Cited

OTHER PUBLICATIONS

Piccinelli, G., et al. "E-service Composition: Supporting Dynamic Definition of Process-Oriented Negotiation Parameters", 12th International Workshop on Database and Expert System Applications. <http://computer.org/csdl/proceedings/dexa/2001/1230/00/12300727-abs.html>.

Strassmann, Paul A. "The Impact of B2B"; Computerworld. Oct. 2, 2000. <http://www.computerworld.com/s/article/51535/The_impact_of_B2B?pageNumber=1>.

Weiss, Scott. "Pan Am FF Program"; Business Wire. Oct. 15, 1996. <https://groups.google.com/forum/?hl=en#?msg/rec.travel.air/EzyB24GQzE4/H450aifuJSkJ>.

Notice of Allowance; U.S. Appl. No. 13/681,479; dated Sep. 6, 2013.

Notice of Allowance; Application No. 13/681,493; date Sep. 23, 2013.

Aadvantage Auction; Bid on VIP Experiences with Aadvantage Miles; aa.com; Aug. 14, 2012.

Abby, Ellin; Personal Business; Listening to an Earful for Savings; The New York Times; Jan. 24, 1999.

Albright, Mark; Grocery savings via Web coupons; St. Petersburg Times; Jul. 22, 1998.

American Eagle Outfitters, Inc; The clear choice for shopping this season is at American Eagle Outfitters, Warren, PA, Mar. 26; PR Newswire.

Bush, Michael; Emaginet Launches Personalized Web Coupons; Direct Marketing News; Nov. 18, 1998; p. 1-3.

Cathleen McCarthy; Turning miles directly into cash gains favor. Companies target shoppers with unredeemed rewards; CreditCards.com; Oct. 10, 2013.

\* cited by examiner

900

```
┌─────────────────────────────────────┐
│ Gambling Site 902              ☒    │
│                                     │
│        You Win 35 Credits           │
│         [Play Again] [Redeem Credits]│──── 905
│                                     │
│    Account Balance: 100 Credits     │
└─────────────────────────────────────┘
                   ▼
┌─────────────────────────────────────┐
│ E-commerce Site   910          ☒    │
│                                     │
│   Mr. Smith, you have 3 items saved │
│        in your shopping cart.       │
│  Purchase Options:                  │
│    [Credit Card] [Check] [E-wards]  │──── 915
└─────────────────────────────────────┘
                   ▼
┌─────────────────────────────────────┐
│ E-wards Account   920          ☒    │
│ Mr. Smith:                          │
│   ☐ Entertainment Credits A  [10,000]│
│   ☐ Entertainment Credits B  [2,000] │
│   ☒ Entertainment Credits C  [100]   │
│   Funds - - - - - - - - - - [$100.00]│──── 922
│                                     │
│     [Convert Checked Credits to Funds]│── 925
│     [Purchase Additional Credits]   │
└─────────────────────────────────────┘
   927
                   ▼
┌─────────────────────────────────────┐
│ E-wards Account   930          ☒    │
│ Mr. Smith,                          │
│     You have selected to pay $100   │
│ credits (1 credit = 1 USD) to E-commerce│
│ Site.                               │
│                                     │
│ Is this correct?  [Yes]   [Cancel]  │
└─────────────────────────────────────┘
           932           933
                   ▼
┌─────────────────────────────────────┐
│ E-commerce Site   940          ☒    │
│ Receipt                             │
│       Mr. Smith, we have received your│
│ payment of $100.00 for 3 items.     │
│                          Thank You  │
└─────────────────────────────────────┘
```

FIG. 9

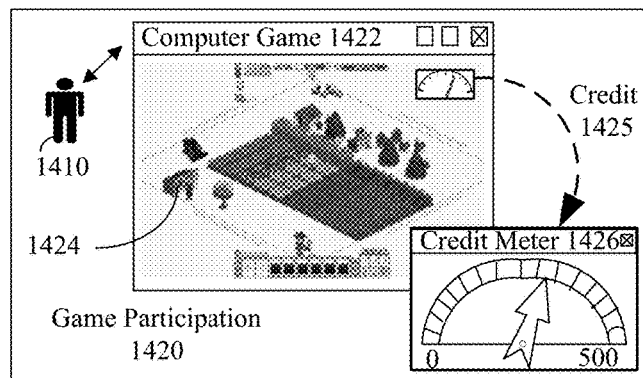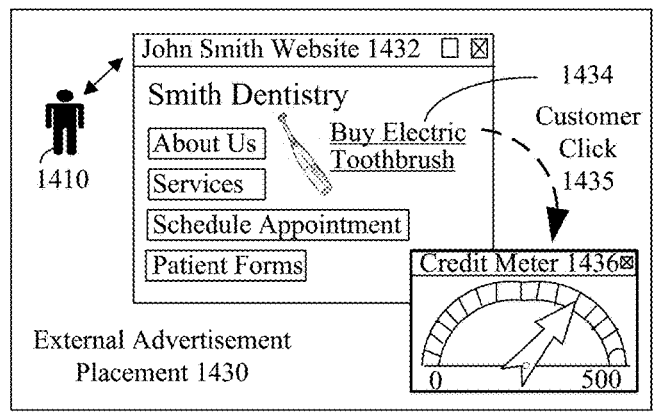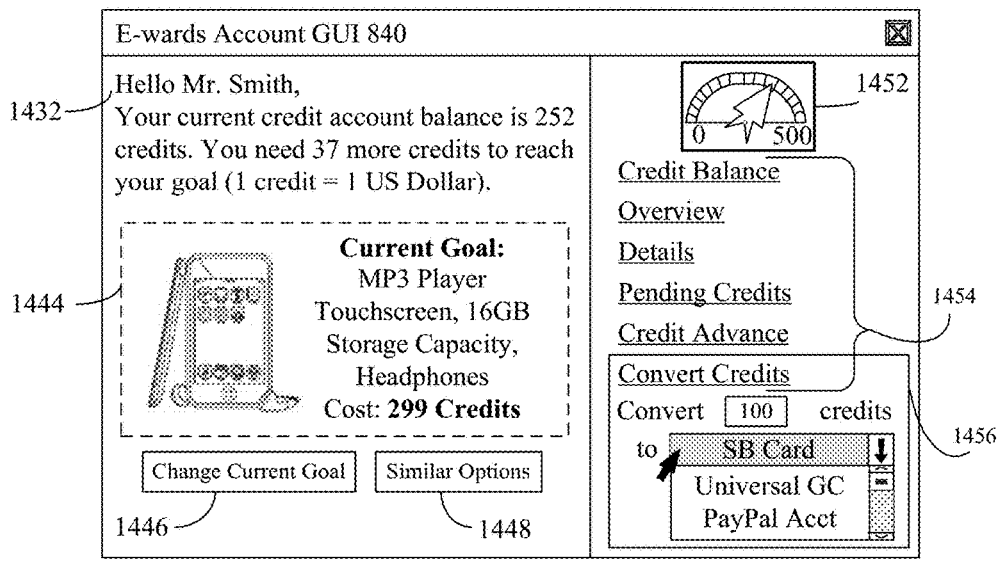
FIG. 14

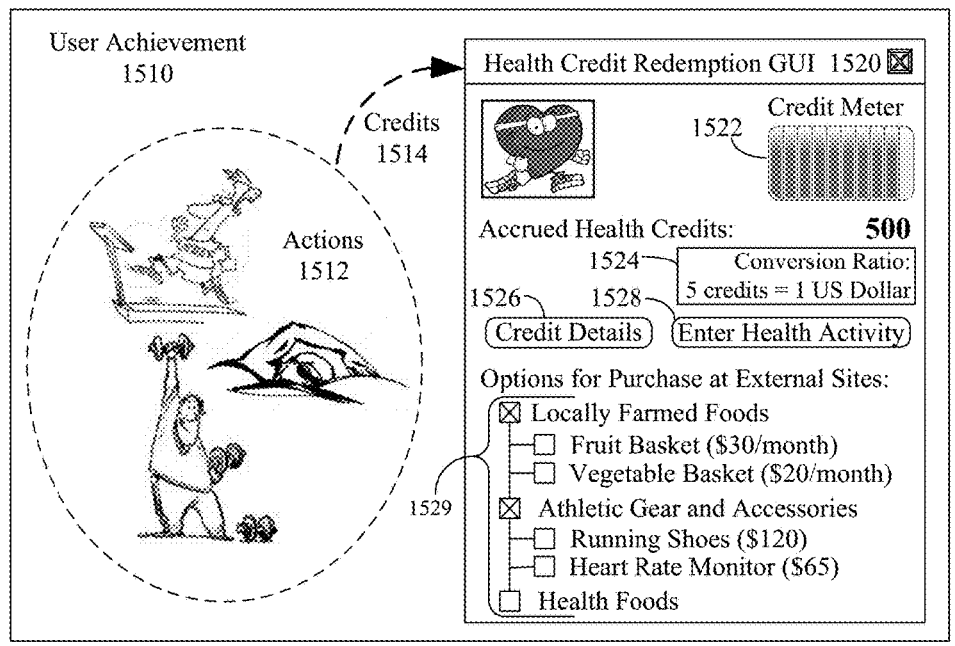
FIG. 15

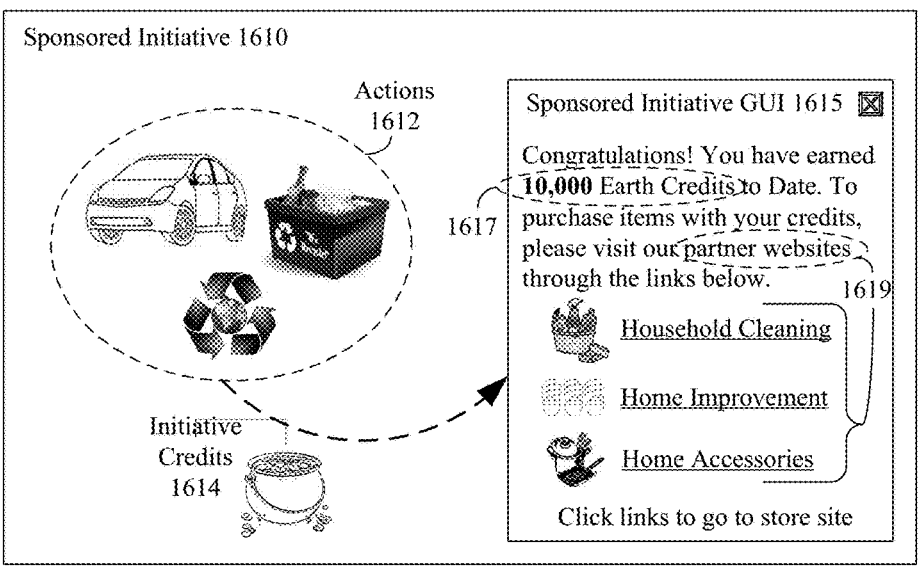
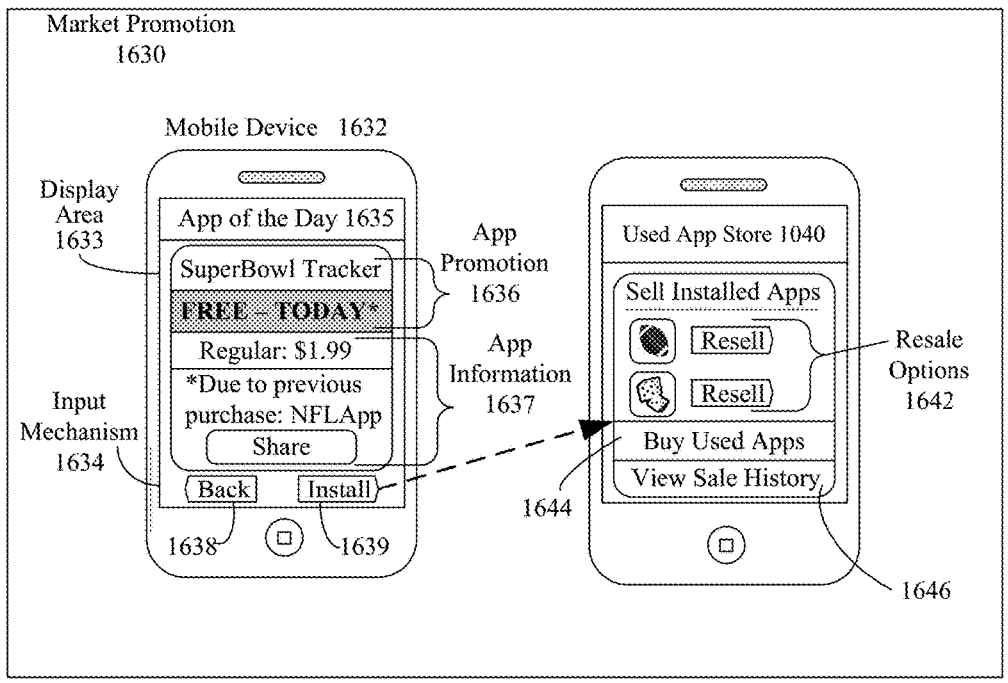
FIG. 16

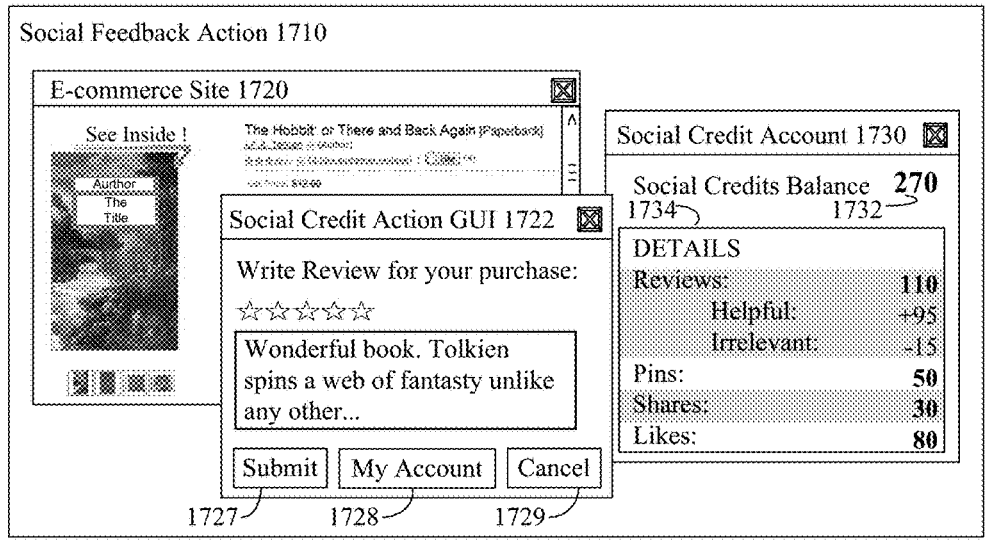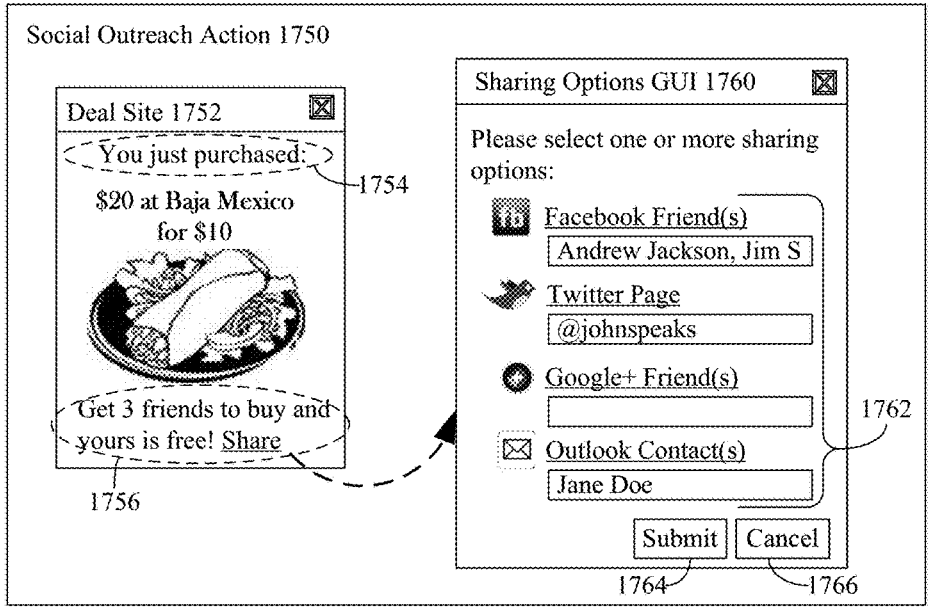
FIG. 17

Game of Chance 2050 (e.g., Game A)
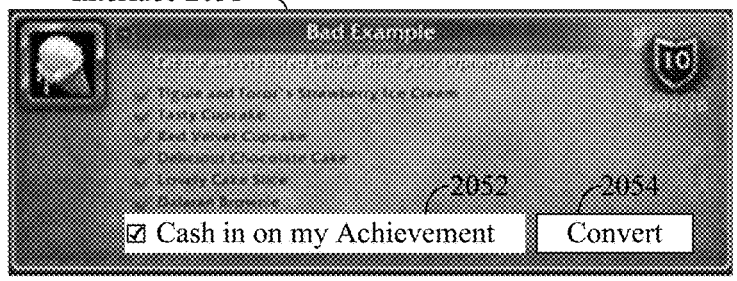
Interface 2051
2052  2054
☑ Cash in on my Achievement   Convert
Game of Chance 2060 (e.g., Game B)
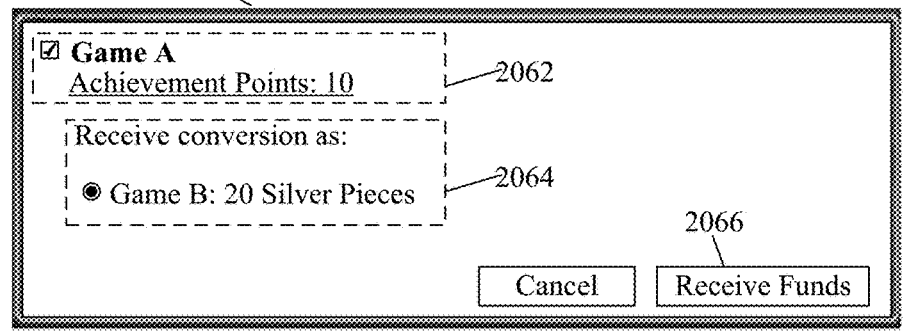
Interface 2061
☑ Game A
Achievement Points: 10    — 2062
Receive conversion as:
● Game B: 20 Silver Pieces  — 2064
2066
Cancel   Receive Funds
FIG. 20

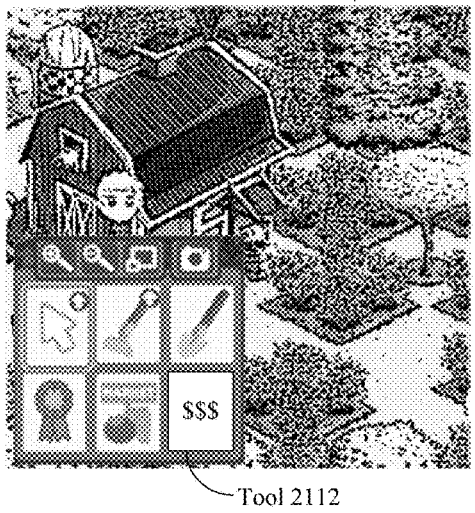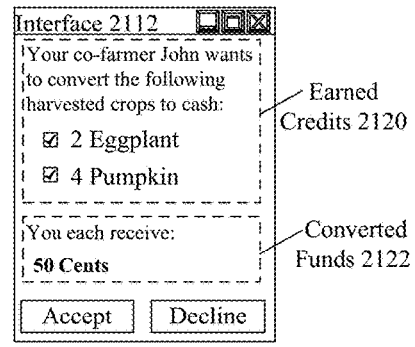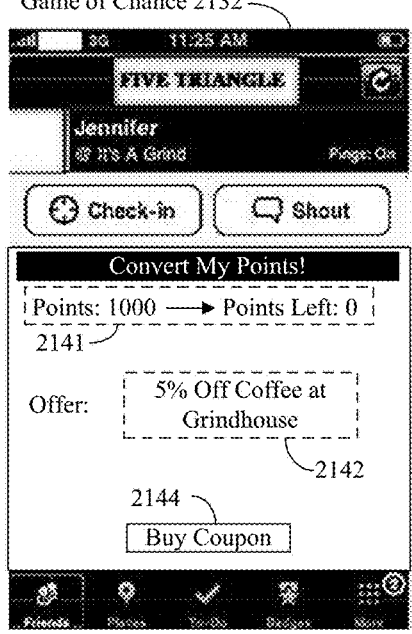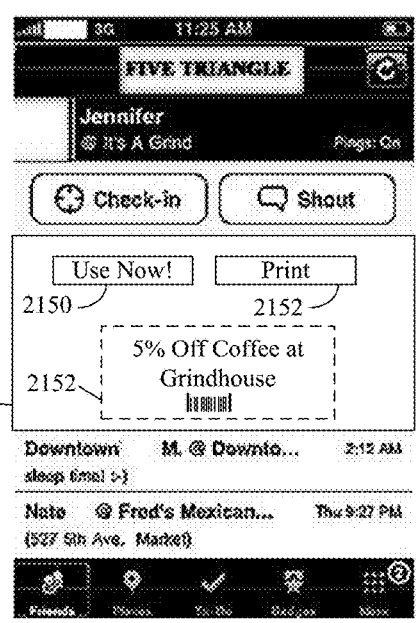
FIG. 21

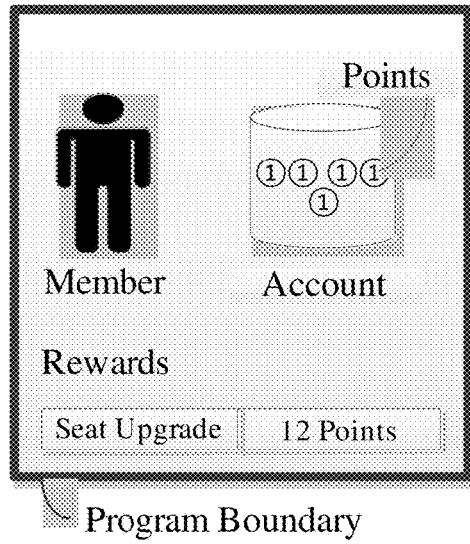
FIG. 22A
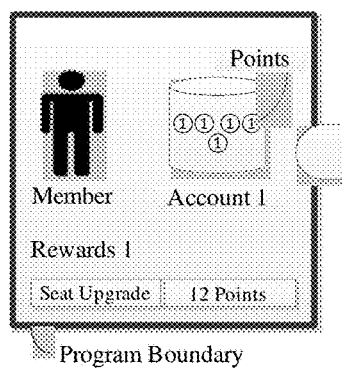 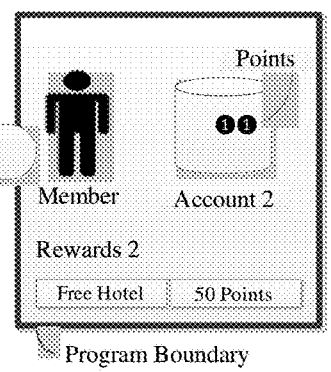
FIG. 22B

AUTOMATED TELLER MACHINE (ATM) PROVIDING MONEY FOR LOYALTY POINTS

CROSS-REFERENCE TO RELATED APPLICATIONS

This is a continuation in part application of U.S. application Ser. No. 15/013,129 (Filed 2 Feb. 2016) titled "CONVERSION OF LOYALTY PROGRAM POINTS TO COMMERCE PARTNER POINTS PER TERMS OF A MUTUAL AGREEMENT", which is pending at the time of this filing. Application Ser. No. 15/013,129 is part of a chain of patents, each ultimately claiming priority to a parent that is U.S. application Ser. No. 11/420,255 (Filed 25 May 2006) now U.S. Pat. No. 7,703,673. The chain of priority and relationships is detailed below. Specific attention for FIG. 1-6 and contents of these sections is provided from U.S. application Ser. No. 13/168,814 (Filed 24 Jun. 2011) now U.S. Pat. No. 8,376,224 ('224 patent) having content incorporated in its entirety through the pending application Ser. No. 15/013,129. As filed, the present application includes content in its independent claims from the specification of the '224 patent. Because the U.S. application Ser. No. 15/013,129 is and patents in that chain to the '224 patent incorporate the content of the '224 patent by reference in its entirety, this application is properly considered a continuation in part of U.S. application Ser. No. 15/013,129 as the FIGS. 1-6 at least appear different from those of U.S. application Ser. No. 15/013,129. The '224 patent has figures consistent with U.S. provisional patent 61/358,650 titled "SELF-SERVICE STATIONS FOR UTILIZING NON-NEGOTIABLE CREDITS EARNED FROM A GAME OF CHANCE", which was filed on 25 Jun. 2010. The '224 patent was a continuation application of U.S. application Ser. No. 15/013,129 (Filed 2 Feb. 2016), which converted the provisional application of U.S. provisional patent 61/358,650 thus, the chain of priority to the '650 provisional to the '224 patent is proper. The above paragraph is provided as an explanation serving to assist in clarity, especially given that the chain for priority is complex as detailed below.

This is a continuation application of U.S. application Ser. No. 15/013,129 (Filed 2 Feb. 2016), which is a continuation of U.S. application Ser. No. 14/612,863 (Filed Feb. 3, 2015); Ser. No. 14/314,178 (filed Jun. 25, 2014); U.S. application Ser. No. 14/314,196 (Filed Jun. 25, 2014); and U.S. application Ser. No. 14/314,297 (Filed Jun. 25, 2014). The above applications claim the benefit of U.S. Pat. No. 7,703,673 (Filed May 25, 2006); U.S. Pat. No. 8,123,127 (Filed Mar. 10, 2010); U.S. Pat. No. 8,162,209 (Filed Apr. 13, 2010); U.S. Pat. No. 8,181,863 (Filed Jan. 26, 2012); U.S. Pat. No. 8,181,864 (Filed Jan. 26, 2012); U.S. Pat. No. 8,186,583 (Filed Jan. 26, 2012); U.S. Pat. No. 8,201,734 (Filed Mar. 23, 2012); U.S. Pat. No. 8,245,925 (Filed Apr. 6, 2012); U.S. Pat. No. 8,267,315 (Filed May 24, 2012); U.S. Pat. No. 8,297,502 (Filed Jun. 25, 2012); U.S. Pat. No. 8,313,023 (Filed Jun. 25, 2012); U.S. Pat. No. 8,342,399 (Filed Jul. 5, 2012); U.S. Pat. No. 8,376,224 (Filed Jun. 24, 2011); U.S. Pat. No. 8,511,550 (Filed Apr. 16, 2013); U.S. Pat. No. 8,523,063 (Filed Apr. 16, 2013); U.S. Pat. No. 8,523,064 (Filed May 21, 2013); U.S. Pat. No. 8,540,152 (Filed May 23, 2013); U.S. Pat. No. 8,668,146 (Filed Nov. 20, 2012); U.S. Pat. No. 8,162,209 (Filed Apr. 13, 2010) and U.S. Pat. No. 8,684,265 (Filed Nov. 20, 2012), and Ser. No. 13/969,936 (filed Aug. 19, 2013); U.S. application Ser. No. 13/969,896 (Filed Aug. 19, 2013); U.S. application Ser. No. 13/969,873 (Filed Aug. 19, 2013); U.S. application Ser. No. 14/034,492 (Filed Sep. 23, 2013); U.S. application Ser. No. 14/024,921 (Filed Sep. 12, 2013); and U.S. application Ser. No. 14/024,936 (Filed Sep. 12, 2013); U.S. application Ser. No. 14/611,764 (Filed Feb. 2, 2015); and U.S. application Ser. No. 14/549,210 (Filed Nov. 20, 2014).

Walking the chain of priority and the relationships in order by date (all applications and patents are U.S. Applications), the original filing is U.S. application Ser. No. 11/420,255 filed on May 25, 2006 issued as U.S. Pat. No. 7,703,673 (the '673 patent). U.S. application Ser. No. 12/720,743 now U.S. Pat. No. 8,123,127 (the '127 patent) filed Mar. 10, 2010 is a continuation in part (CIP) of the '673 patent. U.S. application Ser. No. 12/759,506 now U.S. Pat. No. 9,162,209 (the '209 patent) filed Apr. 13, 2010 is a continuation of the '127 patent and a CIP of the '673 patent. U.S. application Ser. No. 13/168,814 now U.S. Pat. No. 8,376,224 (the '224 patent) filed on Jun. 24, 2011 is a CIP of the '673, '127, '209 patents, and converts provisional 61/358,650 filed on Jun. 25, 2010. U.S. application Ser. No. 13/359,080 now U.S. Pat. No. 8,181,863 (the '863 patent) filed on Jan. 26, 2012 is a continuation of the '673 patent. U.S. application Ser. No. 13/359,104 now U.S. Pat. No. 8,181,864 (the '864 patent) filed on Jan. 26, 2012 is a continuation of the '673 patent. U.S. application Ser. No. 13/359,120 now U.S. Pat. No. 8,186,583 (the '583 patent) filed on Jan. 26, 2012 is a continuation of the '673 patent. U.S. application Ser. No. 13/428,656 now U.S. Pat. No. 8,201,734 (the '734 patent) filed on Mar. 23, 2012 is a continuation of the '673 patent. U.S. application Ser. No. 13/441,365 now U.S. Pat. No. 8,245,925 (the '925 patent) filed on Apr. 6, 2012 is a continuation of the '673 patent. U.S. application Ser. No. 13/441,365 now U.S. Pat. No. 8,267,315 (the '315 patent) filed on May 24, 2012 is a continuation of the '673 patent. U.S. application Ser. No. 13/532,342 now U.S. Pat. No. 8,297,502 (the '502 patent) filed on May 24, 2012 is a continuation of the '673 patent. U.S. application Ser. No. 13/531,904 now U.S. Pat. No. 8,313,023 (the '023 patent) filed on Jun. 25, 2012 is a continuation of the '673 patent. U.S. application Ser. No. 13/542,451 now U.S. Pat. No. 8,342,399 (the '399 patent) filed on Jul. 5, 2012 is a CIP of the '673, '127, '209, and '224 patents, and converts provisional 61/595,351 filed on Feb. 6, 2012, 61/595,263 filed on Feb. 6, 2012, and 61/595,429 filed on Jun. 25, 2010. U.S. application Ser. No. 13/681,479 now U.S. Pat. No. 8,684,265 (the '265 patent) filed on Nov. 20, 2012 is a CIP of the '673, '127, '209, '224, '399 patents, and converts provisional 61/595,351, 61/595,263, and 61/595,429. U.S. application Ser. No. 13/681,493 now U.S. Pat. No. 8,668,146 (the '146 patent) filed on Nov. 20, 2012 is a CIP of the '673, '127, '209, '224, '399 patents, and converts provisional 61/595,351, 61/595,263, and 61/595,429. U.S. application Ser. No. 13/863,605 now U.S. Pat. No. 8,523,063 (the '063 patent) filed on Apr. 16, 2013 is a continuation of the '399, '146, and '265 patents and is a CIP of the '673 patent. U.S. application Ser. No. 13/863,556 now U.S. Pat. No. 8,511,550 (the '550 patent) filed on Apr. 16, 2013 is a continuation of the '673 and '502 patents and a CIP of the '146 and '265 patents. U.S. application Ser. No. 13/899,023 now U.S. Pat. No. 8,523,064 (the '064 patent) filed on May 21, 2013 is a continuation of the '502 patent. U.S. application Ser. No. 13/901,175 now U.S. Pat. No. 8,540,152 (the '152 patent) filed on May 23, 2013 is a continuation of the '399 patent. U.S. application Ser. No. 14/034,492 now U.S. Pat. No. 8,833,650 (the '650 patent) filed on Sep. 23, 2013 is a continuation of the '152 patent and is a CIP of the '673 patent. U.S. application Ser. No. 13/969,873 now U.S. Pat. No. 8,763,901 (the '901 patent) filed on Aug. 19, 2013 is a continuation of the '502 patent and application Ser. No. 13/420,255 and is a CIP of the '146 patent and the '265 patent. U.S. application Ser. No. 13/969,896 now U.S. Pat. No. 8,783,563 (the '563 patent) filed on Aug. 19, 2013 is a continuation of the '502, '550, and '064 patents and application Ser. No. 13/420,255 and is a CIP of the '146 patent and the '265 patents. U.S. application Ser. No. 13/969,936 now U.S. Pat. No. 8,794,518 (the '518 patent) filed on Aug. 19, 2013 is a continuation of the '502, '550, and '064 patents and application Ser. No. 13/420,255 and is a CIP of the '146 patent and the '265 patents. U.S. application Ser. No. 14/024,936 now U.S. Pat. No. 8,789,752 (the '752 patent) filed on Sep. 12, 2013 is a continuation of the '146, '265, and '152 patents. U.S. application Ser. No. 14/024,921 now U.S. Pat. No. 8,807,427 (the '427 patent) filed on Sep. 12, 2013 is a continuation of the '146, '265, and '152 patents. U.S. application Ser. No. 14/314,178 now U.S. Pat. No. 8,944,320 (the '320 patent) filed on Jun. 25, 2014 is a continuation of the '673, '518, 901, 563, 752, 427, and 650 patent. U.S. application Ser. No. 14/314,196 now U.S. Pat. No. 8,973,821 (the '821 patent) filed on Jun. 25, 2014 is a continuation of the '518, '901, '563, '752, '427, and '650 patents and is a CIP of the '673 patent, U.S. application Ser. No. 14/314,297 now U.S. Pat. No. 8,950,669 (the '669 patent) filed on Jun. 25, 2014 is a continuation of the '673, '518, '901, '563, '752, '427, and '650 patents and is a CIP of the '673 patent. U.S. application Ser. No. 14/611,764 now U.S. Pat. No. 9,230,264 (the '264 patent) filed on Feb. 2, 2015 is a continuation of the '821, '669, and '320 patents. U.S. application Ser. No. 14/612,863 now U.S. Pat. No. 9,251,528 (the '528 patent) filed on Feb. 3, 2015 is a continuation of the '821, '669, and '320 patents. U.S. application Ser. No. 15/013,129 (the '129 application) filed on Feb. 2, 2016 is a continuation of the '528, '320, '821, and '669 patents.

The present filing is a CIP of the '673 patent (application Ser. No. 11/420,255), the '127 patent (application Ser. No. 12/720,743), the '209 patent (application Ser. No. 12/759,506), the '224 patent (application Ser. No. 13/168,814), the '863 patent (application Ser. No. 13/542,451), the '864 patent (application Ser. No. 13/542,451), the '583 patent (application Ser. No. 13/542,451), the '734 patent (application Ser. No. 13/542,451), the '925 patent (application Ser. No. 13/542,451), the '315 patent (application Ser. No. 13/542,451), the '502 patent (application Ser. No. 13/542,451), the '023 patent (application Ser. No. 13/531,904), the '399 patent (application Ser. No. 13/542,451), the '550 patent (application Ser. No. 13/863,556), the '064 patent (application Ser. No. 13/899,023), the '175 patent (application Ser. No. 13/901,175), the '265 patent (application Ser. No. 13/681,479), the '146 patent (application Ser. No. 13/681,493), the '063 patent (application Ser. No. 13/863,605), the '650 patent (application Ser. No. 14/034,492), the '901 patent (application Ser. No. 13/969,873), the '563 patent (application Ser. No. 13/969,896), the '752 patent (application Ser. No. 14/024,936), the '518 patent (application Ser. No. 13/969,936), the '427 patent (application Ser. No. 14/024,921), the '320 patent (application Ser. No. 14/314,178), the '821 patent (application Ser. No. 14/314,196), the '669 patent (application Ser. No. 14/314,297), the '264 patent (application Ser. No. 14/611,764), the '528 patent (application Ser. No. 14/612,863), and the '129 application (application Ser. No. 15/013,129).

The entire contents of each and every one of the above utility and provisional applications and patents are incorporated by reference herein in their entirety.

BACKGROUND

Field of the Invention

The present invention relates to the field of interactive, unattended service architecture and automated teller machines (ATMs), and more particularly, to automated teller machines (ATMs) and other kiosks that provide money for loyalty points and other non-negotiable credits as well as provide functions from an ATM/Kiosk related to loyalty points and non-negotiable credits.

Description of the Related Art

Entities often reward consumers for utilizing their services with entertainment credits. These non-negotiable credits can often be applied towards products and/or services provided by a granting entity or its affiliates. The entity offering the reward can be a gambling institution and the entertainment credits can be earnings from wagers while playing a game of chance. Entertainment credits can have no value outside the gambling institution and cannot be used for purchases outside the casino. Thus, to perform purchases at venues independent of the casino with earnings, frequently patrons are required to "cash out" to change entertainment credits (e.g., casino tokens) earned from the game of chance to currency (e.g., paper money).

Many problems are inherent to the current techniques for the redemption (i.e., "cash out") of entity provided credits. One such problem is the high level of manpower necessary during the cash out and conversion process. Manpower is arguably the highest operation cost associated with any enterprise and business cost saving measures routinely begin with personnel cutbacks and subsequent automation, which can be evidence by the brokered rise of kiosks.

Another drawback of the traditional cash out procedure can be security related (i.e., it facilitates theft). Moreover, patrons of a venue may often prefer to conduct transactions utilizing a self-service kiosk rather than wait in long lines for human assistance. One area immature in automation technology is where earnings from games of chance occur.

Merchants have used loyalty rewards programs for many years to create and maintain customer loyalty and increase the perceived value of their goods and services. However, the perceived value of the loyalty program rewards points is diminished by the limited redemption options available to the loyalty program member that the reward points granting entity provide.

Loyalty point exchange systems emerged that allow members of different loyalty programs to exchange rewards points in one loyalty program for loyalty points in another. The exchange systems did not operate loyalty points programs of their own, but acted as proxies for a number of third party loyalty program operators. In these exchange systems, no loyalty program operator had any agreement with any other loyalty program operator. Instead, each loyalty program operator unilaterally established a "buy rate" and "sell rate," which the exchange system relied upon. POINTS.COM is an example of such an exchange system that necessarily suffers from a low conversion rate and a continuous loss of value, as each transaction is an open market transaction. Open market transactions impede an ability of a loyalty program operator to shape future consumer behavior, which is a value of running the loyalty program achieved by the loyalty program operator. In other words, open market transactions turn otherwise negotiable units of value (loyalty points) into a fungible unit of value, thereby circumventing loyalty operator established restrictions, conditions, and constraints intentionally implemented for member behavior shaping purposes. Traditionally, exchange centers (like POINTS.COM) have not recognized pitfalls of turning non-negotiable units of value (loyalty points) into fungible units of exchange, which is addressed herein in a novel manner.

That is, conventional exchange systems had certain drawbacks inherent in their implementations that are consistent with blindspots present in conventional teachings specific to loyalty points and their transferability. In conventional exchange systems, customer loyalty to a particular merchant was reduced, loyalty program operator's ability to channel customer behavior was diminished, and the centralized loyalty point conversion systems added a middleman charge to every transaction. The inventors of the present disclosure and related patents of the same family realized that by limiting the points conversions by agreement to complementary businesses such as hotels, airlines, and rental car agencies, the agreed parties could offer their loyalty program members the benefits of increased redemption options while still getting the benefit of creating and maintaining customer loyalty that the loyalty programs were intended to provide. Furthermore, customer behavior could be channeled to the benefit of each of the commerce partners who were parties to the agreement, and cross promotions and other marketing programs could enhance each partners business with no detriment to their complementary business partners. Thus, advantages of a specific consumer partner relationship and member exposure to this relationship serves to balance negatives resulting from increased fungibility of loyalty program points, from a program operator perspective.

The value of the synergy created by these agreed loyalty point conversion arrangements was not apparent to loyalty program operators at the time of the filing of the parent patent in the present patent family on May 25, 2006, as evidenced by the lack of any such systems at that time. Today, however, almost all sole source loyalty program operators (operators having strong loyalty program barriers that expressly impose restrictions, conditions, and constraints that limit fungibility of granted loyalty points) in the airline, hotel, rental car agency, credit card, and other industries operate under these kind of mutually beneficial points conversion agreements.

Another attempted solution to granting consumers increased redemption options is to aggregate large sets of retailers into a single rewards program. These aggregated programs, sometimes referred to as networked loyalty programs, have disadvantages in that participating retailers surrender control to a centralized, aggregate program. In these programs, many merchants distribute points originated by the networked program operator that secures or backs the points (thus guaranteeing the value). Within the network loyalty program, network points are fungible across point distributing merchants. In these networked loyalty programs, however, merchants are restricted from shaping behavior of customer to an extent possible with sole source program since incentives present for the program operator (the networked loyalty program operator) are based on increasing merchant and consumer participation to create a "natural monopoly" that reinforces and incentives participants to join the networked program (which the networked loyalty program operator receives fees or profit on a per-transaction basis, justifying the operating costs from the program operator perspective). Thus, merchants do not have their own "program" but are participants in the networked program, which inherently imposes operating constraints on the merchant distributors—as there is a tension between merchant desires/incentives and those of the networked loyalty program operator. In other words, merchants have a hard time restricting redemption options to those minimizing merchant costs and have a challenge shaping consumer behavior using restrictions, conditions, and other constraints (such as redemption constraints, expiration dates that provide point pressure on members, and member-ship requirements specific to the merchant as other merchants are point distributing participants by nature of a networked program) that are inherently/implicitly present in a well-balanced independent loyalty program (such as those typically operated by airlines and hotels). For example, if competitors are permitted to join in the aggregate program (as merchant point distributors), customers of the aggregate program have options within the program for competing goods and services. Loyalty to a specific retailer is compromised.

In the present disclosure, the loyalty points are "non-negotiable" because of the restrictions imposed by the points granting entity become, as a result of the conversion, funds that are independent of the granting entity and its restrictions.

BRIEF DESCRIPTION OF THE DRAWINGS

There are shown in the drawings, embodiments which are presently preferred, it being understood, however, that the invention is not limited to the precise arrangements and instrumentalities shown.

FIG. 9 is a depiction of successive GUIs that illustrate a web based credit granting event with credit redemption indicia and subsequent conversion of non-negotiable funds into negotiable funds in accordance with an embodiment of the inventive arrangements disclosed herein.

FIG. 14 is a depiction of a scenario and a set of GUIs for converting non-negotiable funds earned through participation awards into negotiable funds in accordance with an embodiment of the inventive arrangements disclosed herein.

FIG. 15 is a depiction of a scenario and a set of GUIs for converting non-negotiable funds earned through personal achievements into negotiable funds in accordance with an embodiment of the inventive arrangements disclosed herein.

FIG. 16 is a depiction of a scenario and a set of GUIs for converting non-negotiable funds earned through sponsored initiatives or subsidies into negotiable funds in accordance with an embodiment of the inventive arrangements disclosed herein.

FIG. 17 is a depiction of scenarios and GUIs for converting non-negotiable funds earned through social networking activities into negotiable funds in accordance with an embodiment of the inventive arrangements disclosed herein.

FIG. 20 is a schematic diagram illustrating a set of interfaces within a game of chance for the conversion of non-negotiable credits to negotiable funds in accordance with an embodiment of the inventive arrangements disclosed herein FIG. 21 is a flowchart illustrating a set of embodiments within a game of chance for the conversion of non-negotiable entertainment credits to negotiable funds in accordance with an embodiment of the inventive arrangements disclosed herein.

FIG. 22a is a flowchart illustrating a loyalty program for a business.

FIG. 22b is a flowchart illustrating two loyalty programs for two different business that are connected by a "bridge".

DETAILED DESCRIPTION

Figure 1:
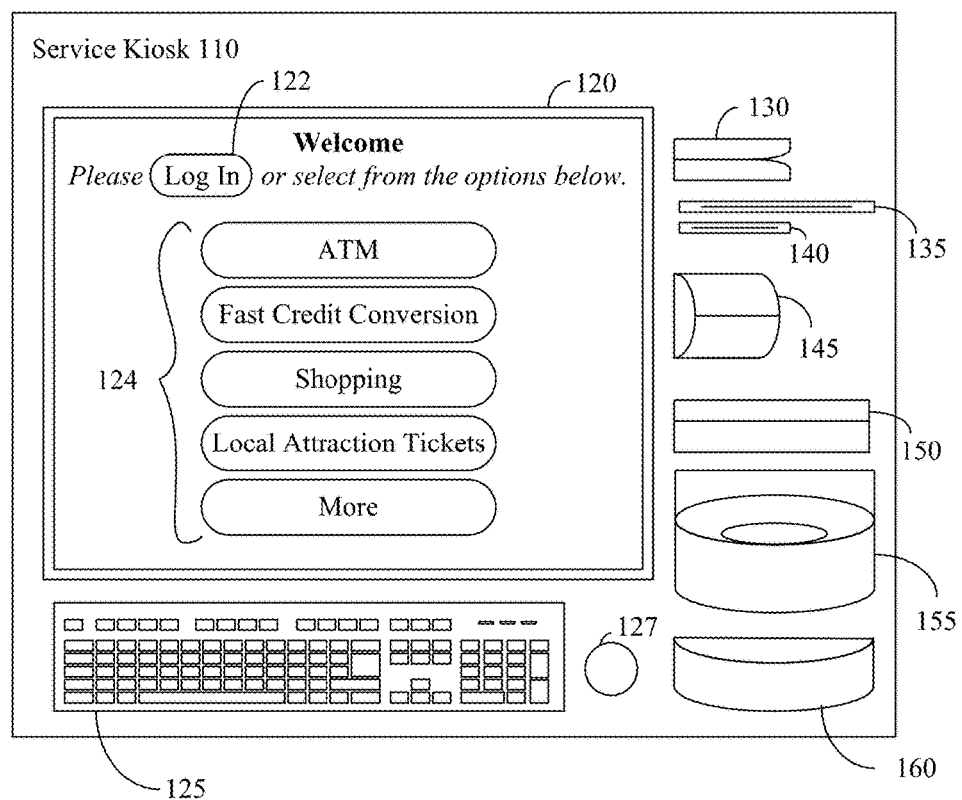
FIG. 1 is a diagram of a service kiosk in which a multitude of traditional (ATM, etc.) as well as non-traditional (i.e., entertainment credit conversion, e-commerce transactions, etc.) functions can be performed via a single machine.

FIG. 1 is a diagram 100 of a service kiosk 110 in which a multitude of traditional (e.g., automated teller machine, etc.) as well as non-traditional (i.e., entertainment credit conversion, e-commerce transactions, etc.) functions can be performed. In accordance with an embodiment of the disclosure, kiosk 110 can be an example of a multi-function kiosk. In this instance, an automated teller machine (ATM) that can be placed on the premise of say a casino or other entertainment venue can perform what can be described as classic functions of an ATM (e.g., financial account access, withdrawals, deposits, transfers, etc.) as well as other, non-traditional functions. These non-traditional functions can be associated with converting earnings from a game of chance in the form of entertainment credits to negotiable credits (e.g., currency) and the use of those negotiable credits.

Service kiosk 110 can include interactive screen 120, which can take a variety of fashions, such as a touch screen or an LCD screen with control buttons, and the like. Interactive screen 120 can display options for logging in 122 to a user account with the entertainment venue, as well as other service kiosk 110 options 124 such as an option to solely access traditional ATM functions, do a fast credit conversion, conduct e-commerce transactions (shopping), redeem credits for local attraction tickets, and the like. Service Kiosk 110 can also include keyboard 125 and mouse 127 to facilitate ease of use for the user.

Moreover, service kiosk 110 can include hardware and software components necessary for proper implementation and functions the self service kiosk 110 can allow users to perform. For example, self service kiosk 110 can include card reader 130, receipt/transaction record printer 135, voucher/earnings ticket receiver 140, bill receptacle 145, bill presenter 150, credit chip counter/coin counter 155, credit chip/coin return 160, and the like.

Card reader 130 can be utilized to read and amend information for account access via regular ATM cards, entertainment venue club cards, and the like. Voucher/earnings ticket receiver 140 can accept and read vouchers, earnings tickets, and the like, whereas bill receptacle 145 can accept paper currency (e.g., U.S. dollar bills, game paper bills, etc.) for use in performing user selected service kiosk 110 functions 124. Bill presenter 150 can dispense paper currency (legal tender, non-legal tender such as game bills, etc.).

Entertainment credit chip counter 155 can be a dual function counter for both coins and entertainment "chips" or tokens. In one instance, credit chip counter 155 can function much like a traditional coin counter that can potentially utilize a coin counting machine technique where a typical counter of presorted coins uses a bowl with a flat spinning disc at the bottom to distribute coins around the bowl perimeter. In this instance, an opening in the edge of the bowl can be wide enough to accept only one coin at a time and coins can either pass through a light-beam counter, or can be pushed through a spring loaded cam that only accepts one coin at a time. The entertainment credit chip counter can be combined with a chip verifier (e.g., using RFID or barcode, etc.) to increase security. In another instance, chips can be encoded with information regarding the date of the earning and if the date is outside of a certain entity determined redemption date range the service kiosk may return (via chip and coin return 160) the selected unverified entertainment credit chips to the user with a prompt asking the user to please see a human teller for assistance with the remaining entertainment credit tokens.

For the purposes of this disclosure, a kiosk can be a form of interactive computer terminal that provides information access via electronic methods. Most kiosks can provide unattended access to web applications. Interactive kiosks can typically be placed in high foot traffic settings such as hotel lobbies or airports. Kiosks can perform a wide range of functions, evolving into self-service kiosks. For instance, kiosks may enable users to enter a public utility bill account number in order to perform an online transaction, or collect cash in exchange for merchandise (e.g., the Best Buy or Rosetta Stone vending machines in airports and malls).

Self-service kiosks can be hardware devices that work in combination with self service software, allowing users to perform any number of possible transactions. The method of input can, for instance, be either a keyboard, touch-screen, or both. Some kiosks can include card readers, ticket and receipt printers, bill and coin depositors, robotic product arrays, bar code scanners, identification devices including biometrics, and other more complex mechanical devices.

Terminals can be connected to the internet and can provide access to a customized, unattended version of some sort of application. Intended for both consumers and business industries, benefits include ease of access, reduced transaction time, access to information and the ability to perform multiple transactions. More specifically, benefits can be [1] Reduction in staff and real estate requirements since one employee can monitor multiple self-service kiosks; [2] Unattended operation with extended service hours and off-site locations; [3] Provide users with a more enjoyable experience boosting customer satisfaction; [4] Track usage statistics, etc.

Figure 2:
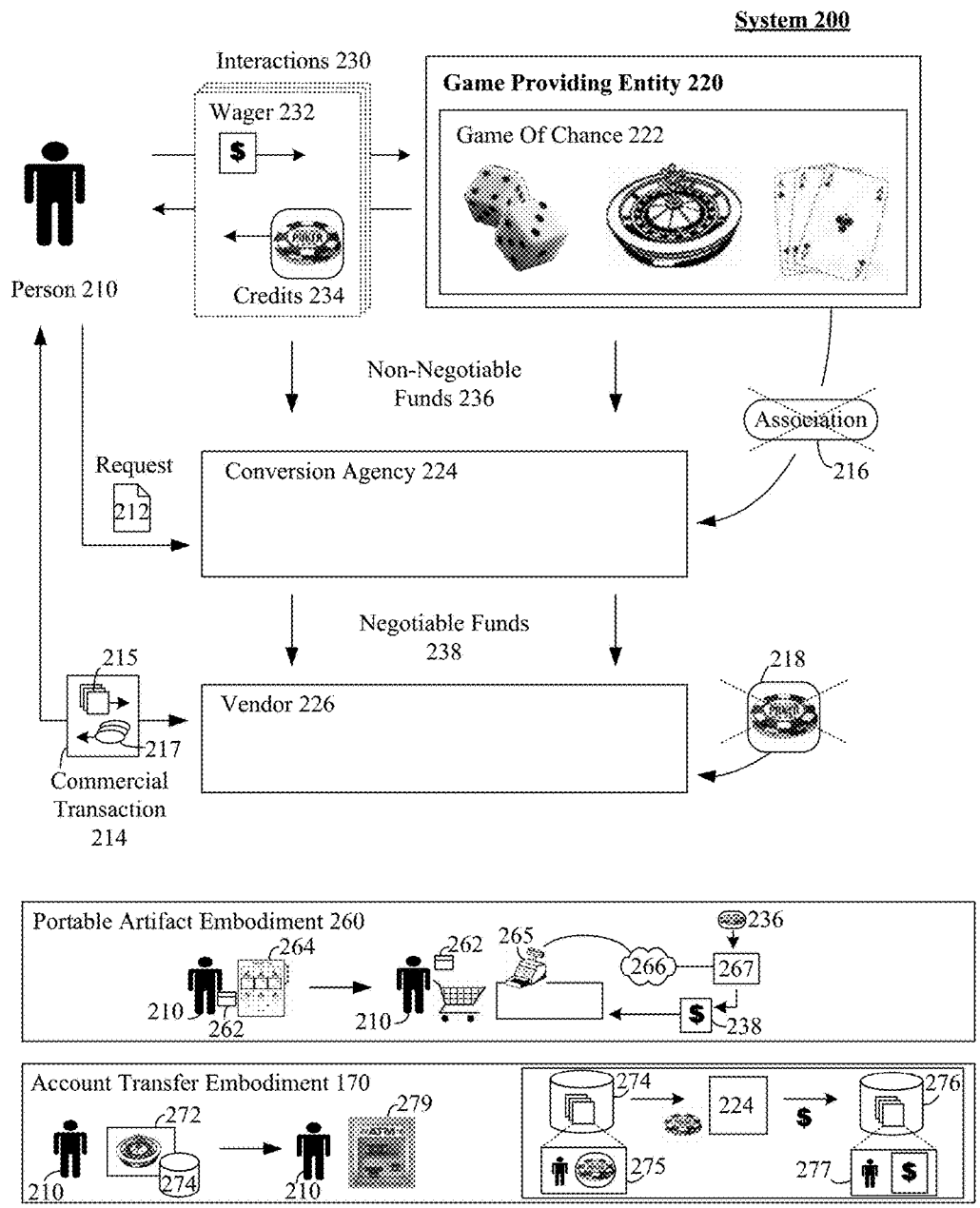
FIG. 2 is a diagram of a system in which non-negotiable funds earned from a game of chance are converted into negotiable funds in accordance with an embodiment of the inventive arrangements disclosed herein.

FIG. 2 is a diagram of a system 200 in which non-negotiable funds 236 earned from a game of chance 222 are converted into negotiable funds 238 in accordance with an embodiment of the inventive arrangements disclosed herein. The non-negotiable funds 136 can be used during a kiosk commercial transaction 214 to receive goods/services from a vendor 226. In one embodiment, multiple interactions 230 can occur between a person 210 and a game providing entity 220, in which the person 210 plays a game of chance 222. During each interaction 230, an optional wager 232 can be made. With each successful outcome of the game of chance 222, person 210 can receive entertainment credits 134. With each non-successful outcome of the game of chance 222, the person 210 can lose their wager 232 (if one is made).

The entertainment credits 234 are non-negotiable funds 236. These funds 236 (e.g., the entertainment credits 234) may not be redeemable on an open market. For instance, vendor 226 will not accept 218 the entertainment credits 234 for commercial transactions 214. A conversion agency 224, which is not directly associated 216 with the game providing entity 220 can convert the non-negotiable funds 236 (which can be a quantity of entertainment credits 234) into negotiable funds 238. This conversion can occur in response to a request 212 by person 210. The request 212 can be explicit or implied. For instance, a person can provide vendor 226 with the non-negotiable funds 236, which causes the vendor 226 to convey funds 236 to the conversion agency 224 and receive negotiable funds 238 in return. Thus, a sequence of events between the request 212, commercial transaction 214, conversion agency 224, vendor 226, and person 210 can be altered and still be considered within scope of the disclosure. Further, delays can be introduced in the fund conversion process (between funds 236 and 238), as can different types of fund-based transactions, such as loans, pre-payment, post-payments, and the like. For instance, conversion agency 224 can advance the vendor 226 a quantity of negotiable funds 238, which is legally considered a loan made by the conversion agency 224 to the person 210. The game providing entity 220 can repay the loan to the conversion agency 224 for the person 210.

Person 210 can conduct a commercial transaction 214 with vendor 226. During the transaction 214, the person 210 can specify a user-selected set of requests 215 for goods and/or services 217 of the vendor 226. The goods and/or services 217 can cost a quantity of negotiable funds 238, which are provided to the vendor 226. In one embodiment, the negotiable funds 238 can be provided directly to the vendor 226 by the conversion agency 224. In another, the negotiable funds 238 can be provided by the conversion agency 224 to person 210, who provides these funds 238 to the vendor 226.

Numerous embodiments exist for conducting the conversions as described herein, a few of which are shown as embodiments 260 and 270. Embodiment 260 shows a portable artifact embodiment, where a person 210 stores entertainment credits 234 from the game of chance 222 upon a portable artifact 262, which can be a physical card with a magnetic strip, a RFID storage device, a flash memory card, a paper voucher, or other tangible artifact able to store digitally encoded (analog encoded, or even paper encoded or written) data. Machines 264 upon which the games of chance 222 are played can include a reader/writer able to alter content stored on the portable artifact 262. In one embodiment, the "writer" can print vouchers to paper. The reader/writer need not be integrated into the machine 264, but can be a separate machine, in one embodiment of the disclosure.

In one configuration, wagers 232 can be made from value stored on the artifact 262 and earnings (e.g., credits 234) can be recorded on the artifact 262. The person 210 can thereafter shop at a kiosk of vendor 226 and present a cashier 264 with the artifact 262. A cash register 265 used by the cashier 264 can be connected to a network 266. The conversion agency 224 can have a network element 268 connected to the network 266, which converts non-negotiable funds 236 on the artifact 262 into a quantity of negotiable funds 238 needed to complete the commercial transaction 214 conducted via the register 265 and cashier 264. From the perspective of the vendor 226, the transaction 214 conducted via the register 265 is a "standard" transaction that results in the vendor 226 receiving suitable negotiable funds 238 for providing the goods/services 217 to person 210. In another embodiment, a "non-standard" transaction can occur, which involves the vendor 226 performing an additional set of one or more steps to explicitly convert the non-negotiable funds 236 to negotiable funds 238.

Embodiment 270 shows an account transfer embodiment 270, where a person 210 plays a game of chance 222. Earnings (e.g., 234, 236) from the game of chance 222 are recorded within a tangible data store 274 associated with the game providing entity 220. This data store 274 can include an account 275 for the person 210, which tracks an amount of entertainment credits 234, which are non-negotiable funds 236, of the person 210. Conversion agency 224 can directly access the account 275 of data store 274 and can convert a quantity of credits 234 into negotiable funds 238, which are recorded in a tangible data store 276 that is not directly associated with entity 220. The data store 276 can include an account 277 for the person 210, which contains an amount of negotiable funds 238, of the person 210. A person 210 can conduct commercial transactions 214 via a machine 279, such as a kiosk, an ATM machine, etc., which involve funds of account 277 changing. In one embodiment, the goods/services 217 received from person 210 in embodiment 270 can include cash (such as from an ATM machine). This cash can be an amount of cash-back received during transaction 214, can be the transaction 214 itself and may involve a transaction fee, which is extracted from account 277 by machine 279.

The embodiments 260, 270 are for illustrative purposes only and are not intended to be (or to be construed as being) exhaustive or comprehensive. For instance, any combinations of the embodiments 260, 270 are to be considered within scope of the disclosure. In a contemplated configuration, entertainment credits earned via machine 264 and placed on artifact 262 (per embodiment 260), which can be placed in a machine 279, such as an ATM (per embodiment 270) to extract funds 238, which are converted (by agency 224) from the credits 234 stored on artifact 262.

In one embodiment, the conversion agency 224 can be compensated (e.g., charge a processing fee) for converting the non-negotiable funds 236 to negotiable funds 238. This fee can be paid to conversion agency 224 by the game providing entity 220, the person 210, and/or by the vendor 226.

As used herein, a game of chance 222 can be a game in which an outcome is at least partially determined by random variables rather than strictly by strategy. There can be a level of "skill" or strategy involved in a game of chance 222, which can increase a person's 210 odds of a positive outcome. Common devices used in a game of chance 222 to add a significant random variable include dice, spinning tops, playing cards, roulette wheels, numbered balls drawn from a container, use of a computer or machine generated random number, and the like. Games of chance can also involve betting on an outcome of sports events and other such competitive games having an uncertain outcome.

Many (but not all) games of chance 222 are designed so that statistical odds favor the "house" or the game providing entity 220. That is, statistically, a large set of interactions 230 involving wagers 232 and credits 234 (assuming for the moment that the wagers 232 are credit 234 based wagers) will result in a net gain of credits 234 to the game providing entity 220 receiving more credits 234 (as wagers 232) than they provide (as winnings) over a relatively large set of interactions 230. Stated differently, a game of chance 222 can have mathematically-determined odds that ensure the house (e.g., game providing entity 220) has at all times an advantage over the players (e.g., person 210). This can be expressed more precisely by the notion of expected value, which is uniformly negative (from the player's (person 210) perspective). This advantage is called the house edge. In games of chance 220 such as poker where players (210) play against each other, the house (entity 220) takes a commission called the rake.

A game of chance 222 does not necessarily involve a wager 232, though it may. For instance, sweepstakes are a type of a game of chance 222, which may (e.g., lottery) or may not (e.g., promotional sweepstakes) involve a wager 232. A promotional sweepstakes can be a marketing promotion targeted towards both generating enthusiasm and providing incentive reactions among customers by enticing consumers to submit free entries into drawings of chance that are tied to product or service awareness wherein the featured prizes are given away by sponsoring companies.

A game of chance 222 is defined herein to include any type of gambling game or event. In many jurisdictions, local as well as national, gambling (e.g., games of chance 222) are banned, heavily controlled by licensing, and/or are subject to government regulations and restrictions. Under US federal law, gambling is legal in the United States, and states are free to regulate or prohibit the practice. Thus, any event of uncertain outcome that is subject to state (or federal) regulations under a gambling statute is to be considered a game of chance 222 and within scope of the inventive arrangements (and claims) detailed herein. Because American Indian reservations are considered federally granted lands not subject to state regulation in the same way as other lands, many reservations geographically located in states that prohibit gambling (e.g., games of chance 222) are permitted to provide these games of chance 222, since the lands are not subject to state gambling laws. Similarly, cruise ships that travel outside state jurisdictions, often permit gambling (considered a game of chance 222 for purpose of the claims/disclosure) once the ships are located in international waters.

Games of chance 222 can involve a variety of machines (e.g., 264, 272). In many instances regulations (typically under state gambling statutes) can impose that odds in these gaming devices be statistically random, which helps to prevent manufacturers from making some high-payoff results impossible.

Games of chance 222 can include, but are not limited to, the following types of gambling: casino games, table games, fixed odd betting, pari-mutuel betting, sports betting, and the like. Specific games of chance 222 include, but are not limited to, Craps, Roulette, Baccarat, Blackjack, Poker, Pachinko, slot machines, Video poker, Bingo, Keno, dead pool, lotteries, pull-tab games and scratch cards, Mahjong, card games (e.g., Liar's poker, Bridge, Basset, Lansquenet, Piquet, Put, Teen Patti), carnival games (e.g., The Razzle or Hanky Pank), coin tossing games (e.g., Head and Tail, Two-up), confidence tricks (e.g., Three-card Monte or the Shell game), dice-based games (e.g., Backgammon, Liar's dice, Passe-dix, Hazard, Threes, Pig, or Mexico), horse or greyhound racing, sports outcome betting, and the like.

Game providing entities 220 include any entity providing a game of chance 222 to others (person 210), where entertainment credits 234 can be earned. Game providing entities 220 can include casinos, cruise ships, States (for lottery, scratch off games, etc.), churches (e.g., running bingo games), race tracks, online gambling site providers, slot-machine houses, carnivals, gambling parlors, companies (for promotional sweepstakes), High Schools (for raffles), and the like.

The wager 232 can be bet in an outcome of winning a game of chance 222. The wager 232 can risk money, previously earned entertainment credits 234 or something of material value on an event with an uncertain outcome with an intent on winning additional money, credits 234, and/or material goods/services. Typically the outcome of a wager 232 is evident within a short period (such as a duration of the game of chance 222). An amount of entertainment credits 234 earned from winning the game of chance 222 can vary in direct proportion to an amount of the wager (or the stake, which is placed at risk against the uncertain outcome.) A wager 232 can have odds associated with it.

Entertainment credits 234 are non-negotiable funds 236 that generally have no value outside of an environment (building, Web site, etc.) of the game providing entity 220. For instance, casinos (one embodiment of entity 220) generally utilize casino tokens, chips, or plaques to represent a quantity of entertainment credits 234.

Use of entertainment credits 234, such as casino tokens, can be more convenient than use of negotiable funds 238 for many reasons. For instance, use of entertainment credits 234 makes theft and counterfeiting more difficult. Entertainment credits (which when having a physical representation are often a uniform size and weight) can be relatively easy to stack, count, etc. Additionally, studies have proven people (210) gamble more freely (play games of chance 222 with larger wagers 232 and frequency), when entertainment credits 234 than when wagering 232 with cash or other negotiable funds.

Additionally, use of entertainment credits 234, can have legal benefits that can permit entities 220 to conduct games of chance 222, which would be prohibited if negotiable funds 238 were utilized instead of entertainment credits 234. That is, numerous legal statutes and regulations exist that are more restrictive when gambling earnings are in a form of negotiable funds 238. For instance, the Unlawful Internet Gambling Enforcement Act (UIGEA) of 2006 prohibits many online gambling activities with negotiable funds 238, which are permitted with certain forms of non-negotiable funds 236. For instance, electronic fund transfers via credit cards or debit cards related to gambling winnings are generally prohibited by US banks. Similarly, wire transfers of negotiable funds 238 earned through games of chance 222 are legally prohibited in many instances. Many of these acts explicitly prohibit the transfer of negotiable funds from gambling earnings across state lines Non-negotiable funds 236 can include any of a variety of financial instruments that are not legal currency and not governed under article 3 of the Uniform Commercial Code (UCC). For instance, non-negotiable funds 236 can include IOUs issued by the game providing entity 220. In one embodiment, non-negotiable funds 236 can include secured transactions, which take a security interest on collateral owned by the game providing entity's 220 assets, which are subject to Article 9 of the UCC. In one embodiment, the non-negotiable funds 126 can include letters of credit, issued by the game providing entity 220.

Negotiable funds 238 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 238 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 238) is that they are payable to a bearer on demand.

The commercial transaction 214 can be one in which wherein the quantity of negotiable funds 238 are applied to user (210) specified (e.g., via request 215) purchase of a good or service 217. Stated differently, a commercial transaction can be an economic transaction where person 210 receives a good or a service from vendor 226 for value. Commercial transactions 214 can include a sale goods (217) from a kiosk, a Web site, a catalog (mail order), over the phone, and the like. Transaction 214 can also include a payment for a service requested by person 210. Payment of the negotiable funds 238 during the commercial transaction 214 can occur before, after, or concurrent with the receipt (or shipping) of the goods or service 217. A contract (including specifics established by the parties (210 and 226) as well as legal defaults provided by the UCC or applicable common law/state law) between the vendor 226 and person 210 established as part of the commercial transaction 214 can determine when payment (funds 238) for the goods/services 217 is due. In one embodiment, commercial transaction 214 can include transaction where currency is provided to person 210 by a vendor 226 (e.g., a bank as part of an ATM transaction) for a fee. This currency can be provided as a loan or as a withdrawal from an account of person 210, where the account includes the negotiable funds 238.

The conversion agency 224 can be a legal entity that converts non-negotiable funds 236 (including entertainment credits 234) into negotiable funds 238. The conversion agency 224 can lack a direct association 216 with the game providing entity 220. In one embodiment, no legal relationship of enablement of corporate identity (no parent, subsidiary, etc.) relationship can exist between the conversion agency 224 and entity 220. No fiduciary duties under corporate law can exist between agency 224 and game providing entity 220. In one embodiment, agency 224 can be geographically located outside property owned or leased by the game providing entity 220. In another, it can lease space and provide its services from entity 220 owned/leased land. In one embodiment, the conversion agency 224 can support multiple different game providing entities 220, which can be competitors of each other.

In one embodiment, the conversion agency is not a bank or similar financial institution (and may therefore be outside the guidelines established by UIGEA and other statues and regulations, which impose restrictions on banks). In one embodiment, the conversion agency 224 may be located in the same jurisdiction as the game providing entity (possibly to avoid legal entanglements/restrictions with operating in multiple or across jurisdictional boundaries) or may be located in a jurisdiction with favorable rules for performing the fund conversions.

Figure 3:
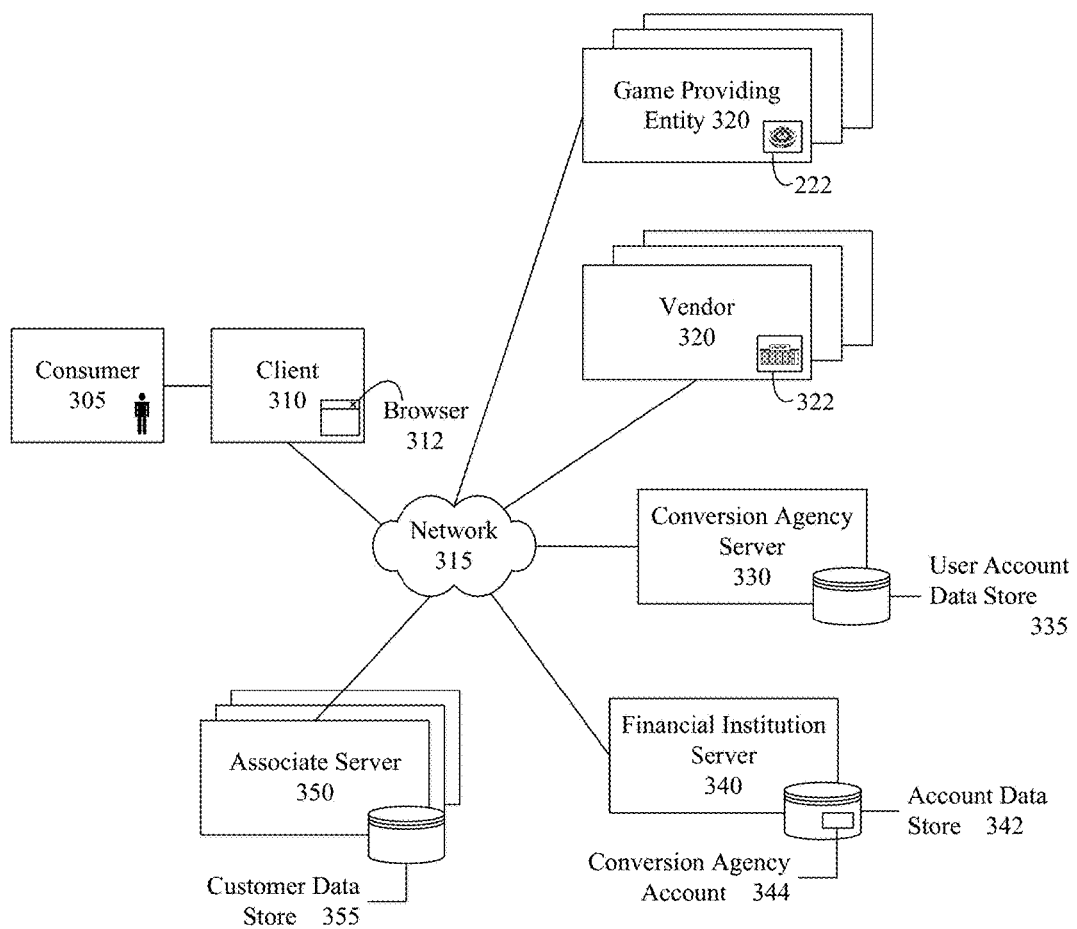
FIG. 3 is a schematic diagram of system for converting non-negotiable credits associated with a game providing entity to negotiable funds in accordance with an embodiment of the inventive arrangements disclosed herein.

FIG. 3 is a schematic diagram of system 300 for converting non-negotiable credits associated with a game providing entity to negotiable funds in accordance with an embodiment of the inventive arrangements disclosed herein. System 300 can represent a specific embodiment of system 200.

In system 300, consumer 305 can interact with a game of chance 222, such as through a game providing entity 220 (e.g., casino). Interactions can occur via a physical interaction with game of chance objects (e.g., dice, playing cards) or via a browser 312, rich internet interface, or other software executing upon client 310. Consumer 305 can purchase goods/services from kiosk 322 provided by vendor 320. These goods/services can be purchased using negotiable funds that a conversion agency server 330 provides. The conversion agency server 330 can convert entertainment credits resulting from earnings of a game of chance (non-negotiable funds) into the negotiable funds.

Client 310 can be any of a variety of devices including, but not limited to, a personal computer, a kiosk, a telephone, a personal data assistant (PDA), a mobile phone, a slot-machine, an electronic poker game, and the like. Client 310 can include hardware, such as a processor, a memory, and a bus connecting them (as can server 330, 340, and/or 350). The hardware can execute computer program products (software/firmware) that is stored in a non-transitory storage medium. In one embodiment, client 310 can operate in a stand-alone fashion. Alternatively, client 310 can be a device that cooperatively participates in a network of distributed computing devices. Network 315 can facilitate data exchanges over wireless as well as line-based communication pathways and protocols.

In one embodiment, consumer 305 and conversion agency server 330 can interact with associate server 350 and/or financial institution server 340 via network 315. Consumer 305 can interact physically with vendor 320 via kiosk 322. In one embodiment, vendor 320 may be accessible via a specialized type of kiosk 322 (i.e., a specialized web terminal not a generic browser as interface design for interactive kiosks typically requires larger buttons and simpler decision trees than designing for a web or computer based interactive) that may or may not be solely accessible on premises of the game providing entity 220 or via a user 210/consumer 305 member page to the game providing entity 220.

Conversion agency server 330 includes user account data store 335 in which consumer 305 is a member. Associate server 350 includes customer data store 355 in which consumer 305 is a member. The server 350 can be a server that maintains funds for a club or organization. For instance, an entertainment club can require members to contribute a membership fee, where the membership fees are maintained by the server 350. Financial institution server 340 includes account data store 342. Account data store 342 includes conversion agency account 344 corresponding to conversion agency 330.

Consumer 305 can earn non-negotiable credits from games of chance provided by game providing entity 320. These earnings (e.g., entertainment credits) can be managed by associate server 350 or consumer 305 (e.g., tokens). The quantity of these non-negotiable credits can be saved in customer data store 355. Consumer 305 (or vendor 320) can use conversion agency server 330 to convert the non-negotiable credits from associate server 350 into negotiable funds provided to the vendor 320 or financial institution 340. In one embodiment, conversion agency 330 can maintain multiple accounts for the consumer 305. These different accounts can be associated with different game providing entities, and with different types of non-negotiable credits.

For instance, consumer 305 can earn five hundred credits from participating in a game of chance provided by game providing entity 220. Consumer 305 can choose to use conversion agency 330 to convert any or all of these credits to a monetary equivalent prior to initiating a purchase at a kiosk 222. In one embodiment, kiosk 222 can include a means for consumer 305 to convert entertainment credits prior to initiating a purchase via a separate vendor 320 site accessible through the kiosk 222 (e.g., kiosk 222 may be a multifunction kiosk that can include modules to perform ATM as well as e commerce functions). Conversion agency 330 withdraws the necessary amount from conversion agency account 344 contained within the account data store 342 of financial institution 340 and transfers it to an account specified by consumer 305 (or by vendor 320). In another example, consumer 305 uses conversion agency 330 to complete a purchase at kiosk 222. Again, conversion agency 330 withdraws the necessary amount from conversion agency account 344 contained within the account data store 342 of financial institution 340 and transfers it to the account of e-commerce server 320.

Vendor 320 can provide a checkout system that supports purchases of goods or services with non-negotiable credits provided by consumer 305. In one embodiment, an intermediary financial object, such as a voucher, can be imposed between the entertainment credits (non-negotiable funds) and the negotiable funds that the vendor 320 receives. In one embodiment, the intermediary financial object can be restricted to a specific set of one or more vendors 320. For instance, the intermediary financial object can be a set of credits (e.g., a prepaid card) usable at a specific vendor. For purposes of the disclosure, it is unimportant as to whether the optional intermediate financial object is a negotiable instrument or a non-negotiable instrument, and it can be either depending on implementation specifics. Ultimately (regardless of a presence or lack of intermediary artifacts and steps), the vendor 320 receives negotiable funds 238 for providing goods/services to the consumer 305 and entertainment credits 234 (non-negotiable funds 236) are used towards the payment for the received goods/services. A commercial transaction (e.g., transaction 214) with the vendor 320 can involve the expenditure of entertainment credits in one embodiment. In another, the consumer 305 can be required to expend a mixture of negotiable funds and non-negotiable funds (entertainment credits 234) as payment for the vendor 320 provided goods/services.

In one embodiment, vendor 320 can include a distinct payment option in a kiosk checkout system for conversion agency 330. In one embodiment, this distinct payment option could process the conversion of credits through an interactive kiosk.

Financial institution server 340 can be any of a variety of entities including, but not limited to, a bank, a credit card company, an investment firm, and the like. In one embodiment, financial institution server 340 can reside in the same country as consumer 305 associate server 350, and/or game of chance server 320. In another embodiment, financial institution server 340 can reside in a country other than that of consumer 305 and/or associate server 350.

As shown herein, data stores 355, 335, 342, 276, 274, and the like can be physically implemented within any type of hardware including, but not limited to, a magnetic disk, an optical disk, a semiconductor memory, a digitally encoded plastic memory, a holographic memory, or any other recording medium. Each of the data stores 355, 335, 342, 276, 274 can be stand-alone storage units as well as a storage unit formed from a plurality of physical devices, which may be remotely located from one another. Additionally, information can be stored within each data store 355, 335, 342, 276, 274 in a variety of manners. For instance, information can be stored within a database structure or can be stored within one or more files of a file storage system, where each file may or may not be indexed for information searching purposes.

The network 315 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 315 can include local components and data pathways necessary for communications to be exchanged among computing device components and between integrated device components and peripheral devices. The network 315 can also include network equipment, such as routers, data lines, hubs, and intermediary servers which together form a packet-based network, such as the Internet or an intranet. The network 315 can further include circuit-based communication components and mobile communication components, such as telephony switches, modems, cellular communication towers, and the like. The network 315 can include line based and/or wireless communication pathways.

Figure 4:
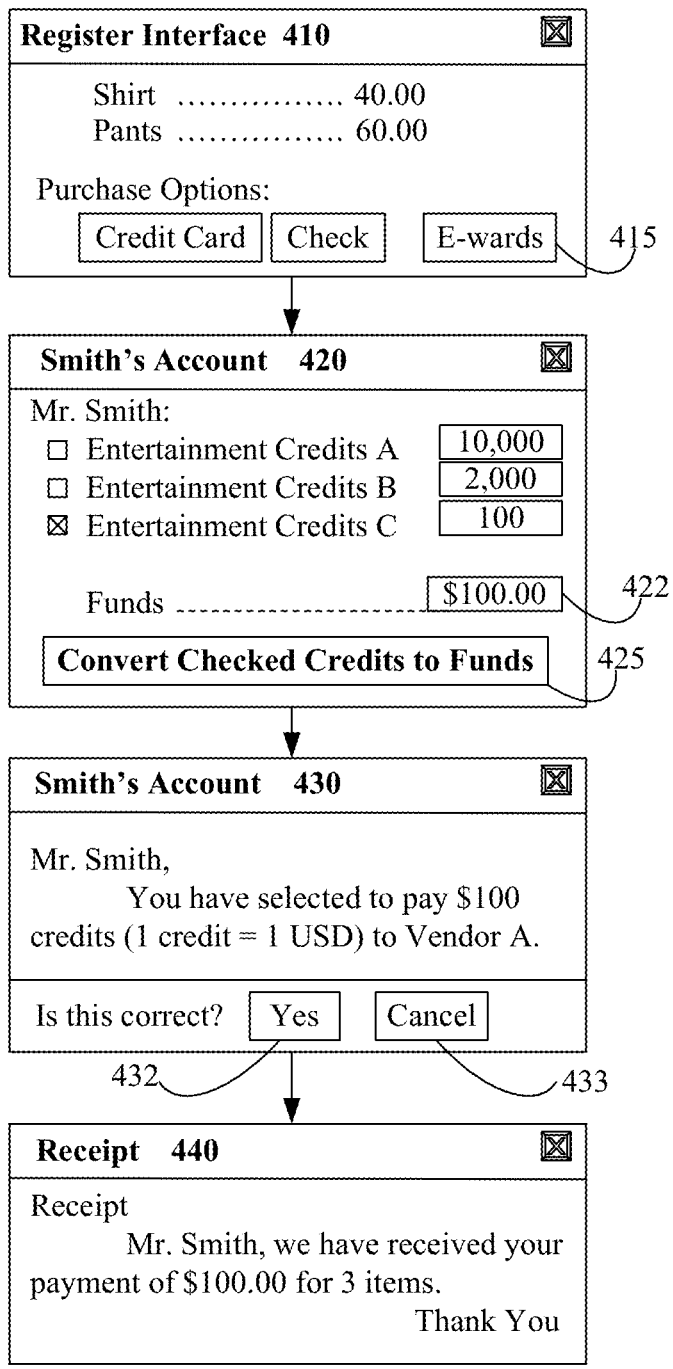
FIG. 4 is a schematic diagram of successive GUIs that illustrate the kiosk based conversion of non-negotiable credits associated with an entity earned from a game of chance to entity independent negotiable funds in accordance with an embodiment of the inventive arrangements disclosed herein.

FIG. 4 is a schematic diagram of successive GUIs that illustrate the kiosk based conversion of non-negotiable credits associated with an entity to entity independent funds in accordance with an embodiment of the inventive arrangements disclosed herein. The GUIs can be provided on a single machine, or can be provided on a set of two or more devices. For instance, the GUIs used to convert entertainment credits to funds (e.g., GUI 420) can be part of a separate device that converts entertainment credits to vendor accepted vouchers (instead of to funds 425), where the voucher can be used to complete a kiosk purchase.

GUI 402 shows an interface from a checkout system (e.g., checkout register) associated with a kiosk type game of chance 222. A quantity of entertainment credits are earned and can be converted by a conversion agency for use in buying items from a vendor 320, who does not accept the entertainment credits.

GUI 410 can be an interface window from checkout register or other kiosk check-out device (e.g., a self-service kiosk). GUI 410 includes payment button 415, which represents a payment option that includes the conversion of non-negotiable credits to purchase the items in the shopping cart. Selection of payment button 415 by a user can produce GUI 420.

GUI 420 can be an interface window from a conversion agency. GUI 420 includes display box 422 and button 425. GUI 420 can be rendered by any of a variety of means including, but not limited to, a Web browser, a JAVA applet, a PERL script, and the like. In one embodiment, GUI 420 can be contained within checkout register. GUI 420 can display the balance of non-negotiable, entertainment credits earned from one or more game providing entities. GUI 420 contains a means by which the user selects the type of non-negotiable credits to convert including, but not limited to, a set of radio buttons, a set of checkboxes, a highlighting mechanism, and the like. Display box 422 can display the monetary value of the selected non-negotiable credits. The value displayed in display box 422 can be based on preset conversion factors. Button 425 can represent the initiation of the process by which the selected non-negotiable credits are converted to negotiable funds. Selection of button 425 by a user can produce GUI 430.

GUI 430 can be a display window from a conversion agency. GUI 430 includes yes button 432 and cancel button 433. GUI 430 can be rendered by any of a variety of means including, but not limited to, a Web browser, a JAVA applet, a PERL script, and the like. In one embodiment, GUI 430 can be contained within the checkout register. GUI 430 can display a summary message of the transaction initiated by GUI 420. GUI 430 can include a means to continue the transaction, yes button 432, and a means to cancel the transaction, cancel button 433. Selection of cancel button 433 by a user cancels the transaction and can return the user to GUI 420. Selection of yes button 432 by a user completes the transaction initiated in GUI 420 and can produce GUI 440.

GUI 440 can be a display window from the same said checkout register. GUI 440 can contain a message acknowledging the successful conversion of the user's non-negotiable credits into negotiable funds for the purchase of the items in the shopping cart.

Figure 5:
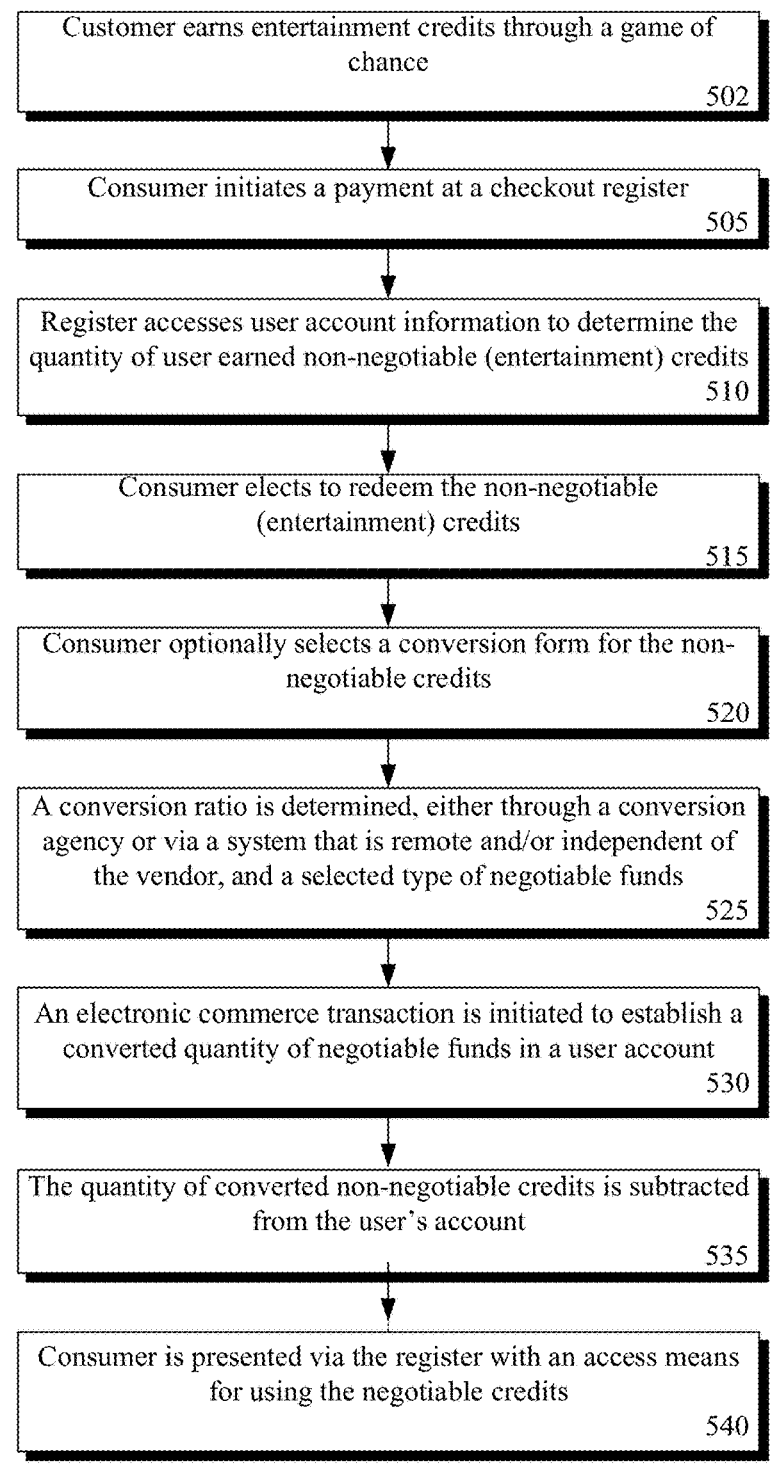
FIG. 5 is a flow chart of a method for the kiosk based conversion of non-negotiable, entertainment credits to negotiable funds system in accordance with an embodiment of the inventive arrangements disclosed herein.

FIG. 5 is a flow chart of a method 500 for the kiosk based conversion of non-negotiable, entertainment credits to negotiable funds system in accordance with an embodiment of the inventive arrangements disclosed herein.

Method 500 can begin in step 502, where a customer earns entertainment credits through a game of chance. In step 505, the consumer can initiate a payment by utilizing a portable artifact 262. In step 510, user information provided in step 505 to access the consumer's account information can display the amount of non-negotiable credits in the consumer's account. The consumer elects to redeem some quantity of non-negotiable credits in step 515. If supported by the checkout register, step 520 can occur in which the consumer can select the form of negotiable funds to convert the non-negotiable credits. In step 525, a ratio is determined for the conversion of the non-negotiable credits to the selected type of negotiable funds. This ratio can be determined by any of a variety of means including, but not limited to, an algorithm internal to conversion agency, an algorithm contained in a system that is remote and/or independent of the vendor, and the like. An electronic commerce transaction is initiated in step 530 to establish the converted amount of negotiable funds in a user account. The quantity of converted non-negotiable credits is subtracted from the user's account in step 535. In step 540, the checkout register presents the consumer with an access means for the negotiable funds.

Figure 6:
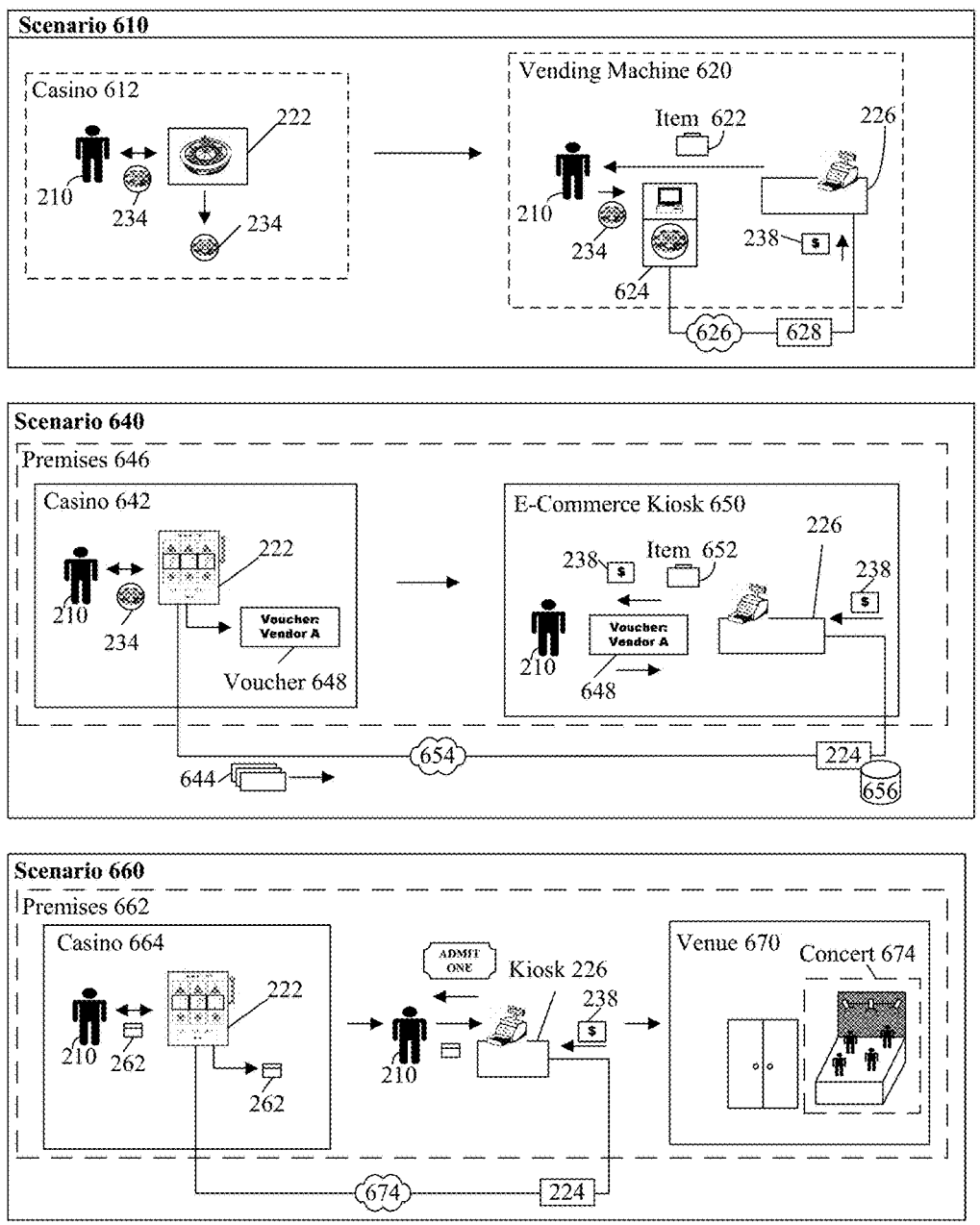
FIG. 6 is a schematic diagram illustrating a set of scenarios for performing a purchase from a vendor utilizing non-negotiable credits earned from a game of chance in accordance with an embodiment of inventive arrangements disclosed herein.

FIG. 6 is a schematic diagram illustrating a set of scenarios 610, 640, 660 for performing a purchase from a vendor via an interactive terminal utilizing non-negotiable credits earned from a game of chance in accordance with an embodiment of inventive arrangements disclosed herein. In. FIG. 6, the scenarios 610, 640, 660 can include a person 210 interacting with game of chance 222 to obtain goods and/or services from vendors which are independent of casino 612, 654, 664. In scenarios 610, 640, 660, entertainment credits 234 can be utilized to interact with the game of chance 222. Earnings from game of chance 222 can be presented to user 210 in one or more forms of non-negotiable credit. Non-negotiable credit can be used to purchase goods/services from independent vendor 226 utilizing credit 234, voucher 238, and/or portable artifact 262.

In scenario 610, vendor 226 interactive terminal 624 can be proximately located to casino 612. For instance, casino 512 can be located on a first floor of a building and vending machine 620 can be located on the second floor. Person 210 can interact with a game of chance 222 to obtain entertainment credits 234 which can be casino chips. Person 210 can navigate to vending machine 620 where credits 234 can be used to purchase item 622 from independent vendor 226. In one instance, person 210 can utilize machine 624 to perform payment actions associated with the item purchase transaction. That is, person 210 can utilize machine 624 to pay for item 622 using credits 234.

In another embodiment, interactive terminal may be integral to an establishment's guest rooms, which may or may not be independent of the gambling establishment, and can be utilized to order items such as room service or book on or off site services (e.g., spa appointments and the like) utilizing entertainment credits 234 directly from an interface that can be located in user 210's guest room (e.g., via a program on the room TV or a separate machine entirely).

When payment is required for item purchase transaction, the payment information can be communicated to machine 624 from vendor 226. For instance, a self-service kiosk 624 GUI can present person 210 with an electronic bill for item purchase. Person 210 can interact with machine 624 to complete the payment for the food purchase transaction. Entertainment credits 234 provided by person 210 can be authenticated by machine 624. In one embodiment, machine 624 can validate credits using one or more traditional industry accounting systems. Once sufficient credits are received, machine 624 can authorize payment for the transaction and release item 622 to the user 210.

Machine 624 can be communicatively linked to an independent conversion entity 628 via network 626. Based on the amount of credits 234 provided by person 210, negotiable funds 238 can be applied to the food purchase transaction. When person 210 performs payment, credits 234 can be converted into negotiable funds 238 which can be received by vendor 226. In one embodiment, entity 628 can be a communicatively linked service provided by an independent organization. In another embodiment, entity 628 can be a software code executing within machine 624 owned and/or licensed from an independent entity.

In premises 640, an e-commerce kiosk 650 can be located proximate to a casino 642 within premises 646. Person 210 can interact with game of chance machine 222 which can result in earnings in the form of a voucher 648 able to be used at e-commerce kiosk 650. In one embodiment, e-commerce kiosk 650 can be a specialized web terminal for an e-commerce site such as Amazon, only accessible on premises 640, that enables user 210 to engage in what appears from the user end to be an approximately traditional e-commerce transaction (e.g., billing info can be selected as entertainment credits 234 or voucher 648 instead of, or in addition to, credit card information).

Voucher 648 can be generated from a portion of earnings from interaction with game of chance 222. Voucher 648 can be associated with one or more quantities of non-negotiable credits, security information (e.g., bar codes, RFID s, etc.), and the like. For instance, person 210 can choose to "cash out" ten dollars from a fifty dollar earning in the form of a ten dollar voucher 648. Voucher 648 can be generated automatically via one or more mechanisms. In one embodiment, game of chance 222 can be a machine comprising of a user interactive element able to immediately generate a voucher 648. For instance, a slot machine can include a depressible button for generating vouchers from earnings which can be redeemable at a vendor A. In one instance, voucher 648 can be re-used until the quantity of non-negotiable funds associated with the voucher is exhausted. In another embodiment, voucher 648 can be limited to a specific number of uses. For instance, voucher 648 can be a one-time use voucher which can only be valid for a single purchase.

Voucher 648 can be generated utilizing conversion agency 224. In one instance, voucher 644 can convey voucher information 644 to agency 224. In the instance, voucher information 644 can be stored in data store 656 which can be used to validate voucher 648 at time of purchase. When person 210 presents voucher 648 to vendor 226, voucher 648 can be verified and negotiable funds 238 can be attributed to purchase. For example, person 210 can present voucher 648 to a vendor for the purchase of item 652. In one instance, left over non-negotiable credits not required for purchase of item 652 can be presented to the person 210: say, a person 210 purchasing a ten dollar item 652 using twenty dollar voucher 648 can receive ten dollars in cash from the vendor directly through the e-commerce kiosk 650, or 10 dollars in e-commerce user 210 account credit, specific e-commerce store credit, or the like.

In one instance, machine 222 can present person 210 with a voucher 648 directly corresponding (e.g., one-to-one) to entertainment credits 234 person 210 has earned and/or possesses. In another instance, a casino 624 and/or an e-commerce kiosk 650 determined conversion ratio can be utilized to convert non-negotiable credits associated with a voucher 648 to negotiable funds 238.

In one configuration of the embodiment, voucher 648 can be vendor specific. In the configuration, voucher 648 can be redeemable at only a user specified vendor, which can be accessible via e-commerce kiosk 650, and/or casino determined vendor. In another configuration, voucher 648 can be restricted to use at selected vendors.

In scenario 660, a casino 664 can be proximate to entertainment venue 670 within premises 662. For instance, casino 664, and entertainment venue 670 can be competing entertainment venues (e.g., venue 670 may be another casino or arcade hosting games of chance, as well as an arena providing similar public performances such as concerts or comedy nights) which can be independently owned. Person 210 can interact with game of chance machine 664 which can result in earnings which can be stored on portable artifact 262 associated with person 210. Earnings can be in the form of non-negotiable credits which can be applied to an account associated with portable artifact 262. Person 210 can access entertainment kiosk vendors 226 directly at casino 664 or navigate to venue 670 to access an entertainment kiosk on site and utilize non-negotiable credits associated with artifact 262 to gain admission to an event (e.g., concert 674). For instance, interacting with a game of chance 222 user 210 earns entertainment credits 238. User 210 can access kiosk 226 to convert earnings and purchase off site (i.e. off site of casino 664) event tickets (e.g., the kiosk 226 can allow user 210 to browse and purchase movie tickets at various local theatres, admission to comedy clubs on and off premises, memberships to race kart clubs, golf tournaments, spa services and the like).

In one instance, artifact 262 can be associated with temporal limitations which can affect redemption of non-negotiable credits. In the instance, artifact 262 can be temporary non-negotiable credits which can be valid for a duration of time. For instance, artifact 262 can include non-negotiable credits which are redeemable for admission prior to concert 674.

It should be appreciated that scenarios 610-660 are for illustrative purposes only and should not be construed to limit the invention in any regard. Different embodiments for conducting purchasing at kiosks utilizing non-negotiable credits are contemplated. FIG. 1-6 and the above description apply to some embodiments of the present disclosure. Additional aspects exist, which are detailed herein. These additional aspects are able to be applied to the above in many instances, as is understandable by one of ordinary skill.

Loyalty programs are structured marketing efforts that reward loyalty and attempt to affect future consumer behavior. This behavior is altered by providing loyalty points to members of the loyalty program, which are subject to the terms and conditions imposed by the loyalty program operator. Members can earn and spend the points as guided by the program operator, and per the restrictions imposed on the program. Effectively, loyalty points are the "carrot" that guides consumer behavior. Restrictions and conditions (imposed by loyalty program operators after the members have earned points) are the "stick" that helps mold or shape the consumer behavior.

A simplistic depiction of a loyalty program illustrated in FIG. 16A shows that the most basic elements are that loyalty programs require memberships, where members can earn points in that member's account. The points can be used to purchase rewards offered by the loyalty program.

Consumer behavior is shaped since a member may have an upcoming flight (in an airline loyalty program) and choose an airline that he is a member of, if he/she receives a free seat upgrade for that flight, even if the competing airline is cheaper as a default, since paying for an upgraded ticket would be more expensive in absence of the upgrade earned through point accumulation. Thus, loyalty is rewarded, and the business running the program receives a benefit of increased patronage. If a member does not meet membership criteria (established by the loyalty program operator and subject to change even after points are earned), previously earned points can expire and/or be lost entirely.

Successful loyalty programs receive more business on average from their loyalty program members than from non-members. Consumer behavior is shaped by the programs conditions and restrictions (like requiring a certain number of points within a time period to receive a reward). To shape behavior using the "structured marketing effort" that is a traditional loyalty program, the earned points must be non-negotiable and the program operator must maintain a level of control—else the shaping of consumer behavior is sacrificed and the purpose of a traditional loyalty program is not served.

With the above as context, embodiments of the present disclosure include material limitations to create a bridge between two different loyalty programs, as illustrated by FIG. 16B, each with their own program specific boundaries.

By default, there is no bridge between different loyalty programs. That is, a person can belong to multiple different loyalty programs but cannot spend points earned from a first loyalty program for rewards provided by a second loyalty program due to hard program boundaries. As noted above, these program boundaries are non-trivial as they exist and are required to ensure that the loyalty programs can serve their intended function of shaping consumer behavior. If points were freely transferable and made into negotiable funds (like a baseline currency) the loyalty program loses all consumer behavior shaping effects. That is, if earned points were "cash" currency, the flyer of the earlier example, would "cash out" their points and fly with Airline 2 (instead of Airline 1) if airline 2 (in absence of the loyalty reward incentive) offered a better cash deal for a given transaction. The persuasive force of rewards to ensure loyalty requires the existence of a program boundary, which favors patronage of a loyalty program operator's services over those of competitors.

This persuasive force present in the example above (and a traditional loyalty program having a strong program boundary across which non-negotiable credits are not able to easily cross) is a direct result of conditions imposed upon already granted points, which lock the redemption of these loyalty points into services provided by a specific vender. The loyalty point operators do not want points to be negotiable or to be fungible across the program boundaries—else their function as a persuasive force for guiding/shaping future member behavior diminishes substantially.

Another significant point with traditional loyalty programs is there is an inherent tension between customer desires and those of the loyalty program operator (e.g., the business providing the program). The customer wants to minimize costs paid by the customer and to maximize the benefit received for that cost. The business wants to maximize profit, which includes minimizing costs. Providing additional benefits to a customer, however, generally increases the cost to the business. Minimizing costs paid by the customer lowers the businesses profits. Ideally, the business desires to provide something of perceived customer value, which has a minimal cost to the business. This would cause that business's services/goods to be preferred over those of a competitor without increasing the cost to the business. Loyalty programs are a vehicle used by many businesses to achieve these ends. Airlines, for example, have excess capacity (empty seats) in many of their flights some of which are premium seating. It costs the airlines nothing additional (or negligibly different) to place a person in an otherwise unused seat. Airlines, however, do not want otherwise paying customers to fill the "vacant seat" since this lowers the Airlines profits (an otherwise paying customer is converted to a non-paying one in such a situation and the airlines profit for that flight is decreased by the cost of one seat). Airline loyalty programs typically implement blackout dates to match this business specific reality around times when expected excess capacity is low (so that loyalty points cannot be used for these flights). Airlines increase the "pressure" on program members by having points expire over time and/or by requiring moderately high thresholds before points can be expended. Expiring points and usage thresholds accomplish multiple goals of the Airlines. The first is to encourage additional usages of the program to earn sufficient points (before point expiration) to earn a customer desired reward. Additional usages (that earns points) results in increased sales/profits for the airlines. Another goal is to restrict the usage data to "burn" points on flights that the consumer may not otherwise take. Without black-out usage dates and expiration restrictions a member would most likely "hold" points to spend them on a flight they would otherwise have to pay for. The airlines prefer to permit an additional flight that would not otherwise occur (thus no profit is given up) using excess capacity (thus negligible costs are incurred from the airline perspective). Yet another advantage of setting expiration dates is breakage of points. Breakage of points is an intentional feature of many loyalty programs. By breakage, a set of previously awarded loyalty points disappear if not redeemed with a fixed time period. This is highly advantageous to loyalty program operators since they provided a customer perceived benefit (points at the time of use) without incurring a cost (zero cost for redemption of these points since they expired). So between breakage and point pressure a statistical cost of providing points as a customer incentive is significantly decreased (the airline incurs no or minimal cost for you taking an extra "trip" in an otherwise unused seat and incurs no cost for points that expire). Airlines balance the costs of administrating a loyalty program plus the costs of implementing the program (redemption costs) against the benefits (additional profit through customer behavior shaping) received from the program. Restrictions and conditions imposed on a program, membership requirements, restrictions on fungibility of points, the non-negotiable nature of loyalty points, and other factors are all intentionally balanced in context of a specific business when implementing a viable loyalty program.

Stated differently, many "advantages" from a consumer standpoint are disadvantages from a program operator standpoint—by design. For example, as noted above expiration dates on points provide for breakage and point pressure—which are advantageous from a program operator perspective, but are not preferred by customers. Stating that it would be advantageous to remove these intentionally imposed restrictions since customers would be happier is true from a customer perspective, but not true from a loyalty operator one. One of ordinary skill implementing loyalty points would not disregard an intentionally imposed feature (expiration date, which results in lock in and point pressure to decrease operator costs) in absence of a benefit greater than the additional costs incurred by removing these restrictions. In other words, simple statements like "one of ordinary skill would modify an airline program to remove restrictions because customers would like this" are demonstrably false statements of motivation, in that such a statement ignores fundamental and intentionally implemented features of a loyalty program. If black-out dates were not an advantage to the loyalty operator—they would not be implemented in the first place. The loyalty program operator knows that the blackout dates are not preferred by customers, nor are expiration dates on points. This is part of the tension between customers and loyalty program operators, which is an essential feature to successful traditional loyalty programs. In traditional loyalty programs with intentional features as detailed above, the non-negotiable nature of loyalty points is critical. Loyalty points of many programs are intentionally not transferable between members or across program boundaries, since transferring points in such a manner can circumvent restrictions and conditions (like expiration dates). A customer may desire to avoid these imposed restrictions (which help shape the customer behavior in a manner intended by the program operator while lowering program costs), but one of ordinary skill in loyalty programs knowing and understanding the essential purpose of the restrictions and the resulting requirements of non-negotiability and strong program boundaries would not find such a change obvious. Such statements are analogous to a statement that blocking a fuel line of an automobile is advantageous as it will decrease fuel consumption of that vehicle and provide environmental benefits from burning less fuel. Strictly speaking, the above statement is true, but the purpose of an automobile is to permit travel and the modification (blocking fuel) cases the reference to be unsuitable for its intended purpose. One cannot take the "fuel conserving" benefits of blocking a fuel line and combine them with the transportation benefits of an automobile—as these two features are in tension with each other. Similarly, one cannot remove or modify essential features of a loyalty program (relied upon to allow the references to operate as intended) and change them to add another (but conflicting) feature that is in tension with the first teaching. This is attempted (improperly) throughout the petition, as will be explained herein, and is improper. One of ordinary skill recognizes that non-negotiability of points is an essential feature of many loyalty programs, which is linked to restrictions and conditions. You cannot remove or change these essential features without changing the nature and operating principles of the underlying loyalty program.

Two different types of loyalty programs include sole source programs and networked programs. Sole source programs are operated and run by a single business and by default have strong program boundaries. Networked programs have many different participant business (analogous to a storefront being a mall verses a single merchant store) who give the same points which are generally redeemable to any member of the network. Sole source programs are generally non-fungible, non-negotiable, and have strong program boundaries, as detailed above. Networked programs generally have fungible points with minimal restrictions and non-existent or weak boundaries at least between network participants.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
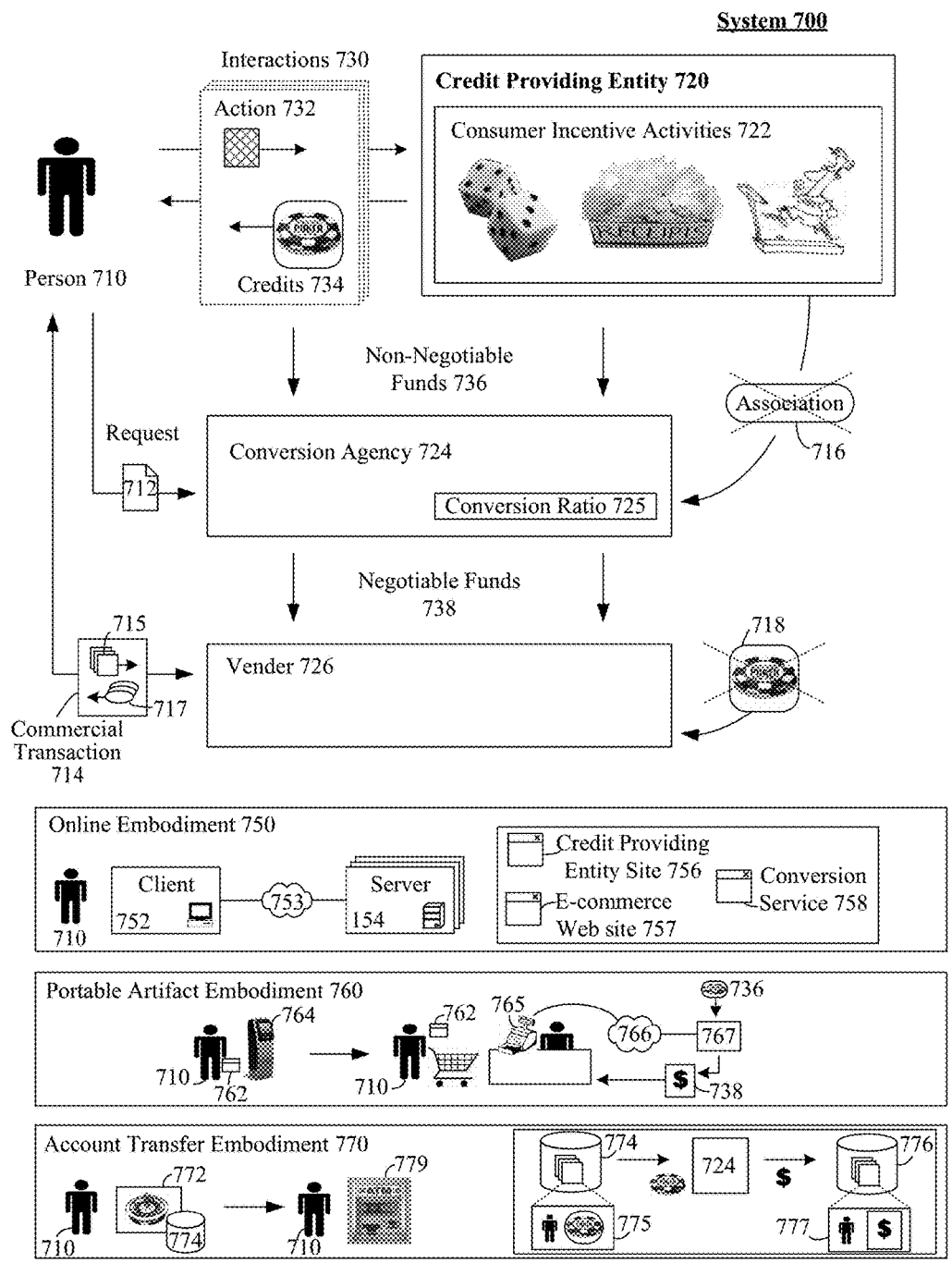
FIG. 7 is a diagram of a system in which non-negotiable funds earned through a variety of actions or anticipated future actions are converted into negotiable funds in accordance with an embodiment of the inventive arrangements disclosed herein.

FIG. 7 is a diagram of a system 700 in which non-negotiable funds 736 earned from consumer incentive activities 722 are converted into negotiable funds and/or entity independent funds 738 in accordance with an embodiment of the inventive arrangements disclosed herein. In one embodiment, multiple interactions 730 can occur between a person 710 and a credit providing entity 720, in which the person 710 participates in consumer incentive activities 722. During each interaction 730, an action or behavior 732 can be taken. With each successful completion of the consumer incentive activity 722, person 710 can receive credits 734 in the form of non-negotiable funds 736. In one interaction 730, action 732 can be a wager of a game of chance. In this instance, with each non-successful outcome of the game of chance, the person 710 can lose their wager 732.

Other actions 732 for earning credits 734 through interactions 730 with a credit providing entity 720 are contemplated. Such actions can, for example, result in the person 710 earning participation credits, achievement credits, sponsored initiative credits, social networking credits, or even advanced credits in a loan. All of these credits can be earned for a targeted purpose or goal set by the user him or herself or another entity such as a government or corporate entity (e.g., as a sponsored initiative such as a green initiative or a market promotion).

As mentioned, the types of credits 734 are non-negotiable funds 736. These funds 736 (e.g., credits 734) may not be redeemable on an open market. For example, vender 726 will not accept 718 the credits 734 for commercial transactions 714. A conversion agency 724, which is not directly associated 716 with the credit providing entity 720 can convert the non-negotiable funds 736 (which can be a quantity of credits 734) into negotiable funds and/or entity independent funds 738. This conversion can occur in response to a request 712 by person 710.

Person 710 can conduct a commercial transaction 714 with vender 726. During the transaction 714, the person 710 can specify a user-selected set of requests 715 for goods and/or services 717 of the vender 726. The goods and/or services 717 can cost a quantity of negotiable funds and/or entity independent funds 738, which are provided to the vender 726. In one embodiment, the negotiable funds and/or entity independent funds 738 can be provided directly to the vender 726 by the conversion agency 724. In another, the negotiable funds and/or entity independent funds 738 can be provided by the conversion agency 724 to person 710, who provides these funds 738 to the vender 726.

Numerous embodiments exist for conducting the conversions as described herein, a few of which are shown as embodiments 750, 760, and 770. Embodiment 750 shows an online embodiment, where a person 710 can interact (730) with a credit providing entity site 756 to participate in a consumer incentive activity 722. The commercial transactions 714 can be conducted via an e-commerce Web site 757. Additionally, the conversion agency 724 can implement a software based conversion service 758, which performs the conversion of the non-negotiable funds 736 into the negotiable funds and/or entity independent funds 738. The Web sites 756, 757 and service 758 can run within one or more servers 754. These servers 754 can be connected to a client 752 via a network 753, where the client 752 is a computing device that user 710 interacts (730 and/or 714) with.

In one configuration of embodiment 750, the conversion service 758 can be linked to a payment option present in the E-commerce Web site 757, which operates in a manner similar to PAYPAL, GOOGLE CHECKOUT, and the like. That is, a payment option can be presented that permits goods/services of vender 726 to be purchased using (at least in part) funds 738 converted from credits 734, which were earned from the consumer incentive activities 722.

Embodiment 760 shows a portable artifact embodiment, where a person 710 stores entertainment credits 734 from the game of chance 722 upon a portable artifact 762, which can be a physical card with a magnetic strip, a RFID storage device, a flash memory card, or other tangible artifact able to store digitally encoded (or even analog encoded) data. Machines 764 upon which consumer incentive activities 722 are performed or recorded can include a reader/writer able to alter content stored on the portable artifact 762. Thus, actions 732 outcomes in credits 734 value can be recorded on the artifact 762. The person 710 can thereafter shop at a storefront of vender 726 and present a cashier 764 with the artifact 762. A cash register 765 used by the cashier 764 can be connected to a network 766. The conversion agency 724 can have a network element 768 connected to the network 766, which converts non-negotiable funds 736 on the artifact 762 into a quantity of negotiable funds and/or entity independent funds 738 needed to complete the commercial transaction 714 conducted via the register 765 and cashier 764. From the perspective of the vender 726, the transaction 714 conducted via the register 765 is a "standard" transaction that results in the vender 726 receiving suitable negotiable funds and/or entity independent funds 738 for providing the goods/services 717 to person 710.

Embodiment 770 shows an account transfer embodiment 770, where a person 710 participates in a consumer incentive activity 722 (e.g., in this instance a game of chance 772). Earnings (734, 736) from the consumer incentive activity 722 are recorded within a tangible data store 774 associated with the credit providing entity 720. This data store 774 can include an account 775 for the person 710, which tracks an amount of credits 734, which are non-negotiable funds 736, of the person 710. Conversion agency 724 can directly access the account 775 of data store 774 and can convert a quantity of credits 734 into negotiable funds and/or entity independent funds 738, which are recorded in a tangible data store 776 that is not directly associated with entity 720. The data store 776 can include an account 777 for the person 710, which contains an amount of negotiable funds and/or entity independent funds 738, of the person 710. A person 710 can conduct commercial transactions 714 via a machine 779, such as a kiosk, an ATM machine, etc., which involve funds of account 777 changing. In one embodiment, the goods/services 717 received from person 710 in embodiment 770 can include cash (such as from an ATM machine). This cash can be an amount of cash-back received during transaction 714, can be the transaction 714 itself and may involve a transaction fee, which is extracted from account 777 by machine 779.

The embodiments 750-170 are for illustrative purposes only and are not intended to be (or to be construed as being) exhaustive or comprehensive. For example, any combinations of the embodiments 750, 760, 770 are to be considered within scope of the disclosure. Thus, a consumer incentive activity 722 can be conducted via a Web site 756 (per embodiment 750), where a commercial transaction 714 using the converted entertainment credits 734 per agency 724 can be conducted at a storefront, where a cashier 764 interacts (130) with person 710. In another contemplated configuration, the consumer incentive activity 722 can be conducted with a machine 772 that places credits 734 in account 775 (per embodiment 770), which are converted and used to buy goods/services 717 via an e-commerce Web site 757 (per embodiment 750). In another contemplated configuration, credits can be earned via machine 764 and placed on artifact 762 (per embodiment 760), which can be placed in a machine 779, such as an ATM (per embodiment 770) to extract funds 738, which are converted (by agency 724) from the credits 734 stored on artifact 762.

In one embodiment, the conversion agency 724 can be compensated (e.g., charge a processing fee) for converting the non-negotiable funds 736 to negotiable funds and/or entity independent funds 738. This fee can be paid to conversion agency 724 by the game providing entity 720, the person 710, and/or by the vender 726.

As used herein, consumer incentive activities 722 can be in the form of games, contests, or can occur based on certain consumer behavior, actions or purchases. A game can be structured playing, usually undertaken for enjoyment and sometimes used as an educational tool. A contest can be an event in which at least two teams or individuals compete. There may be an award to a winner or awards for multiple top performers, but a contest may be imposed for training. A contest may occur naturally, or be planned by the participants, rather than organized by another party.

Games are distinct from work, which is usually carried out for remuneration, and from art, which is more often an expression of aesthetic or ideological elements. However, the distinction is not clear-cut, and many games are also considered to be work (such as professional players of spectator sports/games) or art (such as jigsaw puzzles or games involving an artistic layout such as Mahjong, solitaire, or some video games). Key components of games can be goals, rules, challenge, and interaction. Games can generally involve mental or physical stimulation, and often both. Many games help develop practical skills, serve as a form of exercise, or otherwise perform an educational, simulational, or psychological role.

Credit providing entities 720 include any entity providing a consumer with credits based on user behavior, actions, achievements, and the like. Credit providing entities 720 can include corporations such as airlines, hotels, credit card companies, casinos, cruise ships, States (for lottery, scratch off games, etc.), churches, race tracks, online gambling site providers, e-commerce sites, slot-machine houses, carnivals, gambling parlors, companies (for promotional sweepstakes), High Schools (for raffles), and the like.

The action 732 can, in one embodiment, risk money, previously earned credits 734 or something of material value on an event with an uncertain outcome with intent on winning additional money, credits 734, and/or material goods/services. An amount of credits 734 earned from an interaction 730 with a credit providing entity 720 can vary in direct proportion to the user action, behavior, achievement, or the like.

Credits 734 are non-negotiable funds 736 that generally have no value outside of an environment (building, Web site, etc.) of the credit providing entity 720. For example, casinos (one embodiment of entity 720) generally utilize casino tokens, chips, or plaques to represent a quantity of entertainment credits 734. Online gambling sites 756 (and electronic gambling devices) often provide an account to a person 710, where entertainment credits 734 are managed within this account in a computer readable storage medium. In another example, hotel and car rental entities oftentimes afford customers loyalty points that can be redeemed only in future transactions with the hotel or car rental entity itself for certain upgrades or discounts (a form of credits 734). In yet another example, a grocery store may offer consumers a store card to receive special group member discounts to be applied at checkout and additional points for purchases made at the store; for instance, every dollar spent can earn the consumer a point and once the consumer achieves 700 credits in a month timeframe the credits can translate into a 70 cent discount per gallon of gas purchased at a participating gas station.

Use of credits 734, such as casino tokens, rewards points or discounts, can be more convenient than use of negotiable funds and/or entity independent funds 738 for many reasons. For example, use of entertainment credits 734 makes theft and counterfeiting more difficult. Entertainment credits (which when having a physical representation are often a uniform size and weight) can be relatively easy to stack, count, etc. Additionally, studies have proven people (710) engage in consumption more freely (e.g., play games of chance with larger wagers and with greater frequency, or more readily purchase goods and services), when credits 734 are used or applied to the purchase, behavior, or activity, rather cash or other negotiable funds and/or entity independent funds.

Additionally, use of credits 734, can have legal benefits that can permit entities 720 to conduct games of chance 722, which would be prohibited if negotiable funds and/or entity independent funds 738 were utilized instead of entertainment credits 734. That is, numerous legal statutes and regulations exist that are more restrictive when consumer incentive activity earnings are in a form of negotiable funds and/or entity independent funds 738. For example, in the instance that consumer incentive activity 722 is gambling, the Unlawful Internet Gambling Enforcement Act (UIGEA) of 2006 prohibits many online gambling activities with negotiable funds and/or entity independent funds 738, which are permitted with certain forms of non-negotiable funds 736. For example, electronic fund transfers via credit cards or debit cards related to gambling winnings are generally prohibited by US banks. Similarly, wire transfers of negotiable funds and/or entity independent funds 738 earned through gambling are legally prohibited in many instances. Many of these acts explicitly prohibit the transfer of negotiable funds from gambling earnings across state lines Non-negotiable funds 736 can include any of a variety of financial instruments that are not legal currency and not governed under article 3 of the Uniform Commercial Code (UCC). For example, non-negotiable funds 736 can include IOUs issued by the credit providing entity 720. In one embodiment, non-negotiable funds 736 can include secured transactions, which take a security interest on collateral owned by the credit providing entity's 720 assets, which are subject to Article 9 of the UCC. In one embodiment, the non-negotiable funds 736 can include letters of credit, issued by the credit providing entity 720.

Negotiable funds 738 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 738 include currency, and instruments covered by Article 3 and 4 of the Uniform Commercial Code. For a writing to be a negotiable instrument under Article 3,[1] the following requirements must be met: 7) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 738) is that they are payable to a bearer on demand.

Entity independent funds 738 can include any funds that are independent of an entity providing the non-negotiable funds 736. For example, the entity independent funds 738 can represent reward points from a company A, where the non-negotiable funds 736 are reward points from a different company B. Additionally, the entity independent funds 738 can represent an in-game or in-marketplace currency (where the non-negotiable funds 736 are not able to be used for direct purchases in-game or in-marketplace).

The commercial transaction 714 can be one in which wherein the quantity of negotiable funds and/or entity independent funds 738 are applied to user (710) specified (via request 715, for example) purchase of a good or service 717. Stated differently, a commercial transaction can be an economic transaction where person 710 receives a good or a service from vender 726 for value. Commercial transactions 714 can include a sale goods (717) from a storefront, a Web site, a catalog (mail order), over the phone, and the like. Transaction 714 can also include a payment for a service requested by person 710. Payment of the negotiable funds and/or entity independent funds 738 during the commercial transaction 714 can occur before, after, or concurrent with the receipt (or shipping) of the goods or service 717. A contract (including specifics established by the parties (110 and 726) as well as legal defaults provided by the UCC or applicable common law/state law) between the vender 726 and person 710 established as part of the commercial transaction 714 can determine when payment (funds 738) for the goods/services 717 is due. In one embodiment, commercial transaction 714 can include transaction where currency is provided to person 710 by a vender 726 (a bank as part of an ATM transaction, for example) for a fee. This currency can be provided as a loan or as a withdrawal from an account of person 710, where the account includes the negotiable funds and/or entity independent funds 738.

The conversion agency 724 can be a legal entity that converts non-negotiable funds 736 (including credits 734) into negotiable funds and/or entity independent funds 738. The conversion agency 724 can lack a direct association 716 with the credit providing entity 720. In one embodiment, no legal relationship of enablement of corporate identity (no parent, subsidiary, etc.) relationship can exist between the conversion agency 724 and entity 720. No fiduciary duties under corporate law can exist between agency 724 and game providing entity 720. In one embodiment, agency 724 can be geographically located outside property owned or leased by the game providing entity 720. In another, it can lease space and provide its services from entity 720 owned/leased land. In one embodiment, the conversion agency 724 can support multiple different credit providing entities 720, which can be competitors of each other.

In one embodiment, the conversion agency 724 is not a bank or similar financial institution (and may therefore be outside the guidelines established by UIGEA and other statues and regulations, which impose restrictions on banks). In one embodiment, the conversion agency 724 may be located in the same jurisdiction as the credit providing entity (possibly to avoid legal entanglements/restrictions with operating in multiple or across jurisdictional boundaries) or may be located in a jurisdiction with favorable rules for performing the fund conversions.

In one embodiment, the conversion agency can be tasked with establishing and maintaining a conversion ratio 725. In another embodiment, it should be noted that the credit providing entity 720 can also predetermine a conversion ratio 725 for credits 734 that will govern the conversion of non-negotiable credits 736 to negotiable funds and/or entity independent funds 738. In either embodiment, the conversion agency 724 will utilize conversion rate 725 in calculations associated with converting non-negotiable funds 736 to negotiable funds and/or entity independent funds 738. The conversion ratio 725 can, in one embodiment act like a conventional exchange rate in that it defines the rate at which one currency (the credits 734) will be exchanged for another (negotiable funds and/or entity independent funds 738). It can also be regarded as the value of one market's currency (credit market) in terms of another currency (real-world negotiable funds market).

In the retail currency exchange market, a different buying rate and selling rate can usually be quoted by money dealers. As referred to herein, the buying rate is the rate at which conversion agencies accept non-negotiable funds 736 for conversion to negotiable funds, and the selling rate can be the rate at which conversion agency 724 or other such entity as well as credit providing entities 720 can advance credits to person 710 for future actions 732. The quoted rates can incorporate an allowance for a conversion agency's margin (or profit) in trading, or else the margin may be recovered in the form of a "commission" or in some other way.

It should be noted that different rates 725 may also be quoted for different types of non-negotiable funds (e.g., casino chips, loyalty rewards point, and the like). In one embodiment, conversion ratio 725 can be a market based exchange rate and thus can change whenever the values of either of the two component currencies change. The market for non-negotiable funds 736 to negotiable funds and/or entity independent funds 738 exchange can be influenced by times of year and special occasions (such as Christmas, the New Year celebrations, Valentine's Day, high travel season, and the like) to affect conversions of certain types of credits 734 based non-negotiable funds 736 to negotiable funds and/or entity independent funds 738. In another embodiment, the conversion ratio 725 can be a fixed exchange rate, also known as a pegged exchange rate, which is a type of exchange rate regime wherein a currency's value is matched to the value of another single currency. The conversion ratio 725 in this instance does not fluctuate but is consistent and steady.

Figure 8:
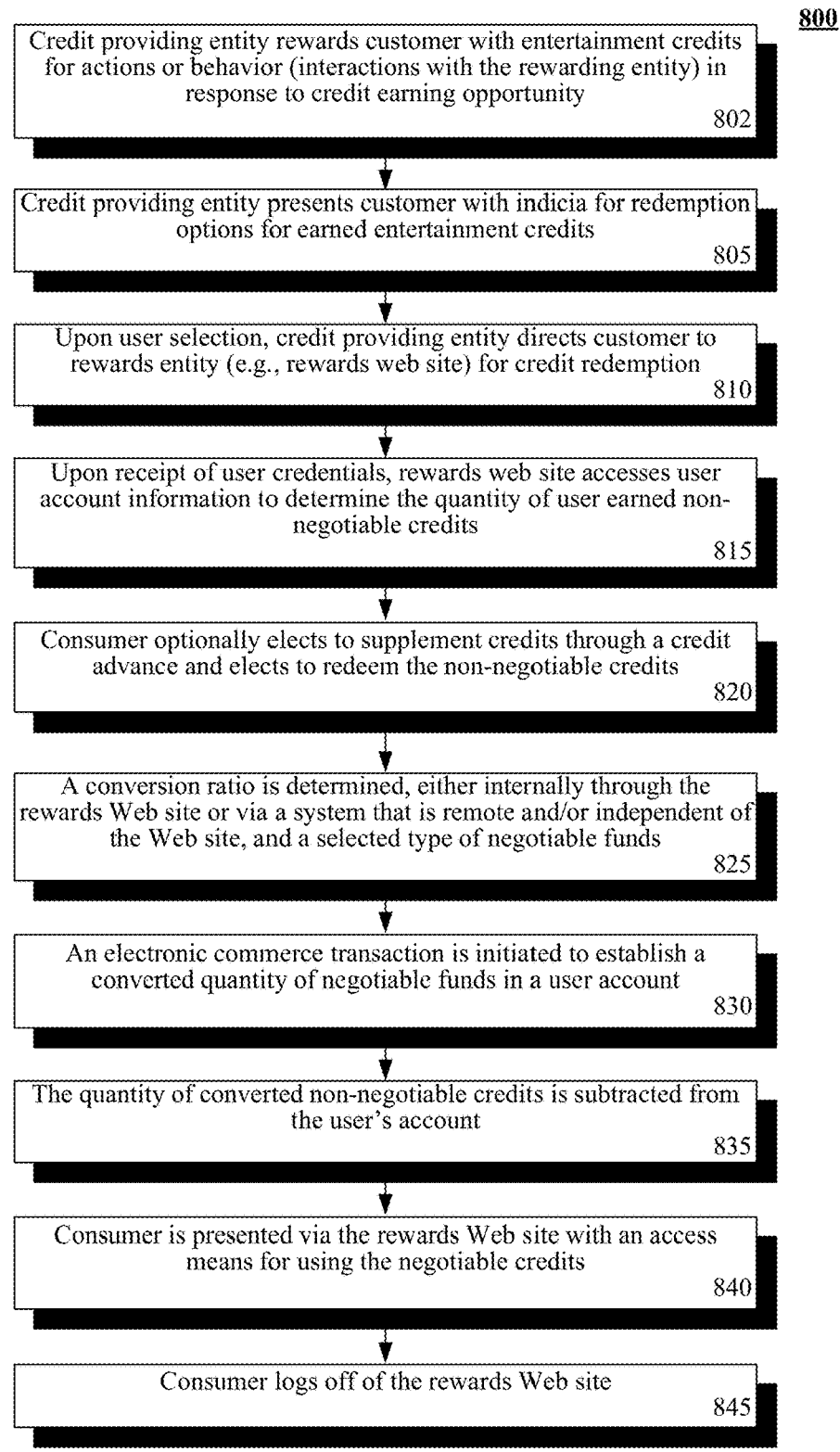
FIG. 8 is a flow chart of a method for the Web based granting and conversion of non-negotiable credits to negotiable funds in accordance with an embodiment of the inventive arrangements disclosed herein.

FIG. 8 is a flow chart of a method 800 for the Web based granting and conversion of non-negotiable credits to negotiable funds and/or entity independent funds in accordance with an embodiment of the inventive arrangements disclosed herein. Method 800 can in one embodiment comprise steps 802 to 845. However, the following description of one embodiment of method 800 is not intended to be construed as limiting as other or additional steps for an entity granting a consumer entertainment credits and presenting indicia leading to credit redemption are contemplated.

Method 800 can begin in step 802, where the credit providing entity can reward a customer with entertainment credits for actions or behavior (or promised future actions or behavior) undertaken by the customer in response to a credit earning opportunity. In step 805, the credit providing entity can present a customer with indicia for redemption options for the customer earned entertainment credits. Indicia can be in the form of banners, radio buttons, pop-up windows, embedded links, audio and or video notification, QR or bar codes, flyers, and the like.

Upon user selection of the indicia advertised redemption option(s), the credit providing entity can in step 810 direct the customer to one or more rewards entities (e.g., a rewards web site) for credit redemption. In step 815, the rewards Web site utilizes user credentials provided by, for example, the credit providing entity of the customer or the customer him or herself to access the consumer's account information and determine the amount of non-negotiable credits in the consumer's account. The consumer optionally selects to supplement his or her available credits by engaging in a credit advance and elects to redeem some quantity of non-negotiable credits in step 820. If supported by the rewards Web site, the consumer can additionally select the form of negotiable funds and/or entity independent funds to convert the non-negotiable credits.

In step 825, a ratio is determined for the conversion of the non-negotiable credits to the selected type of negotiable funds and/or entity independent funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 830 to establish the converted amount of negotiable funds and/or entity independent funds in a user account. The quantity of converted non-negotiable credits is subtracted from the user's account in step 835. In step 840, the rewards Web site presents the consumer with an access means for the negotiable funds and/or entity independent funds. Lastly, the consumer terminates the session by logging off the rewards Web site in step 845.

FIG. 9 is a depiction 900 of successive GUIs that illustrate a web based credit granting event with credit redemption indicia and subsequent conversion of non-negotiable funds into negotiable funds and/or entity independent funds in accordance with an embodiment of the inventive arrangements disclosed herein.

GUI 902 shows an interface from a gambling Web site. A quantity of entertainment credits are earned on this site, which can be later converted by a conversion agency for use in buying/selling items from a vender, who does not accept the entertainment credits. The gambling Web site or credit providing entity website can include options to "play again" (i.e., repeat the credit earning behavior to potentially earn additional non-negotiable entertainment credits) and an indicia 905 for credit redemption opportunities. The indicia can be presented to a customer via a variety of means including but not limited to banners, radio buttons, pop-up windows, embedded links, audio and or video notification, QR or bar codes, flyers, and the like.

GUI 910 can be a checkout window from an e-commerce site. GUI 910 includes payment button 915, which represents a payment option that includes the conversion of non-negotiable credits to purchase the items in the shopping cart. Selection of payment button 915 by a user can produce GUI 920.

GUI 920 can be a display window from a conversion agency. GUI 920 includes display box 922 and buttons 925, 927. GUI 920 can be rendered by any of a variety of means including, but not limited to, a Web browser, a JAVA applet, a PERL script, and the like. In one embodiment, GUI 920 can be contained within the e-commerce site. GUI 920 can display the balance of non-negotiable, entertainment credits earned from one or more game providing entities. GUI 920 contains a means by which the user selects the type of non-negotiable credits to convert including, but not limited to, a set of radio buttons, a set of checkboxes, a highlighting mechanism, and the like. Display box 922 can display the monetary value of the selected non-negotiable credits. The value displayed in display box 922 can be based on preset conversion factors.

Button 925 can represent the initiation of the process by which the selected non-negotiable credits are converted to negotiable funds and/or entity independent funds. Button 927 can allow a user to purchase additional entertainment credits at predetermined exchange rates or engage in a credit advance when the option is available to the customer. For example, a credit account holder may wish to engage in a loan policy for credits in exchange for a guarantee of future acts or behavior that would earn him or her non-negotiable credits. The credit loan is a policy that can take advantage of a credit account holder's lack of impulse control in regards to purchasing behavior by allowing a user to immediately purchase a desired good or purchase but delay payment until a later time. In another embodiment, the credit advance or loan can be an immediate purchase of non-negotiable credits with negotiable funds to supplement earned entertainment credits. Selection of button 925 by a user can produce GUI 930.

GUI 930 can be a display window from a conversion agency. GUI 930 includes yes button 932 and cancel button 933. GUI 930 can be rendered by any of a variety of means including, but not limited to, a Web browser, a JAVA applet, a PERL script, and the like. In one embodiment, GUI 930 can be contained within the e-commerce site. GUI 930 can display a summary message of the transaction initiated by GUI 920. GUI 930 can include a means to continue the transaction, yes button 932, and a means to cancel the transaction, cancel button 933. Selection of cancel button 933 by a user cancels the transaction and can return the user to GUI 920. Selection of yes button 932 by a user completes the transaction initiated in GUI 920 and can produce GUI 940.

GUI 940 can be a display window from the same said e-commerce site. GUI 940 can contain a message acknowledging the successful conversion of the user's non-negotiable credits into negotiable funds and/or entity independent funds for the purchase of the items in the shopping cart.

Figure 10:
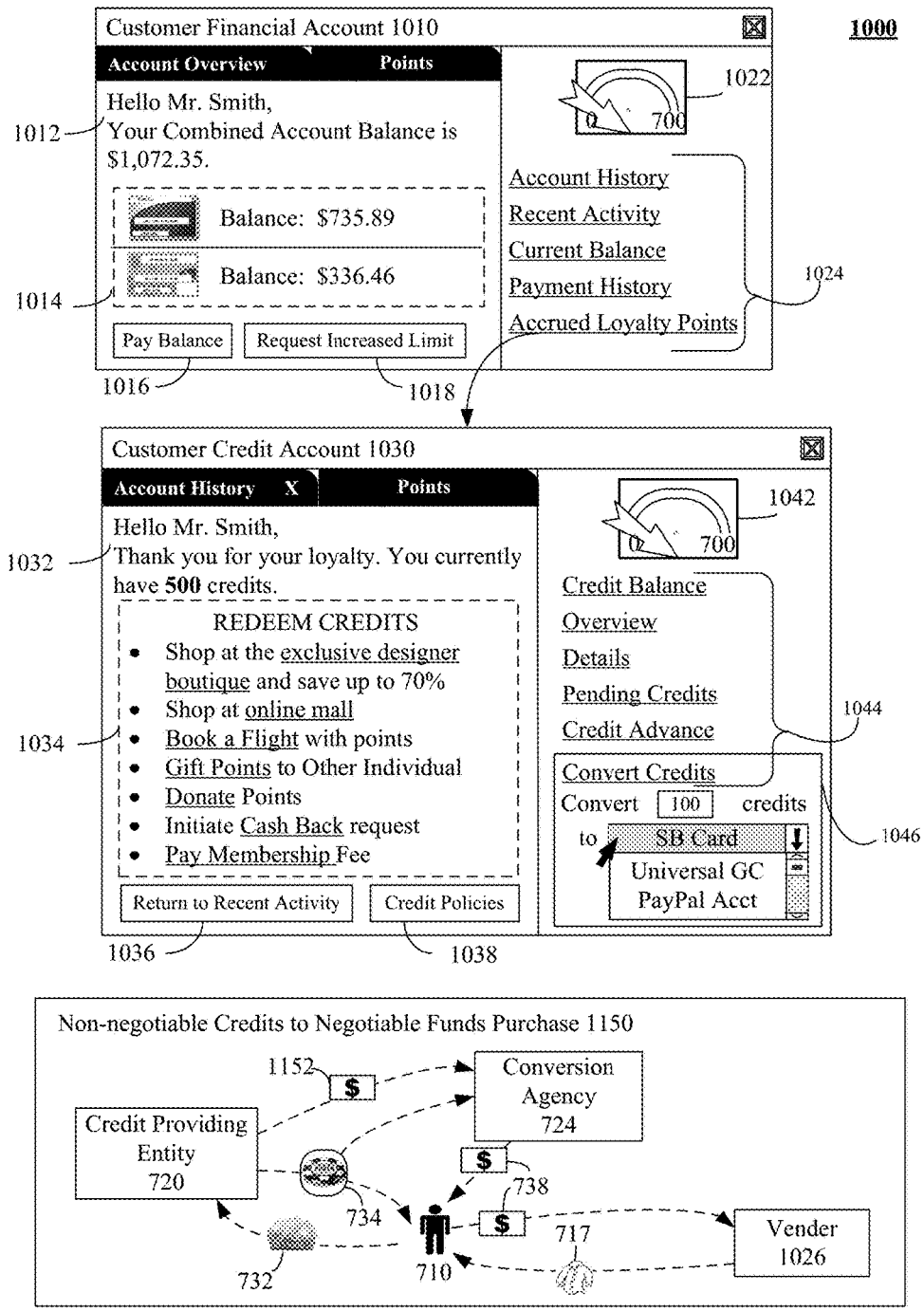
FIG. 10 is a depiction of a scenario and a set of GUIs for granting entertainment credits and presenting indicia for conversion opportunities of the non-negotiable funds earned by a consumer through interactions with the credit granting entity into negotiable funds in accordance with an embodiment of the inventive arrangements disclosed herein.

FIG. 10 is a depiction 1000 of a scenario 1050 and a set of GUIs 1010, 1030 for granting entertainment credits and presenting indicia for conversion opportunities of the non-negotiable funds earned by a consumer through interactions with the credit granting entity into negotiable funds and/or entity independent funds in accordance with an embodiment of the inventive arrangements disclosed herein.

Customer financial account 1010 can include a user prompt 1012 that can present the customer with his or her summary information, a user account overview 1014, buttons for typical options such as pay balance 1016 and request increased limit 1018, credit indicator 1022, and account navigation options 1024. User account overview 1014 can present the customer with one or more financial account types for the customer. Each account can be eligible for loyalty point accrual through a variety of options.

For example, user account type one could be eligible for a fixed 5 points per transaction credit reward and card two could allow varying levels of point accrual for different types of transactions (e.g., five point per dollar spent for automotive expenses, 3 points per dollar spent for travel and restaurants, and 1 point per dollar for all other purchases). Credit indicator 1022 can provide the customer with a visual display of the number of loyalty points he or she has accrued to date and selecting the point specific account navigation option 1024 can launch customer credit account GUI 1030.

Customer credit account 1030 GUI can include summary 1032, redemption options 1034, buttons for navigation such as a button to return to recent activity 1036 (for example, GUI 1010), and credit account specific navigation options 1044, including an option to convert credits 1046 to other payment artifacts (for example, transferring converted funds to a customer's PAYPAL account, or an entity specific gift card). Summary 1032 can present the customer with an overview of the total balance of points earned to date (which can be visually seen via indicator 1022.

Redemption option indicator 1034 can present the customer with a selection of or all available options for spending his or her accrued loyalty points. Such options can include, but are not limited to, shopping at an exclusive discount designer boutique, an online mall, booking a flight with points, gifting points to another individual or donating points to an organization or cause, initiating a cash-back request based on a specified conversion ratio, paying a membership or subscription fee with points, and the like. It should be understood that each of these redemption options can be subject to a differing conversion rate set by either the conversion agency 724 or credit granting entity 720.

Scenario 1150 depicts one viable scenario for a non-negotiable credits to negotiable funds and/or entity independent funds purchase which can include interactions between a user 710, credit providing entity 720, conversion agency 724 and vender 726. It should be noted that the separate entities are not affiliated with one another and can be separate legal entities. User 710 can engage in a consumer incentive activity 732 provided by credit providing entity 720 which in turn provides user 710 with credits 734 as a reward for engaging in the sponsored activity. The non-negotiable credits 734 can be passed onto the conversion agency 724 upon a user request or a user initiation of a purchase with credits.

In one embodiment conversion agency 724 can be compensated for their services by the credit providing entity through compensation payment 1152. In another embodiment, conversion agency 724 can build in compensation for their services through a processing or handling fee passed onto the user 710. Conversion agency 724 can then provide the user with access to negotiable funds 738 to be utilized in the user initiated transaction with vender 726. Vender 726, upon receipt of payment 738, can provide the user 710 with his or her desired good or service purchased.

Figure 11:
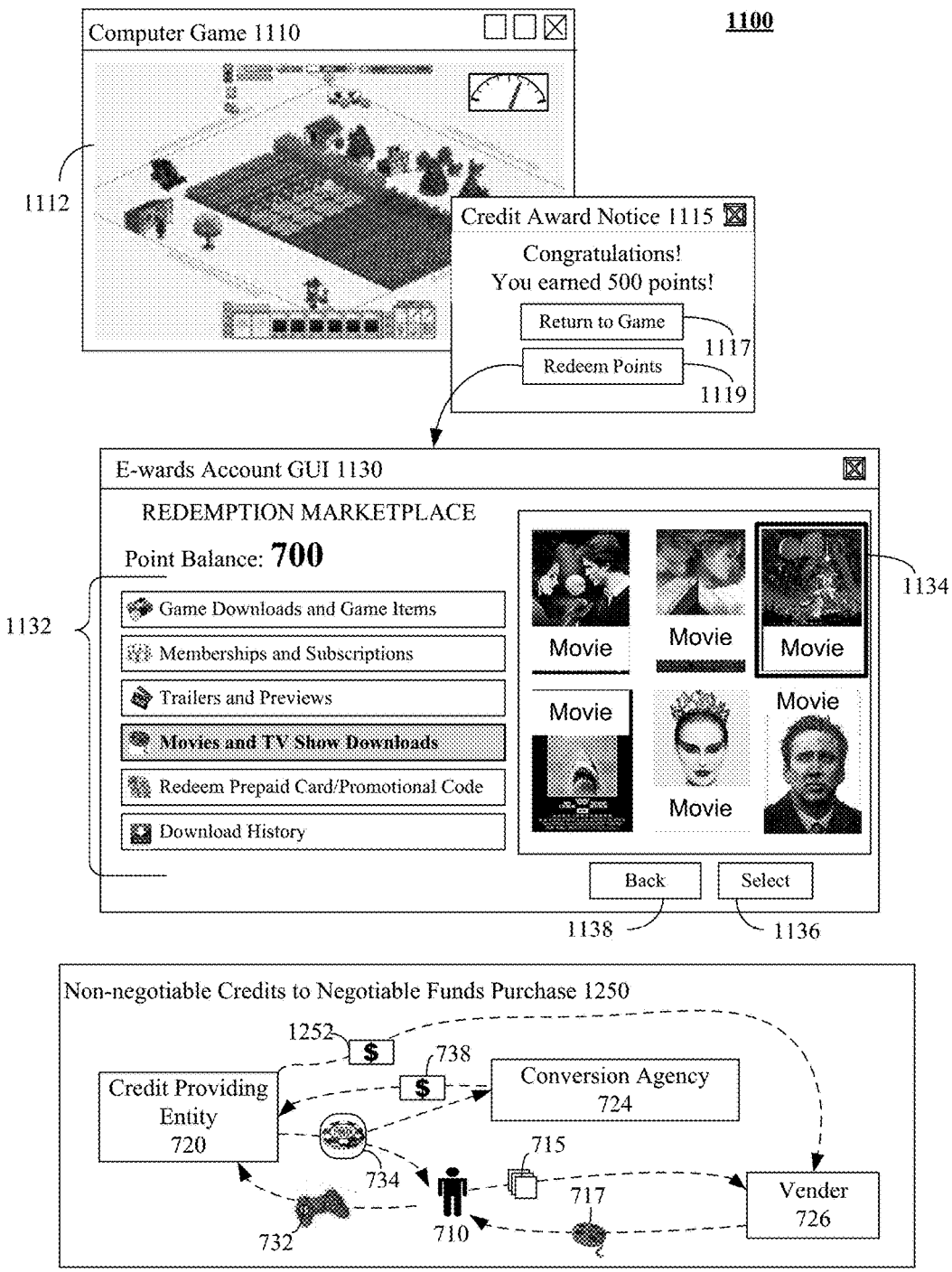
FIG. 11 is a depiction of a scenario and a set of GUIs for granting entertainment credits and directing a consumer to conversion opportunities of the non-negotiable funds earned by the consumer through a game of chance with the credit granting entity into negotiable funds in accordance with an embodiment of the inventive arrangements disclosed herein.

FIG. 11 is a depiction 1100 of a scenario 1150 and a set of GUIs 1110, 1130 for granting entertainment credits and directing a consumer to conversion opportunities of the non-negotiable funds earned by the consumer through a game of chance with the credit granting entity into negotiable funds and/or entity independent funds in accordance with an embodiment of the inventive arrangements disclosed herein.

Computer game 1110 (accessed, for example, through a social networking site, online multiplayer games, etc.) can allow a user to accrue points or non-negotiable credits through a variety of options such as reaching certain levels, obtaining certain statuses, succeeding in a variety of user collaboration scenarios, and the like. When a user is awarded points a credit award notice 1115 can inform the user that he or she has successfully completed a challenge or milestone and has been rewarded a number of entertainment credits. Credit award notice can include buttons for returning to the game 1117 and continue accruing points and redeeming points 1119. Should a user elect to redeem his or her points immediately, e-wards account GUI 1130 can be launched.

E-wards account GUI 1130 (e.g., redemption marketplace) can indicate a total user point balance, redemption options 1132, and a browsing interface for selection 1134, as well as include buttons to select 1136 an option, and a back 1138 button. Redemption options 1132 can include, but are not limited to, game downloads and game items, memberships and subscriptions, trailers and previews, movies and TV show downloads, redeeming prepaid cards or promotional codes and viewing a user download or redemption history. Game downloads and game items can include a new game, special levels opening up upon a user reaching a certain level or completing a certain action in a game, an option to purchase upgrades to user equipment or game achievements, and the like. Memberships and subscriptions can include gym memberships, magazine or newspaper subscriptions, and the like. Other options and components for credit redemption are contemplated.

Non-negotiable credits to negotiable funds and/or entity independent funds purchase scenario 1250 can include interactions between a user 710, credit providing entity 720, conversion agency 724, and vender 726. User 710 can engage in game of chance 732 with credit providing entity 720 in exchange for non-negotiable credits 734. Non-negotiable credits 734 can then be passed on to conversion agency 724 for conversion to negotiable funds and/or entity independent funds when requested by user 710 and can be returned to credit providing entity 720 for holding in a user account to be utilized on behalf of user 710 when requested.

Upon user 710 initiating a purchase with vender 726 through a request 715, credit providing entity 720 can provide vender 726 with negotiable funds and/or entity independent funds 1252 prompting vender 726 to provide user 710 with goods or services 717 (for example, a video download or streaming rental). In this instance, vender 726 does not accept non-negotiable credits 734 as payment and negotiable funds and/or entity independent funds 1252 are provided seamlessly so vender 726 is not aware of user 710 having paid in earned non-negotiable credits 734.

Figure 12:
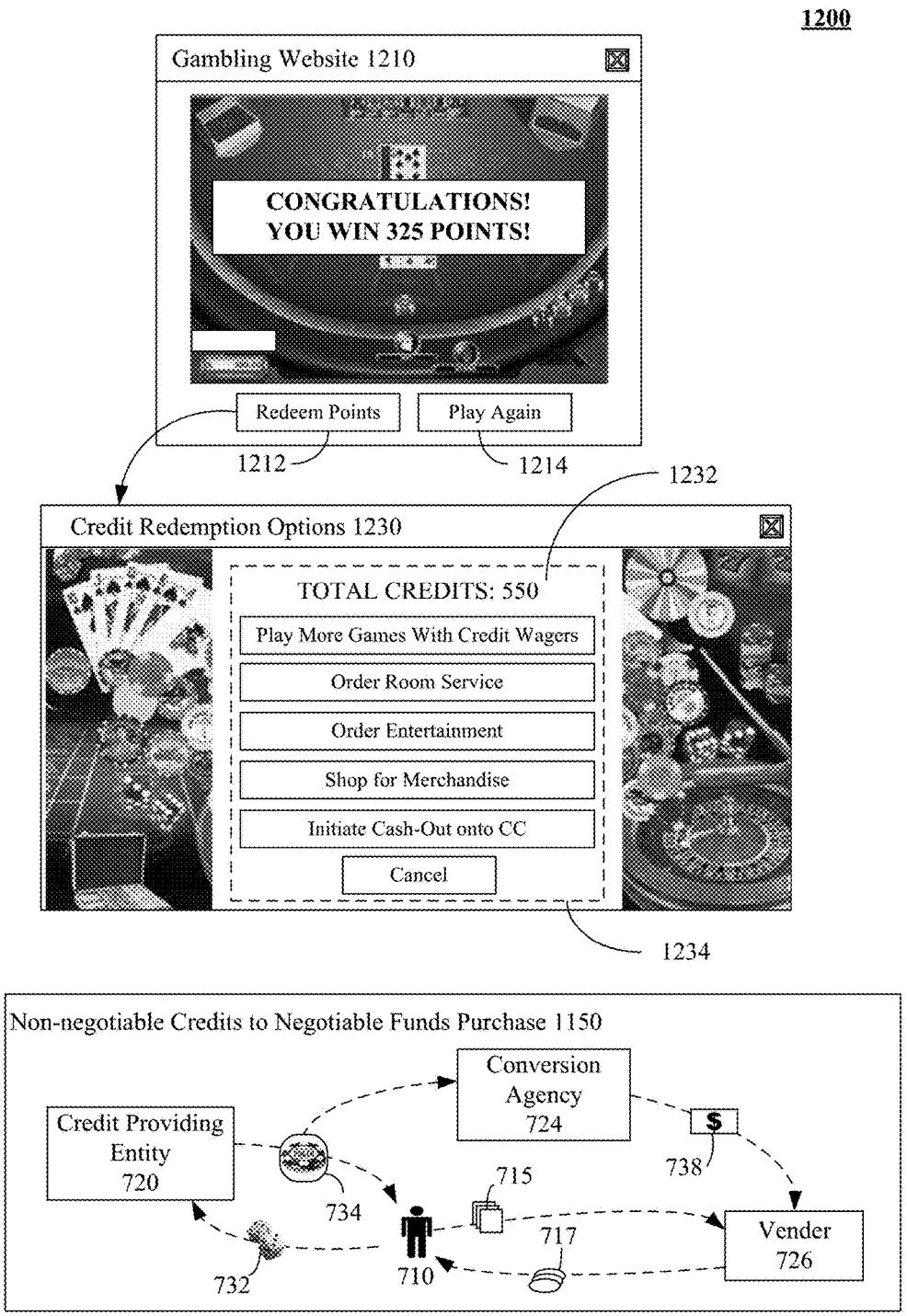
FIG. 12 is a depiction of a scenario and a set of GUIs for granting entertainment credits and directing conversion opportunities of the non-negotiable funds earned by a consumer through a gambling activity with the credit granting entity into negotiable funds in accordance with an embodiment of the inventive arrangements disclosed herein.

FIG. 12 is a depiction 1200 of a scenario 1250 and a set of GUIs 1210, 1230 for granting entertainment credits and directing conversion opportunities of the non-negotiable funds earned by a consumer through a gambling activity with the credit granting entity into negotiable funds and/or entity independent funds in accordance with an embodiment of the inventive arrangements disclosed herein.

Gambling website 1210 can provide an online gambling opportunity 1212 for customers where customers can earn points or non-negotiable credits in exchange for wining a gambling game. The number of credits earned can depend on the specific wager or odds or be fixed to a set amount per play. Upon successful completion (i.e., a win) of gambling game 1212, gambling website 1210 can present the customer with notice 1214 informing the customer of the number of credits he or she has won. In addition, gambling website 1210 can present the user with an indicia button 1216 to redeem points or an option to play again 1218.

User selection of the redeem points button 1216 can launch credit redemption options 1230 GUI. Credit redemption GUI 1230 can present a customer with his or her total credit balance 1232 as well as credit redemption options 1234. Redemption options 1234 in this instance can include options to play more games with credit wagers, order room service in a casino hotel room when available, order in room entertainment such as movies or TV shows or even purchasing tickets to events, shopping for merchandise or initiating cash-out to a credit card or other payment artifact. An option to cancel and return to the game is also included.

Non-negotiable credits to negotiable funds and/or entity independent funds purchase scenario 750 can include interactions between user 710, credit providing entity 720, conversion agency 724 and vender 726. In this embodiment's scenario, user 710 can play a gambling game 732 hosted by credit providing entity 720, which in turn can reward user 710 with non-negotiable credits 734 for participating in the gambling game. Non-negotiable credits 734 can be passed on to conversion agency 724 for conversion to non-negotiable funds 738 upon user initiation 715 of a transaction with vender 726. The conversion agency 724 can then upon conversion of non-negotiable credits 734 to negotiable funds and/or entity independent funds 738 pass on the negotiable funds and/or entity independent funds 738 to vender 726 as payment for the user requested goods/services 717. The vender can be unaware the funds are being transferred through the conversion agency 724 and thus from the vender's perspective the transaction is a regular transaction.

Figure 13:
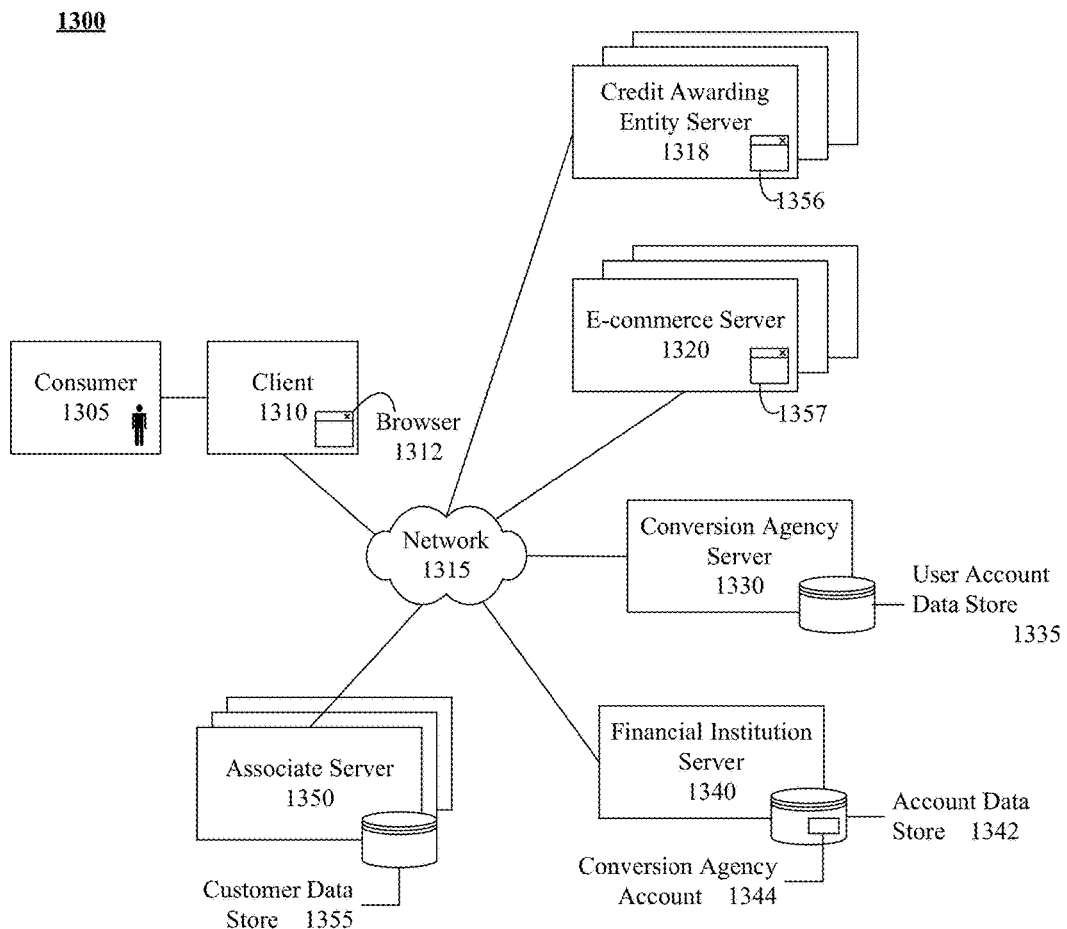
FIG. 13 is a schematic diagram of system for converting non-negotiable credits associated with a game providing entity to negotiable funds in accordance with an embodiment of the inventive arrangements disclosed herein.

FIG. 13 is a schematic diagram of system 1300 for converting non-negotiable credits associated with a credit providing entity to negotiable funds and/or entity independent funds in accordance with an embodiment of the inventive arrangements disclosed herein. System 1300 can represent a specific embodiment of system 700.

In system 1300, consumer 1305 can interact with a game of chance server 1318, such as through a Web site 156 that server 1318 provides. Interactions can occur via a browser 1312, rich internet interface, or other software executing upon client 1310. Consumer 1305 can purchase goods/services from an e-commerce Web site 757 provided by e-commerce server 1320. These goods/services can be purchased using negotiable funds and/or entity independent funds that a conversion agency server 1330 provides. The conversion agency server 1330 can convert entertainment credits resulting from earnings of a game of chance (non-negotiable funds) into the negotiable funds and/or entity independent funds.

Client 1310 can be any of a variety of devices including, but not limited to, a personal computer, a kiosk, a telephone, a personal data assistant (PDA), a mobile phone, and the like. Client 1310 can include hardware, such as a processor, a memory, and a bus connecting them (as can server 1318, 1320, 1330, 1340, and/or 1350). The hardware can execute computer program products (software/firmware) that is stored in a non-transitory storage medium. In one embodiment, client 1310 can operate in a stand-alone fashion. Alternatively, client 1310 can be a device that cooperatively participates in a network of distributed computing devices. Network 1315 can facilitate data exchanges over wireless as well as line-based communication pathways and protocols.

In one embodiment, consumer 1305 and conversion agency server 1330 can interact with associate server 1350, e-commerce server 1320, and/or financial institution server 1340 via network 1315. Conversion agency server 1330 includes user account data store 1335 in which consumer 1305 is a member. Associate server 1350 includes customer data store 1355 in which consumer 1305 is a member. Financial institution server 1340 includes account data store 1342. Account data store 1342 includes conversion agency account 1344 corresponding to conversion agency 1330.

Consumer 1305 can earn non-negotiable credits from games provided by server 1318. These earnings (non-negotiable credits) can be managed by associate server 1350. The quantity of these non-negotiable credits can be saved in customer data store 1355. Consumer 1305 can use conversion agency server 1330 to convert the non-negotiable credits from associate server 1350 into negotiable funds and/or entity independent funds provided to the e-commerce server 1320 or financial institution 1340. In one embodiment, conversion agency 1330 can maintain multiple accounts for the consumer 1305. These different accounts can be associated with different game providing entities, and with different types of non-negotiable credits.

For example, consumer 1305 can earn 500 credits from participating in an online game hosted by server 1318. Consumer 1305 can choose to use conversion agency 1330 to convert any or all of these credits to a monetary equivalent. Conversion agency 1330 withdraws the necessary amount from conversion agency account 1344 contained within the account data store 1342 of financial institution 1340 and transfers it to an account specified by consumer 1305. In another example, consumer 1305 uses conversion agency 1330 to complete a purchase at e-commerce server 1320. Again, conversion agency 1330 withdraws the necessary amount from conversion agency account 1344 contained within the account data store 1342 of financial institution 1340 and transfers it to the account of e-commerce server 1320.

E-commerce server 1320 can provide a Web site that supports online purchases of goods or services. In one embodiment, e-commerce server 1320 can include a distinct payment option for conversion agency 1330. This distinct payment option could process the conversion of credits through their Web site. Alternatively, the distinct payment option could launch an application to process the conversion of credit that is separate from their Web site. In another embodiment, associate server 1350 can act as e-commerce server 1320. In one embodiment, e-commerce server 1320 can provide a software service (or can execute a software module) that permits the sale of goods or services, without necessarily providing a Web site. Further, e-commerce server 1320 can be directly replaced with back-end system of a storefront server, serving the same relative functions as described in system 1300 of facilitating the sales of goods/services.

Financial institution server 1340 can be any of a variety of entities including, but not limited to, a bank, a credit card company, an investment firm, and the like. In one embodiment, financial institution server 1340 can reside in the same country as consumer 1305 associate server 1350, and/or game of chance server 1318. In another embodiment, financial institution server 1340 can reside in a country other than that of consumer 1305 and/or associate server 1350.

As shown herein, data stores 1355, 1335, 1342, 176, 174, and the like can be physically implemented within any type of hardware including, but not limited to, a magnetic disk, an optical disk, a semiconductor memory, a digitally encoded plastic memory, a holographic memory, or any other recording medium. Each of the data stores 1355, 1335, 1342, 776, 774 can be stand-alone storage units as well as a storage unit formed from a plurality of physical devices, which may be remotely located from one another. Additionally, information can be stored within each data store 1355, 1335, 1342, 776, 774 in a variety of manners. For example, information can be stored within a database structure or can be stored within one or more files of a file storage system, where each file may or may not be indexed for information searching purposes.

The network 1315 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 1315 can include local components and data pathways necessary for communications to be exchanged among computing device components and between integrated device components and peripheral devices. The network 1315 can also include network equipment, such as routers, data lines, hubs, and intermediary servers which together form a packet-based network, such as the Internet or an intranet. The network 1315 can further include circuit-based communication components and mobile communication components, such as telephony switches, modems, cellular communication towers, and the like. The network 1315 can include line based and/or wireless communication pathways.

One Embodiment of Disclosure Depicting Participation Credits for Targeted Goal

FIG. 14 is a depiction 1400 of scenarios and a set of GUIs for converting non-negotiable credits earned through participation awards into negotiable and/or entity-independent funds in accordance with an embodiment of the inventive arrangements disclosed herein. It should be understood that embodiments illustrated in FIG. 14 are not intended to be limiting and other embodiment for a user 1410 to obtain participation credits are contemplated. The embodiment discussed in FIG. 14 are for illustrative purposes to convey the act of earning credits through a participatory consumer incentive activity as made available by a credit providing entity.

In game participation embodiment 1420, user 1410 can play a designated computer or video game 1422 such as Farmville, World of Warcraft, Eve, Civilization, and the like and perform actions 1424 in the game 1422 that can earn user 1410 credits that are reflected in a credit meter 1426. Actions 1424 that can warrant credits 1425, can be predetermined by a computer game provider (i.e., credit providing entity). It should be noted that these computer game 1422 earned credits 1425 are for virtual world actions and interactions. As such, a user 1410 is not limited to real world actions for earning credits. A virtual world is an online community that can take the form of a computer-based simulated environment through which users can interact with one another and use and create objects. Virtual worlds are not limited to games but, depending on the degree of immediacy presented, can encompass computer conferencing and text based chatrooms.

It should be appreciated that in one embodiment, when a user is participating in an RPGA game, and as a result of his or her virtual actions in the game environment receives virtual "gold" for an "IOU", this transaction can also be considered to be a conversion from non-negotiable (the IOU) to negotiable and/or entity-independent funds (gold). Similarly, a sale of a magic sword (to be considered a credit or non-negotiable fund) that is conducted with a payment of (and as such is "converted to" virtual gold can be considered a conversion transaction resulting in negotiable and/or entity-independent funds. As such, neither the credit (subsequent non-negotiable fund) nor the negotiable fund need be real world items. A conversion from a non-negotiable fund to a negotiable fund can occur fully in a virtual world environment.

Actions 1424 that can warrant credits 1425 can include actions that lead to specific level achievements, high scores, interacting with or collaborating with other users in a certain manner should the game be a multiplayer game, and the like. Actions 1424 that warrant credits 1425 can, in one embodiment, be unknown to a user 1410 prior to achieving the credit 1425 award, encouraging users to continue participation in the game for a possible future credit 1425 award to increase their credit balance as tracked by credit meter 1426. In another embodiment, actions 1424 can be known and provider user 1410 with a roadmap to follow to earn certain credits to reach his or her own goal of accrued credits 1425. In one embodiment, credit meter 1426 can also include a notification of the current or effective conversion ratio applying to the earned credits 1425.

In external advertisement placement 1430, user 1410 can host his or her own website 1432. Part of this site 1432 can be an advertisement 1434 for external content or products. The advertisement can be for adjacent market goods to allow an adjacent market entity to take advantage of adoption order as well as commonality of requirements or relationships due to the fact that adjacent market segments share common characteristics in application requirements and ecosystem, or community, relationships.

For example, the electric toothbrush market (part of the oral hygiene market), can be adjacent to the market for dental services. As such, John Smith's Dentistry website 1432 can include an external advertisement for an electric toothbrush 1434 or an airline website can enable visitors to also view external advertisement offers from car rental companies or destination city hotels. It should be noted that an external advertisement need not be for an adjacent market good or service. Upon each consumer click 1435 of the external ad posted to John Smith's site 1432, John Smith can receive credits as shown on his credit meter 1436. The credit meter 1436 can be a personal credit mater for John Smith or a credit meter for the Smith Dentistry business entity.

The credits per click 1435 can be collected from the entity whose goods and/or services are being advertised on John Smith's website 1432. However, the credits can, in one embodiment, also be awarded to person 1410 by a third party non-affiliated entity that is engaged in business with the entity whose goods and services are being advertised. Such a third party entity can be situated in the marketplace to provide credit payment services (in effect a type of conversion payment entity that can optionally charge advertising entity a selling exchange rate for the conversion or a type of "commission" as mentioned previously).

E-wards Account GUI 1440 illustrates one embodiment of a credit account management GUI. The GUI or control element of one's credit account can be accessible from a dedicated site or be accessible from a plug in or linkage within a game or e-commerce site, and the like. In one embodiment, an e-wards GUI 1440 can present the account holder with summary information 1442 that can be linked to a user selected goal 1444 purchase (users can thus be reminded of their end reward for participating in credit earning activities. Options to change a current goal 1446, view similar options 1448 to goal 1444, and the like, can be interactive options for e-wards account GUI 1440.

Additionally, the GUI 1440 can include a visual representation of a user's current credit meter 1452 totaling a user's accrued credits from various actions and behaviors (for example, credits accrued from game participation 1420 or external advertisement placement program 1430. In another embodiment, the visual representation 1452 can be incorporated into an e-commerce website letting a user know how many more credits he or she would have to accrue to purchase certain selected items. Account management options 1454 can include a plethora of options, such as credit balance check, an overview, detailed history, pending credits (both to be received in the account as well as credits to be converted), an option for a credit advance (further expounded upon in FIG. 6), and an option to convert credits.

In one embodiment, a conversion from non-negotiable credits to negotiable and/or entity-independent funds can include selecting to apply discounts and promotions such as rewards earned through loyal customer appreciation (e.g., free shipping from an e-commerce entity, a coupon for 140% off a future purchase, and the like). In another embodiment, the option 1454 to convert credits can include a quick conversion form 1456, wherein a user can designate an amount of credits to be converted and placed on a user or account owner selected (pre-registered) gift card, store member card, payment account (such as PAYPAL), and the like. It should be noted that credit conversion can be designated to be transferred into a financial account (credit account, bank account, or other payment account) or negotiable and/or entity-independent funds instrument (such as a credit card, bank card, store card, or gift card) owned by another person. As such, non-negotiable credits can be transferred from one person to another in the form of negotiable and/or entity-independent funds.

One Embodiment of Disclosure Depicting Achievement Credits for a Targeted Purpose FIG. 15 is a depiction of a scenario and a set of GUIs for converting non-negotiable credits earned through personal achievements into negotiable and/or entity-independent funds in accordance with an embodiment of the inventive arrangements disclosed herein. It should be understood that embodiments illustrated in FIG. 15 are not intended to be limiting and other embodiments for obtain achievement credits are contemplated. The embodiment discussed in FIG. 15 are for illustrative purposes to convey the act of earning credits through an achievement focused consumer incentive activity as made available by a credit providing entity.

In this instance, the concept of giving (and removing) credits is based on an incentive structure present in human behavior (remunerative or financial incentive in this instance). As used herein, an incentive is any factor (financial or non-financial) that enables or motivates a particular course of action, or counts as a reason for preferring one choice to the alternatives. More specifically, it is an expectation that encourages people to behave in a certain way.

User achievement embodiment 1510 can be an example of one such incentive utilizing embodiment for achieving credits to be converted to negotiable and/or entity-independent funds. In this specific embodiment, an incentive can be health targeted rewarding a user for his or her health related achievements and can be sponsored by a specific entity (such as, for example, weight watchers and the like). It should be understood that other embodiments are contemplated. In this specific user achievement 1510 embodiment, user actions 1512 (such as swimming a certain number of laps, running a given amount of time or burning a specific number of calories from running, etc.) can garner a user credits 1514 in the form of non-negotiable credits.

Credits 1514 can be tracked and available for use in purchases through health credit redemption GUI 1520. Health credit redemption GUI 1520 can in one embodiment be maintained by the achievement credit sponsoring entity and credit conversion to negotiable and/or entity-independent funds can be limited to purchase of health related goods. In another embodiment, GUI 1520 as well as a user's credit balance can be maintained by another entity and credits can be converted to negotiable and/or entity-independent funds without limitations on purchases. GUI 1520 can include a credit meter 1522, and a specific conversion ratio 1524 notice. Additionally, GUI 1520 can include a button to call upon credit details 1526, and a button for a user to enter his or her recent health activity 1528 to be converted to credits 1514.

In one embodiment, entering health activity for credits can be restricted to a user's personal trainer or health representative to prevent abuse of credit garnering behavior by a user. In another embodiment, a record keeping device (such as an athletic watch or heart rate monitor, a lap counter, or a combination of such devices) can be utilized to download data into GUI 1520 to maintain accurate records of health activities and assign a correct number of credits 1514 to a user's health credit redemption GUI 1520 account and credit meter 1522. Other methods of entering health activity for credit conversion are contemplated.

It should also be noted that other types of achievement credit embodiments are contemplated. Other embodiments need not be behavior based as they can, for example, be based on a financial threshold. To illustrate, in one embodiment, a user can buy or rent a certain number of DVDs and when he or she has reached a threshold for the number he or she has spent negotiable and/or entity-independent funds on, be awarded with a non-negotiable credit for a movie ticket at a theatre. That credit can then be converted to a negotiable fund upon purchasing a movie ticket or reselling the voucher or credit to another person in exchange for negotiable and/or entity-independent funds.

GUI 1520 can also include purchase options 1529 at external sites (unaffiliated with the credit providing entity), as well as a list of types of options 1532 (which can in one embodiment include direct links). Purchase options 1529 can in one embodiment be based on a user's purchase history regarding achievement type which can also include purchases acquired without credit conversion (such as a complete AMAZON account purchase history analysis, and the like).

Other achievement based embodiments 1510 are contemplated. For example, another embodiment 1510 can include programs set up through children's schools or parents or a combination of the two, wherein certain grades, points, or extra credits can earn children for example a new Nintendo cartridge linked to academic programs and educational content. Additional points gained from playing these educational games can lead to additional credits to be converted to negotiable and/or entity-independent funds to be used to purchase goods or services.

A reverse system to the one described in user achievement embodiment 1510, can be a user behavior embodiment 1540. In this embodiment, a user 1505 can engage in the reverse of accruing credits. That means a user 1505 can lose credits based on bad behavior, which can function as negative feedback in an effort to influence a user 1505 behavior. The user 1505 can, in one embodiment, have options for making up for losing bad credits but can be limited to a ceiling of credits earned within a given timeframe.

For example, as e-wards account 1550 GUI demonstrates, a user can have a starting balance 1554 (in this instance for a weekly "allowance" of credits, which can also be for a monthly balance, etc.), as well as a current credit balance 1556 (which can reflect a user's credit balance based on behavioral credit deductions and additions) as reflected by credit meter 1552. GUI 1550 can also include a credit balance activities 1560 guide that can demonstrate a list of activities (positive as well as negative) 1562 to allow user 1505 to properly gage his or her behavior and adjust it according to his credit meter 1552 balance and desired outcome of the weekly credit balance to be available for conversion to negotiable and/or entity-independent funds at the end of the determined time period for the credit allowance. List 1562 can be can be modified as needed by a sponsoring entity that provides credits to user 1505 based on his or her behavior.

One Embodiment of Disclosure Depicting Sponsored Initiative Credits

FIG. 16 is a depiction of a scenario and a set of GUIs for converting non-negotiable credits earned through sponsored initiatives or subsidies into negotiable and/or entity-independent funds in accordance with an embodiment of the inventive arrangements disclosed herein. The additional incentives depicted in the following description are broader and economy or market based than the incentive structure discussed in FIG. 15.

Unlike a private good (such as an individual's own health), in this case credits can be earned from enhancing a public good or service. As used herein, a public good is a good that is non-rival and non-excludable. Non-rivalry means that consumption of the good by one individual does not reduce availability of the good for consumption by others; and non-excludability means that no one can be effectively excluded from using the good. Non-excludability may cause problems for the production of such goods. Uncoordinated markets driven by self-interested parties may be unable to provide these goods in optimal quantities, if at all. As such, subsidies can be used as incentives for individuals to contribute to or produce a public good.

A subsidy can be an assistance paid to a business or economic sector through a variety of ways (either directly to the business or industry or indirectly through subsidizing the business or industry's consumers' purchases). Most subsidies are made by the government, but can also be an assistance granted by others such as individuals or non-governmental institutions, to producers or distributed as subventions in an industry to prevent the decline of that industry (e.g., as a result of continuous unprofitable operations) or an increase in the prices of its products or simply to ensure it remains competitive.

The type of subsidy applied in the sponsored initiative embodiment 1610 and the market promotion embodiment 1630 is generally referred to as a direct subsidy or consumption subsidy meaning that an entity provides economic incentives (credit subsidies to be converted to "cash" or negotiable and/or entity-independent funds) to a purchaser or user of a good or service. For example, sponsored initiative embodiment 1610 shows a subsidy project, in this instance a green initiative, where individuals can receive non-negotiable credits 1614 from engaging in green actions and behavior 1612 such as carpooling, recycling, buying electric cars, and the like.

To further enhance the economic sector of the green initiative and maintain its competitiveness the non-negotiable credits 1614 can be converted to negotiable and/or entity-independent funds to be utilized in the purchase of further green products and services tracked in sponsored initiative GUI 1615. Sponsored initiative GUI 1615 can track and maintain a credit balance 1617 to be redeemed for products 1619 offered by sponsored and approved green initiative venders that are not affiliated with the original credit providing entity. Other types of subsidy credits are contemplated and the above example is not intended to be limiting.

An additional type of subsidy credit can be a market promotion embodiment 1630. It should be noted that while the following description centers on a mobile application, the disclosure should not be construed as limited to a mobile application. Market promotion embodiment 1630 can include a mobile device 1602, for example an iPHONE or ANDROID smartphone, which can provide access to a credit earning and conversion application. The mobile device 1632 can include a display area 1634 and an input mechanism 1636, which, in this example, are one-and-the-same. That is, the display area 1634 of a mobile device 1632 can also be used as the input mechanism 1636, for example, with a touch screen.

Mobile device 1632 display 1634 can present the user with an app of the day 1635 marketplace. The app of the day marketplace 1635 can include app promotion 1636 summary as well as more detailed app (of the day) information 1637. For example, an NFL Superbowl Tracker application can be offered as a free app of the day. This free app can, in one embodiment, be due to a previous qualifying app purchase as noted in the app information 1637 section. In another embodiment, the app promotion can be freely available to all users regardless of prior app purchases. App of the day 1635 display can also include a back button 1638 to return the user to a prior screen or an install button 1639 to download and install the promoted app of the day 1636 to his or her mobile device 1632. In such a manner a user engaged in a conversion of non-negotiable to negotiable and/or entity-independent funds. The marketplace will offer the app of the day for free to its purchasers (as a non-negotiable credit that to the marketplace is a negative one, expended for marketing, good will, or another intangible benefit) but still reimburse the app provider with the usual amount of payment for the app or the app provider receives a tax write-off, or the like.

In another embodiment, upon successful installation of the app promotion 1636, the user may access a used app store 1640 via mobile device 1632. The Used app store 1640 can present the user with resale options 1642 of installed applications of the mobile device 1632. Additionally, the used app store 1640 can include a button for buying used apps 1644 as well as a button to view sale history 1646. A user selling an application in a secondary marketplace is a type of non-negotiable fund to negotiable fund (money or otherwise) exchange. The sale can be for credits that can be converted to cash or cash itself. The currency for this transaction can, in one embodiment, be tracked and maintained within an e-wallet application or rewards account, and the like.

Other types of promotions for credits are contemplated. For example, airlines allow sales for a limited time period for certain flights or destinations earning a consumer double or triple the loyalty points. Loyalty points can be converted to negotiable and/or entity-independent funds or can be transferred or gifted to another member in a transaction (which can be viewed as the reverse of a non-negotiable to negotiable and/or entity-independent funds exchange from the viewpoint of the account holder).

One Embodiment of Disclosure Depicting Social Networking Credits

FIG. 17 is a depiction of scenarios and GUIs for converting non-negotiable credits earned through social networking activities into negotiable and/or entity-independent funds in accordance with an embodiment of the inventive arrangements disclosed herein. Many types of social or community enhancing activities are contemplated for the purpose of earning credits to be converted to negotiable and/or entity-independent funds. The following embodiments are for exemplary purposes only and other social networking credit embodiments are contemplated.

Social networking, as used herein, refers to platforms that focus on the building and reflecting of social networks or social relations among people, who, for example, share interests and/or activities. As such they can be individual or group-centered. Social networking services allow users to share ideas, activities, events, and interests within their individual or group networks. Generally, a social network service consists of a representation of each user (often a profile), his/her social links, and a variety of additional services.

It should be noted that most social network services are web-based and provide means for users to interact over the Internet, such as e-mail and instant messaging. As such, social networking credit services can be integrated into e-commerce sites to allow for social feedback actions 1710, social outreach actions 1750, and the like.

Social feedback actions embodiment 1710 can illustrate how a consumer may earn credits from providing reviews or other services that allows other members of his or her social network to act in a more informed manner. Decision making of other members of the social network are improved the more information (or certainty) is added to a specific situation or choice. It should be noted that more informed individuals will be able to make more rational choices in the economic sense, which subsequently facilitates the prediction of market behavior for economic entities. As such, both consumers as well as suppliers benefit from the proliferation of social feedback options for credit.

E-commerce site 1720 can sell products and services and allow purchasers to perform socially serving activities in exchange for providing them with credits in the form of loyalty points, discounts, or other non-negotiable credits. Social credit action GUI 1722 shows one example of such a socially serving activity. In this embodiment, the credit garnering activity can be leaving a review for a previously purchased good such as writing a book review on AMAZON.

Options associated with the social credit action GUI 1722 can include a visual ranking (starts) 1724 option as well as a descriptive text rating 1726. The form can also include a submit button 1727 that can publish the user created review to e-commerce site 1720, and a cancel button 1729 that can return the user to e-commerce site 1720 without publishing a social credit action or review. An optional account button 1728 can provide a means for a credit user to reach his or her awards credit account (such as social credit account GUI 1730) directly from an e-commerce site 1720.

User selection of the account button 1728 can launch the social credit account GUI 1730. The credit account GUI 1730 can include a listing for overall account balance 1732 as well as a details pane 1734. Details pane 1734 can list the user's past credit garnering actions and a breakdown of the amount of credits gained from various types of social feedback actions. For example, a user can have earned credits from writing reviews, sharing a review, liking another individual's review (or marking it as useful or helpful) or receiving a helpful status of one of his or her own reviews.

It should be noted that in one embodiment, receiving a "helpful" status on a written review by another credit account holder can garner a user additional credits to the original writing of the review to encourage honesty and more perfect information to enter the market. Similarly, a user may receive a dock in credits (negative credits) when one of his or her social feedback actions is deemed as irrelevant or untrue. Other options for creating an effective incentive structure for social actions are contemplated. GUI 1730 can also include a button 1736 to encourage use of credits for a purchase.

Social outreach action embodiment 1750 depicts another type of social proliferation of information within the marketplace. In this instance, a deal site 1752 (for example, an e-commerce site providing goods and services as well as daily deals on purchases to customers) can present a consumer with a summary page 1752 of a recently purchased deal for a good or service. The summary page 1754 can include purchase information 1756, as well as a social outreach option 1758 coupled to the recently purchased good or service that can garner a purchaser credits in the form of non-negotiable and/or entity-independent funds.

It should be noted that deal site 1752 can be any site for an entity that can function as a retailer or "front" for other venders (e.g., Amazon, eBay stores, Newegg marketplace, etc.) where any credits, loyalty points, discounts, membership benefits (e.g., even free shipping on AMAZON PRIME) that can be considered an "earning" someone is paying for, involve a conversion of non-negotiable credits to negotiable and/or entity-independent funds from one entity to another. In effect the retailer or front party supplements the vender that it is a storefront for, for the non-negotiable credits extended to the deal site 1752's members or credit recipients.

In one embodiment, there can be a requirement associated with the credits. For example, a requirement can be set that a user's social outreach actions lead to three of his or her social network contacts purchasing the same item before a user will be given credits. In this instance, the credits can be that the original purchaser's transaction is free. This is in effect a set of non-negotiable and/or entity-independent funds extended to the purchaser by the deal site 1752 to be utilized in purchasing (with negotiable and/or entity-independent funds) a deal for goods or services from another entity at a discount.

Selection of the social outreach option 1758 can launch a sharing options GUI 1760 to be presented to the purchaser. Sharing options GUI 1760 can include quicklinks or address fields for social network contact options 1762 (for example, a credit account holder's FACEBOOK friends, TWITTER followers, GOOGLE+ contacts, or OUTLOOK contacts). In this manner, sharing options GUI 1760 can provide convenient and quick dissemination of the site 1752's information to a user's social network. In this embodiment, sharing options GUI 1760 can be coupled to an individual's social networking contact lists. A submit button 1764 can be included to launch messages sharing the deal purchase as well as a cancel button 1766 that can return the user to the deal site 1752.

A further example of vender transactions discussed above can include a phone service company extending a discount on a new mobile phone to a customer for signing an additional contract. The discount the customer receives is a form of non-negotiable fund that the phone service company can convert into negotiable and/or entity-independent funds (as they will be paying the supplier of the new mobile phone the full price for the item). Additional scenarios where an entity supplements another entity downstream for a credit given to a purchaser are contemplated.

One Embodiment of Disclosure Depicting Credit Advance for Future Credits Earned

Figure 18:
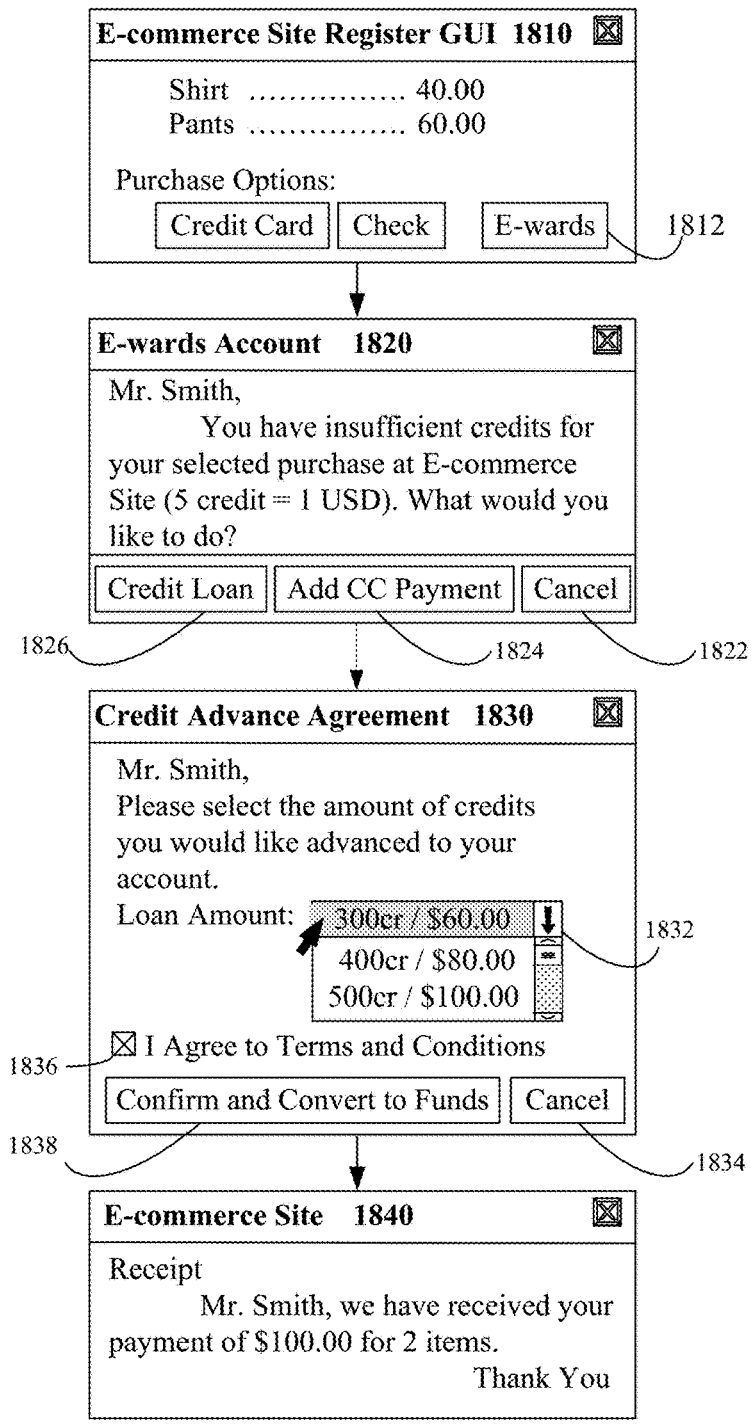
FIG. 18 is a depiction of successive GUIs that illustrate a web based credit advance and subsequent conversion of non-negotiable funds into negotiable funds in accordance with an embodiment of the inventive arrangements disclosed herein.

FIG. 18 is a depiction of successive GUIs that illustrate a web based credit advance and subsequent conversion of non-negotiable credits into negotiable and/or entity-independent funds in accordance with an embodiment of the inventive arrangements disclosed herein. Most of the time, a user will have earned credits from engaging in previous interactions with a credit providing entity. However, it should be appreciated that at times consumers may wish to purchase additional credits or request a credit advance to complete a purchase with non-negotiable and/or entity-independent funds converted to negotiable and/or entity-independent funds.

In this manner, a credit account holder may wish to engage in a loan policy for credits in exchange for a guarantee of future acts or behavior that would earn him or her non-negotiable credits. The credit loan is a policy that can take advantage of a credit account holder's lack of impulse control in regards to purchasing behavior by allowing a user to immediately purchase a desired good or purchase but delay payment until a later time.

As used herein, a loan is a type of debt. Like all debt instruments, a loan entails the redistribution of financial assets over time, between the lender and the borrower. In a loan, the borrower initially receives or borrows an amount of money (or in this instance credits), called the principal, from the lender, and is obligated to pay back or repay an equal amount of credits to the lender at a later time. The credits can be paid back in regular installments, or partial repayments; in an annuity, each installment is the same amount. It should be noted that the loan (or credit advance) can generally be provided at a cost, referred to as interest on the debt, which provides an incentive for the lender to engage in the loan or credit advance.

Conventionally, an advance service for funds can allow credit account holders to withdraw credits, either through an ATM or over the counter at a bank or other financial agency, up to a certain limit. Such advances can generally incur a fee (to replace the interchange fee normally charged to the merchant on a card transaction), although this can be waived if the account is in credit. It should be noted that credit advances can be, but are not required to be administered in a conventional advance service manner. That is, in one embodiment, higher conversion ratios for credit advances can be required for purchases making a credit advance fee dependent upon the amount of credits requested, while in another embodiment a credit advance can include a one-time fixed credit fee associated with the credit loan or advance. It should be understood that other arrangements for the loan of credits to be utilized for conversion to non-negotiable and/or entity-independent funds are contemplated.

E-commerce site register GUI 1810 can be a checkout window from an e-commerce site. GUI 1010 includes payment button 1812, which represents a payment option that includes the conversion of non-negotiable credits to purchase the items in the shopping cart. Selection of payment button 1812 by a user can produce GUI 1820.

E-wards account GUI 1820 can be a display window from a conversion agency. GUI 1820 can include a message communicating a user's credit account balance of non-negotiable, entertainment credits earned from one or more game providing entities, or the status of the account in relation to the requested purchase amount from GUI 1810. It should be noted that when a user has enough credits to complete the purchase, he or she can be presented with a credit account GUI to choose the type of credits to apply to his or her requested purchase as summarized in GUI 1810.

In this instance, however, a message notifying the user that there are insufficient funds in place can provide a user with three button options (cancel purchase 1822, add other form of payment 1824, or request credit loan 1826). GUI 320 can be rendered by any of a variety of means including, but not limited to, a Web browser, a JAVA applet, a PERL script, and the like. In one embodiment, GUI 320 can be contained within the e-commerce site.

Selection of cancel button 1822 by a user cancels the transaction and can return the user to GUI 1810. Selection of the add other form of payment button 1824 can result in a conventional credit card or PayPal payment GUI being presented to the user to supplement or replace the credit based payment. Selection of the credit loan button 1826 can produce credit advance agreement GUI 1830.

GUI 1830 can be rendered by any of a variety of means including, but not limited to, a Web browser, a JAVA applet, a PERL script, and the like. In one embodiment, GUI 1830 can be contained within the e-commerce site. GUI 1830 contains a means by which the user selects the amount or even type of non-negotiable credits to advance including, but not limited to, a set of radio buttons, a set of checkboxes, a highlighting mechanism, and the like. Display box 1832 can display the monetary value of the selected non-negotiable credits as well as the amount of credits to be advanced for conversion and purchase completion at the e-commerce site. The value displayed in display box 1832 can be based on preset conversion factors.

Selection of cancel button 1834 by a user cancels the credit advance process and can return the user to GUI 1810. Button 1838 can represent the initiation of the process by which the selected non-negotiable credits are advanced and subsequently converted to negotiable and/or entity-independent funds. Selection of button 1838 by a user can be dependent upon a user actively acknowledging terms and conditions 1836 of the requested credit advance and can produce GUI 1840. As such, selection of button 1838 by a user completes the transaction initiated in GUI 1810 and can produce GUI 1840.

E-commerce site 1840 GUI can be a display window from the same said e-commerce site. GUI 1840 can contain a message acknowledging the successful conversion of the user's non-negotiable credits into negotiable and/or entity-independent funds for the purchase of the items in the shopping cart.

Figure 19:
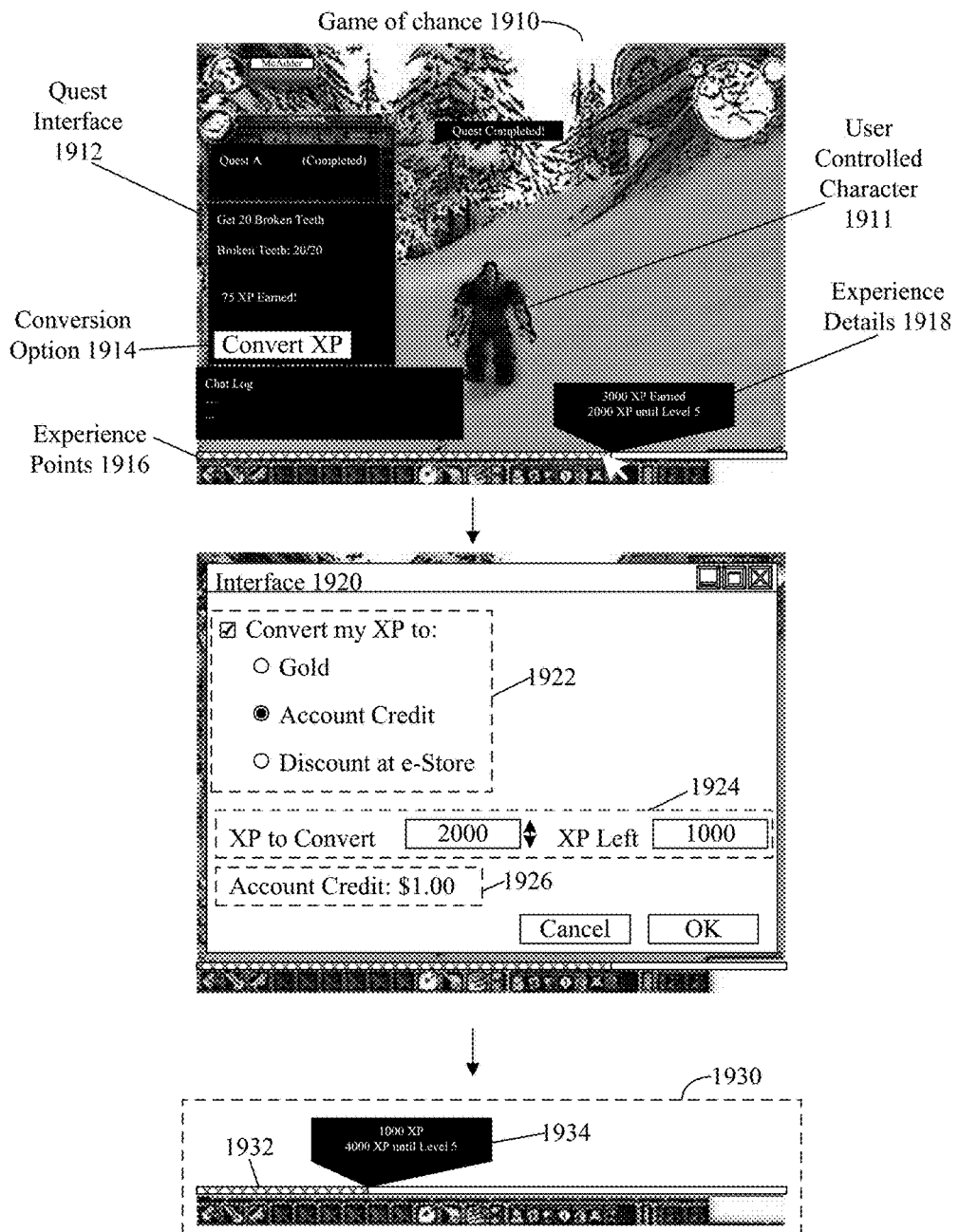
FIG. 19 is a schematic diagram illustrating a set of interfaces within a game of chance for the conversion of non-negotiable credits to negotiable funds in accordance with an embodiment of the inventive arrangements disclosed herein.

FIG. 19 is a schematic diagram illustrating a set of interfaces 1900 within a game of chance for the conversion of non-negotiable credits to negotiable and/or entity-independent funds in accordance with an embodiment of the inventive arrangements disclosed herein. In interfaces 1900, a user controlled character 1911 within a game of chance 1910 can be utilized to earn entertainment credits (e.g., experience points 1916) by interacting with a virtual world of the game of chance 1910. Experience points 1916 can be automatically converted within game 1910 using interface 1920. The result of the conversion can produce negotiable credits (e.g., a user account credit 1926) which can be used by the user in one or more traditional ways. For example, the conversion can be used by the user to supplement a payment of an online subscription to game 1910. In one instance, game 1910 can be a massively multiplayer online role-playing game (MMORPG). For example, the game of chance 1910 can be an MMORPG game.

Experience points 1916 can be earned by interacting with entities within the game of chance 1910 where interactions are governed in part by a randomization component. For example, character 1911 can perform combat with a computer controlled opponent which can respond to user controlled character actions by the use of a random action algorithm to perform appropriate reactions. In one embodiment, game 1910 can encompass one or more randomization elements which can include, but is not limited to, combat interaction, loot generation, non-playable character (NPC) interactions, and the like. It should be appreciated that game 1910 can be highly dynamic and randomized environment which can support single-player mode and/or multiplayer mode.

In game of chance 1910, a character 1911 can be utilized by a user to complete an objective (e.g., Quest A). In one instance, objective completion can be presented quest interface 1912 permitting visual confirmation of the objective. In the instance, interface 1912 can include a conversion option 1914 which can permit the conversion of experience points 1916 to a user selectable option. For example, conversion option 1914 can be a user interactive button which can trigger the presentation of interface 1920. Experience details 1918 can be utilized to present information about total experience points earned during character's existence. Details 1918 can provide pertinent experience point information when a cursor is placed over experience point 1916 presentation (e.g., XP bar). For example, experience points 1916 can be presented as a horizontal bar within game 1910 interface. In one instance, experience details 1918 can be customized to present conversion information about a user defined goal. In the instance, a user can specify negotiable fund goals (e.g., monetary sums), entertainment credit goals (e.g., gold pieces), and the like. For example, details 1918 can present the amount of experience points required to reach a ten dollar conversion.

Upon selection of conversion option 1914, interface 1920 can be presented within game 1910. Interface 1920 can include conversion options 1922, configuration options 1924, and conversion information 1926. Conversion options 1922 can include, but is not limited to, conversion of experience points 1916 into virtual currency, account credit, discounts at e-commerce sites, dragon kill points (DKP), and the like. In configuration options 1924, a user specified quantity of experience points can be converted to selection option 1922. For example, a user can choose to convert two thousand experience points to an account credit. In conversion information 1926, information about conversion outcome for experience points can be presented. In one instance, information can present a quantity of negotiable and/or entity-independent funds to be received, conversion rate details, and the like. It should be appreciated that conversion rates can be dynamic and or constant. In one embodiment, conversion rates can be tied to game 1910 economy permitting economic state to dictate conversion rates.

In one embodiment, conversion of experience points can negatively affect character development. In the embodiment, a quantity of experience points can be deducted from the character based on the configuration options 1924 specified by user. For example, if a user selects to convert two thousand experience points into a one dollar account credit the character 1911 can be reduced to one thousand experience points from three thousand experience points. It should be appreciated that experience points can be continually gained and lost through game 1910 interaction and conversion options 1914.

In section 1930, a portion of game 1910 interface can be presented displaying the outcome of the conversion. In section 1930, experience details can be presented in a tooltip 1934 which can indicate the current experience points of the character 1911 resulting from the conversion. For example, experience points 1922 can be a shortened horizontal bar indicating the portion of the level which the character 1911 has achieved.

Drawings presented herein are for illustrative purposes only and should not be construed to limit the invention in any regard. It should be appreciated that the disclosure is not limited to the conversion of experience points within game 1910. It should be appreciated that options 1922 can be mutually exclusive, combinatorial and the like. For example, a user can convert experience points into a sum of gold pieces and an ecommerce store credit. It should be understood that the functionality described within interfaces 1900 can be performed by a plug-in, Web-enabled service, 19rd-party tools, and the like. For example, interface 1920 can be a screen of an add-on software. It should be appreciated that conversion functionality can be performed by a conversion agency intermediary independent of game 1910 provider.

FIG. 20 is a schematic diagram illustrating a set of interfaces 2000 within a game of chance for the conversion of non-negotiable credits to negotiable and/or entity-independent funds in accordance with an embodiment of the inventive arrangements disclosed herein. In interfaces 2000, entertainment credits obtained from one or more achievements within a game of chance 2050 can be converted to negotiable and/or entity-independent funds which can be utilized in game of chance 2060. For example, an achievement completed in Game A can be converted to gold pieces (e.g., in-game currency) of a Game B. In one embodiment, conversion can be a two step process similar to an import/export procedure. In the embodiment, a user can select to convert achievement points within a Game A to Game B currency. In the embodiment, the conversion can be initiated within interface 2051 of game 2050 and completed within interface 2061 of game 2060. It should be appreciated that the disclosure is not limited in this regard and can include a one stage process.

In game 2050, an interface 2051 can be presented indicating an achievement accomplishment. Interface 2051 can include achievement information, conversion option 2052, conversion element 2054, and the like. Conversion option 2052 can be a user selectable option which can permit conversion of entertainment credits (e.g., achievement points) to be utilized as negotiable credits (e.g., silver pieces) within one or more different games (e.g., Game B, Game C). It should be understood that the conversion can include one or more conversion rates which can be associated with one or more games. For example, if a game has three types of virtual currency, each type can be presented as an option for conversion. It should be appreciated that games can include games from one or more different vendors.

In game of chance 2060, an interface 2061 can present conversion details for receiving negotiable and/or entity-independent funds from entertainment credits. Interface 2061 can include, but is not limited to, game selection 2062, conversion preferences 2064, and the like. For example, pending conversions (e.g., Game A achievement) can be presented within game selection 2062. In conversion preferences 2064, user selectable preferences for receiving funds can be specified. For example, ten achievement points can be converted to a quantity of twenty silver pieces within Game B. In one instance, conversions within FIG. 20B can be performed from a centralized user interface (e.g., conversion interface) which can permit immediate conversion of entertainment credits to negotiable and/or entity-independent funds. Upon selection of element 2066, a user profile associated with Game B can be accredited with funds.

Drawings presented herein are for illustrative purposes only and should not be construed to limit the invention in any regard. It should be appreciated that achievements can include, individual achievements, group based achievements, and the like. For example, achievements can include successful completion of a raid encounter (e.g., killing a boss opponent) or a group quest.

FIG. 21 is a flowchart illustrating a set of embodiments 2100, 2130 within a game of chance for the conversion of non-negotiable entertainment credits to negotiable and/or entity-independent funds in accordance with an embodiment of the inventive arrangements disclosed herein. In embodiment 2100, tool 2112 within game of chance 2110 can permit conversion of entertainment credits (e.g., harvested crops) to negotiable and/or entity-independent funds (e.g., micropayment). In embodiment 2130, interface 2134, 2136 can allow game of chance 2132 earned credits to be converted into vendor specific vouchers.

In game of chance 2110, a tool 2112 can be utilized to convert user generated earnings to negotiable and/or entity-independent funds. In one instance, game 2110 can be a simulation based game permitting earnings to be accrued which can determine user success within the game. For example, game 2110 can be a farming simulation which allows the planting, harvesting, and selling of crops (e.g., at a virtual market in game 2110) to advance the gameplay. It should be appreciated that earnings can include, but is not limited to, virtual currency (e.g., farm coins), experience points, crops, animals, and the like.

In one instance, tool 2112 can trigger the presentation of interface 2112. In the instance, interface 2112 can include, but is not limited to, earned credits 2120 information, converted funds 2122 details, and the like. In one embodiment, game of chance 2110 can be a multiplayer game (e.g., co-operative gameplay) associated with an online social network framework. For example, game 2110 can be a social networking game. It should be appreciated that game 2110 outcome can be affected by one or more random variables including, multiplayer interaction, virtual economy state, and the like. In interface 2112, user selectable credits 2120 can be chosen to be converted into funds 2122. In one instance, interface 2112 can be an interface able to support co-operative gameplay. In the instance, interface 2112 can be presented in response to a co-operative user action within a second user interface of game 2110. For example, a second user (e.g., John) can initiate a conversion action which can convert harvested crops into fifty cents upon approval by the first user. That is, interface 2112 can be a mechanism for co-operative gameplay with conversion capabilities. It should be appreciated that interface 2112 can include capabilities which support other co-operative gameplay including, but not limited to, trading, group-based objectives, and the like.

In game of chance 2132, points earned from presence registration at a venue associated with a location based service can be converted into a negotiable voucher. Game of chance 2132 can include, but is not limited to, online social network game, location based game, and the like. For example, game of chance 2132 can include geocaching games which can reward points for locating cached objects. In one instance, game 2132 can be associated with a location based social networking Web site. For example, game 2132 can be a mobile application for earning status advancement (e.g., points, badges, titles, etc.) by presence registration (e.g., "check-in") at a venue. It should be appreciated that earnings can be affected by one or more random variables including, user-to-user interactions, venue promotions, and the like.

In interface 2134, conversion of earned points (e.g., from "check-ins") can be performed utilizing conversion artifact 2144. Interface 2134 can include, but is not limited to, earnings information 2141, conversion option 2142, conversion artifact 2144, and the like. For example, interface 2134 can present the points earned by a user (e.g., 1000 points), a conversion option (e.g., coupon information), and a mechanism for initiating conversion (e.g., "Buy Coupon" button). In one instance, interface 2134 can be presented when a quantity of earning is reached. For example, when a user reaches one thousand points, the interface 2134 can be automatically presented upon check-in. In another instance, interface 2134 can be manually selected from a set of conversion options associated with the game of chance 2132. In one embodiment, conversion option 2142 can be a voucher for a venue associated with a previous presence registration. For example, a discount (e.g., option 2142) can be selected based on one or more places the user has visited in the past thirty days.

Upon conversion initiation via conversion artifact 2144, conversion 2140 can be performed. Interface 2136 can be presented responsive to the conversion 2140. In interface 2136, a coupon 2152 can be presented which can be utilized by a user as a negotiable entity. In one instance, coupon 2152 can be automatically and/or manually utilized. For example, coupon 2152 can be automatically added to a user account associated with a venue at which the coupon is redeemable. In one embodiment, interface 2136 can present electronic and non-electronic options for coupon redemption. In the embodiment, an electronic redemption button 2150 can permit the presentation of coupon 2152 which can be communicated to proximate electronic devices. For example, "Use Now!" button 2150 can present coupon 2152 with barcode (e.g., linear, QR) which can be scanned at a register to provide a discount at checkout (e.g. upon item purchase). In the embodiment, interface 2152 can permit a hardcopy of the coupon 2152 to be created which can be utilized as a traditional coupon.

FIG. 22A is a flowchart showing a simplistic depiction of a loyalty program. The most basic elements are that loyalty programs require memberships, where members can earn points in that member's account. The points can be used to purchase rewards offered by the loyalty program.

FIG. 22B shows embodiments of the present disclosure that include material limitations to create a bridge between two different loyalty programs with their own program specific boundaries.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

This invention may be embodied in other forms without departing from the spirit or essential attributes thereof. Accordingly, reference should be made to the following claims, rather than to the foregoing specification, as indicating the scope of the invention. As used in the claims herein (consistent with the specification as interpreted by one of ordinary skill) claimed terms are to be interpreted as follows (that is, all claim construction of the following claims are to be construed consistent with the below term definitions—so any ambiguity in the specification that includes multiple embodiments is to be resolved consistent with the below when interpreting the claims in light of the specification). With regard to the loyalty program (where the entity is the loyalty program operator) and the different loyalty program (where the commerce partner is the loyalty program operator) value of the loyalty program points is secured (or backed) by the respective loyalty program operator. That is, loyalty program points (of the loyalty program) and different loyalty program points (of the different loyalty program) are non-negotiable units of value, where the loyalty program operator guarantees or creates whatever value is attributed to these issued points. The loyalty program operator exclusively originates the loyalty program points. The loyalty program operator may (or may not) sell these originated points on an open market (for a program operator defined cost), the loyalty program operator may (or may not) sell groups of points that it originated (created from nothing) to other merchants to distribute to customers. The value of the loyalty program points is subject to unilateral change by the loyalty program operator (although contract law and agreement made with merchants and/or consumers may legally impose constraints upon these unilateral changes—otherwise the control of value is possessed by the loyalty program operator. If the loyalty program operator goes bankrupt, the value of issued points is subject to bankruptcy determinations. Additionally, in absence of self-imposed or contractually agreed upon terms, the loyalty program operator can change the valuation of issued points by fiat, which affects holders of these loyally program operator backed points). Terms of the loyalty programs operated by loyalty program operators (both the entity and the commerce partner are loyalty program operators) are established by the loyalty program operator. These terms do impose a membership requirement in order to accumulate, maintain, or redeem the points granted per terms of the respective programs. Program members possess program specific accounts, within which membership points are accrued. The accounts are stored in non-transitory storage mediums controlled (whether physically owned by the program operator or provided as a computing service by a third party) by the program operator per terms of the respective program. The terms of the programs (both the loyalty program and the different loyalty program) impose membership conditions, impose redemption restrictions, and impose transfer restrictions on the program points held in the program accounts. The loyalty program operators (both commerce partner and entity for their respective programs) utilizes the value of loyalty program points held in the accounts, utilizes the membership conditions, utilizes the redemption restrictions, and utilizes the transfer restrictions to shape future commerce actions of members of the programs in a manner beneficial to the program operator such that commerce activities (unrelated to the running of the programs) between a program operator and members increases (statistically, where individual members may not necessarily increase but in aggregate statistics averaged across members expresses the increases) net revenue from the members for the future commerce actions (unrelated to the loyalty program itself, but influenced by the loyalty program that shapes member behavior with rewards/constraints) between the members and the program operator when statistically compared to anticipated future net revenue from a similarly positioned non-members. Further, as used herein, the entity and the commerce partner are different legal entities and are not parent or subsidiary entities of each other. Conversions of loyalty program points (of the entity's program) to different program points (of the commerce partner's program) is explicitly permitted by terms of a mutual agreement established between the entity and the commerce partner. The mutual agreement is differentiated from other open market entities based at least in part on the commerce-based relationship between the entity and the commerce partner. In other words, the commerce partner has a business-related relationship with the entity that provides a synergy significant in shaping consumer behavior in a desired manner as defined by the loyalty program operator.

(Once such synergy is between airlines and hotel partners as airline commercial activities and hotel commerce activities are market complements. Negative commerce based relationships <like substitute goods, where the relationship is that of a competitor> can be disfavored by not including them in a contract, or by making contract terms result in high value loss per transaction). The mutual agreement establishes an agreed upon ratio for converting loyalty points to different loyalty program points and establishes a compensation amount to be paid by the entity to the commerce partner on a per-point basis for conversions of member points between programs.

The claims as presented herein are intentionally constrained in scope and breadth to include only patent eligible subject matter. Any embodiments of the disclosed invention as claimed determined to be non-patent eligible under 35 USC 101 (or determined to be exceeding permitted bounds of patently of allowable subject matter based on any judicially created doctrines, or based upon any statute) are explicitly disclaimed herein. The claims presented herein are to be construed as being limited in scope to include only a process, a machine, a manufacture, and/or a composition of matter as legally defined to be patent eligible per application of 35 USC 101, and the claims are explicitly to be construed as excluding any embodiments falling outside the patent eligible bounds defined by 35 USC 101. Any interpretation of claimed subject matter resulting in coverage of non-patentable abstract ideas (under rules based on 35 USC 101) are expressly disclaimed herein. For clarity of doubt, per claim construction (interpreting the claims in the broadest reasonable fashion in light of the specification) this specification explicitly restricts the scope of the claimed subject matter to include only embodiments of the claimed subject matter deemed to be patent eligible per application of 35 USC 101. Given the above expressed disclaimer of any embodiments exceeding this scope, any interpretation of the claims that includes subject matter exceeding this expressly defined scope are to be considered unreasonable and overly broad interpretations of the claims (as the claims are interpreted in their broadest reasonable manner in light of the specification).

What is claimed is:

1. An automated teller machine (ATM) machine providing financial account access, enabling account withdrawals, and enabling account deposits, said ATM machine comprising:
    a card reader comprising hardware and circuitry for reading information from a set of access card to enable account access of a set of users' financial accounts, wherein each of the users' financial accounts comprises an accessible quantity of negotiable funds, wherein access to each of the users' financial accounts via the ATM machine is restricted to a set of users authorized as having access to respective ones of the users' financial accounts per successful authentication of information from the respective ones of the access card as read by the card reader;
    a screen for displaying options for logging in to the users' financial accounts, for conducting unattended financial functions, and for conducting unattended non-negotiable account functions, said unattended financial functions comprising financial account access to authorized ones of the users' financial accounts, withdraws from authorized ones of the users' financial accounts, deposits into authorized ones of the user's financial account, said unattended non-negotiable account functions comprising:
        an unattended non-negotiable account function for interactive account access to authorized ones of a set of non-negotiable fund accounts;
    at least one of:
        an unattended non-negotiable account function for conversions between value stored in authorized ones of the non-negotiable fund accounts and authorized ones of the user's financial accounts; and
        an unattended non-negotiable account function for withdrawals of negotiable funds resulting from ATM machine conversions of a quantity of non-negotiable funds in authorized ones of the non-negotiable fund accounts into paper currency;
    wherein each of the non-negotiable fund accounts consists of a quantity of non-fungible, non-negotiable units of exchange provided by an entity to an authorized account holder;
    machine-to-user interaction mechanisms enabling humans to interact with the
    ATM machine to conduct the unattended financial functions and to conduct the unattended non-negotiable account functions;
    circuitry for conducting the unattended financial functions and for conducting the unattended non-negotiable account functions, said unattended non-negotiable account functions comprising:
        an unattended non-negotiable account function for converting a first quantity of loyalty program points of a loyalty program possessed by the member held in a first account of the non-negotiable fund accounts to a second quantity of different loyalty program points possessed by the member held in a second account of the non-negotiable fund accounts, wherein the loyalty program is a loyalty program of an entity, wherein the different loyalty program is a different loyalty program of a commerce partner, wherein the entity and the commerce partner are different legal entities and are not parent or subsidiary entities of each other, wherein the converting is explicitly permitted by terms of a mutual agreement established between the entity and the commerce partner;
    a bill presenter comprising hardware and circuitry for dispensing paper currency:
        responsive to withdrawals per the unattended financial functions; and
        responsive to withdrawals per the unattended non-negotiable account functions.

2. The ATM machine of claim 1, said unattended non-negotiable account functions comprising:
    an unattended non-negotiable account function for conversions between value stored in authorized ones of the non-negotiable fund accounts and authorized ones of the user's financial accounts; and
    an unattended non-negotiable account function for withdrawals of negotiable funds resulting from ATM machine conversions of a quantity of non-negotiable funds in authorized ones of the non-negotiable fund accounts into paper currency.

3. The ATM machine of claim 1, wherein each of the non-negotiable fund accounts comprises earnings from a game of chance in the form of entertainment credits earned in a legal gambling establishment, said ATM machine being physically located within the gambling establishment, wherein each of the user's financial accounts are financial institution accounts not managed or controlled by the gambling establishment.

4. The ATM machine of claim 1, wherein each of the non-negotiable fund accounts comprises earnings from a game of chance in the form of entertainment credits earned in a legal gambling establishment, said ATM machine being physically located within the gambling establishment, wherein each of the user's financial accounts are financial institution accounts not managed or controlled by the gambling establishment.

5. The ATM machine of claim 1, said unattended non-negotiable account functions comprising:
 an unattended non-negotiable account function for redeeming quantities of non-negotiable credits for e-commerce transactions for goods and services, wherein the e-commerce transactions are conducted via the ATM machine.

6. The ATM machine of claim 1, said unattended non-negotiable account functions comprising:
 a token counter comprising hardware and circuitry for accepting and retaining tokens each representing a quantity of non-negotiable credits and for depositing a corresponding quantity of the non-negotiable credits into one of the non-negotiable accounts to which a current user of the ATM machine is authorized.

7. The ATM machine of claim 1, said unattended non-negotiable account functions comprising:
 a token counter comprising hardware and circuitry for accepting and retaining tokens each representing a quantity of non-negotiable credits and for depositing a corresponding quantity of the non-negotiable credits into one of the non-negotiable accounts to which a current user of the ATM machine is authorized.

8. The ATM machine of claim 1, said unattended non-negotiable account functions comprising:
 a reader comprising hardware and circuitry for accepting value digitally stored in a memory of a set of portable storage artifacts, for deducing quantities of non-negotiable credits from read ones of the portable storage artifacts and for depositing corresponding quantities of non-negotiable credits into respective ones of the non-negotiable accounts.

9. A kiosk providing financial account access, enabling account withdrawals, and enabling account deposits, said kiosk comprising:
 a screen for displaying options for logging in to the users' financial accounts, for conducting unattended financial functions, and for conducting unattended non-negotiable account functions, said unattended financial functions comprising financial account access to authorized ones of the users' financial accounts, withdraws from authorized ones of the users' financial accounts, deposits into authorized ones of the user's financial account, said unattended non-negotiable account functions comprising:
  an unattended non-negotiable account function for interactive account access to authorized ones of a set of non-negotiable fund accounts; and
 at least one of:
  an unattended non-negotiable account function for conversions between value stored in authorized ones of the non-negotiable fund accounts and authorized ones of the user's financial accounts; and
  an unattended non-negotiable account function for withdrawals of negotiable funds resulting from kiosk conversions of a quantity of non-negotiable funds in authorized ones of the non-negotiable fund accounts into paper currency;
 wherein each of the non-negotiable fund accounts consists of a quantity of non-fungible, non-negotiable units of exchange provided by an entity to an authorized account holder;
 machine-to-user interaction mechanisms enabling humans to interact with the kiosk to conduct the unattended financial functions and to conduct the unattended non-negotiable account functions;
 circuitry for conducting the unattended financial functions and for conducting the unattended non-negotiable account functions, one of the unattended non-negotiable account functions comprising:
  an unattended non-negotiable account function for converting a first quantity of loyalty program points of a loyalty program possessed by the member held in a first account of the non-negotiable fund accounts to a second quantity of different loyalty program points possessed by the member held in a second account of the non-negotiable fund accounts, wherein the loyalty program is a loyalty program of an entity, wherein the different loyalty program is a different loyalty program of a commerce partner, wherein the entity and the commerce partner are different legal entities and are not parent or subsidiary entities of each other, wherein the converting is explicitly permitted by terms of a mutual agreement established between the entity and the commerce partner.

10. The kiosk of claim 9, further comprising:
 a bill presenter comprising hardware and circuitry for dispensing paper currency:
responsive to withdrawals per the unattended financial functions; and
responsive to withdrawals per the unattended non-negotiable account functions.

11. The kiosk of claim 10, wherein each of the non-negotiable fund accounts comprises earnings from a game of chance in the form of entertainment credits earned in a legal gambling establishment, said kiosk being physically located within the gambling establishment, wherein each of the user's financial accounts are financial institution accounts not managed or controlled by the gambling establishment.

12. The kiosk of claim 10, said unattended non-negotiable account functions comprising:
 an unattended non-negotiable account function for redeeming quantities of non-negotiable credits for e-commerce transactions for goods and services, wherein the e-commerce transactions are conducted via the kiosk.

13. The kiosk of claim 10, said unattended non-negotiable account functions comprising:
 a token counter comprising hardware and circuitry for accepting and retaining tokens each representing a quantity of non-negotiable credits and for depositing a corresponding quantity of the non-negotiable credits into one of the non-negotiable accounts to which a current user of the kiosk is authorized.

14. The kiosk of claim 10, said unattended non-negotiable account functions comprising:
 a token counter comprising hardware and circuitry for accepting and retaining tokens each representing a quantity of non-negotiable credits and for depositing a corresponding quantity of the non-negotiable credits into one of the non-negotiable accounts to which a current user of the kiosk is authorized.

15. The kiosk of claim 10, said unattended non-negotiable account functions comprising:

a reader comprising hardware and circuitry for accepting value digitally stored in a memory of a set of portable storage artifacts, for deducing quantities of non-negotiable credits from read ones of the portable storage artifacts and for depositing corresponding quantities of non-negotiable credits into respective ones of the non-negotiable accounts.

16. The kiosk of claim 10, further comprising:

circuitry and hardware for an interactive game of chance played between humans and the kiosk through which a player earns quantities of non-negotiable credits deposited into a respective one of the non-negotiable accounts.

17. The kiosk of claim 9, said unattended non-negotiable account functions comprising:

an unattended non-negotiable account function for conversions between value stored in authorized ones of the non-negotiable fund accounts and authorized ones of the user's financial accounts.

18. A conversion agency server for converting non-negotiable funds into the negotiable funds, said conversion agency server comprising circuitry for conducting unattended financial functions, and for conducting unattended non-negotiable account functions, said unattended financial functions comprising financial account access to authorized ones of the users' financial accounts, withdraws from authorized ones of the users' financial accounts, deposits into authorized ones of the user's financial account, one of the unattended non-negotiable account functions comprising:

an unattended non-negotiable account function for converting a first quantity of loyalty program points of a loyalty program possessed by the member held in a first account of the non-negotiable fund accounts to a second quantity of different loyalty program points possessed by the member held in a second account of the non-negotiable fund accounts, wherein the loyalty program is a loyalty program of an entity, wherein the different loyalty program is a different loyalty program of a commerce partner, wherein the entity and the commerce partner are different legal entities and are not parent or subsidiary entities of each other, wherein the converting is explicitly permitted by terms of a mutual agreement established between the entity and the commerce partner;

said unattended non-negotiable account functions further comprising:

an unattended non-negotiable account function for interactive account access to authorized ones of a set of non-negotiable fund accounts; and at least one of:

an unattended non-negotiable account function for conversions between value stored in authorized ones of the non-negotiable fund accounts and authorized ones of the user's financial accounts; and an unattended non-negotiable account function for withdrawals of negotiable funds resulting from kiosk conversions of a quantity of non-negotiable funds in authorized ones of the non-negotiable fund accounts into paper currency;

wherein each of the non-negotiable fund accounts consists of a quantity of non-fungible, non-negotiable units of exchange provided by an entity to an authorized account holder.

19. The conversion agency server of claim 18, wherein the conversion agency server comprises a processor, a memory, and a non-transitory storage medium storing instructions for the unattended financial functions, wherein the conversion agency server provides back-end services for a set of automated teller machines (ATMs).

20. The conversion agency server of claim 18, said unattended non-negotiable account functions comprising:

an unattended non-negotiable account function for conversions between value stored in authorized ones of the non-negotiable fund accounts and authorized ones of the user's financial accounts; and an unattended non-negotiable account function for withdrawals of negotiable funds resulting from ATM machine conversions of a quantity of non-negotiable funds in authorized ones of the non-negotiable fund accounts into paper currency.

* * * * *